(12) United States Patent
Tangudu et al.

(10) Patent No.: US 10,222,478 B2
(45) Date of Patent: Mar. 5, 2019

(54) CROSS CORRELATION INTERFERENCE ESTIMATION CIRCUIT ISSUING TWO DIFFERENT PN CODES

(71) Applicant: TEXAS INSTRUMENTS INCORPORATED, Dallas, TX (US)

(72) Inventors: Jawaharlal Tangudu, Karnataka (IN); Arun Raghupathy, Karnataka (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 15/193,895

(22) Filed: Jun. 27, 2016

(65) Prior Publication Data

US 2016/0306049 A1     Oct. 20, 2016

Related U.S. Application Data

(62) Division of application No. 14/632,590, filed on Feb. 26, 2015, now Pat. No. 9,407,318, which is a division
(Continued)

(51) Int. Cl.
| | |
|---|---|
| *H04B 1/00* | (2006.01) |
| *G01S 19/21* | (2010.01) |
| *H04B 1/7075* | (2011.01) |

(52) U.S. Cl.
CPC .......... *G01S 19/21* (2013.01); *H04B 1/70755* (2013.01); *H04B 2201/70715* (2013.01)

(58) Field of Classification Search
CPC combination set(s) only.
See application file for complete search history.

(56) References Cited

U.S. PATENT DOCUMENTS

| 5,041,833 A | * | 8/1991 | Weinberg | ................. G01S 5/14 |
| | | | | 342/357.48 |
| 5,204,829 A | * | 4/1993 | Lyu | .......................... G06F 7/57 |
| | | | | 708/500 |

(Continued)

OTHER PUBLICATIONS

Liang Kun et al. Study on GPS cross correlation mitigation techniques in high sensitivity GPS receivers. Acta Electronica Sinica, vol. 36, No. 6, pp. 1098-1102. Chinese Institute of Electronics Jun. 2008. FIG. 1, Abstract.
(Continued)

*Primary Examiner* — Wednel Cadeau
(74) *Attorney, Agent, or Firm* — Lawrence J. Bassuk; Charles A. Brill; Frank D. Cimino

(57) ABSTRACT

A receiver (100) is provided for signals of different signal strengths and modulated with respective pseudorandom noise (PN) codes. The receiver (100) includes a correlator circuit (120) operable to correlate the signals with a selectable locally-issued PN code having a Doppler and a code lag to produce a peak, the correlator circuit (120) being subject to cross correlation with a distinct PN code carried by least one of the signals that can produce cross correlation; and a cross correlation circuit (370, 400) operable to generate a variable comparison value related to the cross correlation as a function of values representing a Doppler difference and a code lag difference between the locally-issued PN code and the distinct PN code, and to use the variable comparison value to reject the peak as invalid from cross correlation or to pass the peak as a valid received peak.

16 Claims, 31 Drawing Sheets

Related U.S. Application Data of application No. 12/719,965, filed on Mar. 9, 2010, now Pat. No. 9,036,683.

(60) Provisional application No. 61/257,239, filed on Nov. 2, 2009.

(56) References Cited

U.S. PATENT DOCUMENTS

| | | | |
|---|---|---|---|
| 5,349,606 A * | 9/1994 | Lovell | H04B 1/707 375/150 |
| 6,236,354 B1 | 5/2001 | Krasner | |
| 6,313,786 B1 | 11/2001 | Sheynblat et al. | |
| 6,707,422 B2 | 3/2004 | Sheynblat et al. | |
| 7,116,704 B2 | 10/2006 | Norman et al. | |
| 2002/0015439 A1 * | 2/2002 | Kohli | G01C 21/26 375/148 |
| 2002/0020944 A1 | 2/2002 | Sheynblat et al. | |
| 2005/0032513 A1 | 2/2005 | Norman et al. | |
| 2006/0245479 A1 | 11/2006 | Raman et al. | |
| 2007/0253472 A1 * | 11/2007 | Jang | H04B 1/70752 375/150 |
| 2008/0001817 A1 | 1/2008 | Turetzky et al. | |
| 2008/0129585 A1 | 6/2008 | Roh | |
| 2008/0273578 A1 | 11/2008 | Brenner et al. | |
| 2008/0316096 A1 | 12/2008 | Bochkovskiy et al. | |
| 2009/0054075 A1 | 2/2009 | Boejer et al. | |
| 2009/0068974 A1 | 3/2009 | Smith | |
| 2009/0079636 A1 | 3/2009 | Riley et al. | |
| 2009/0128403 A1 | 5/2009 | Bryant et al. | |
| 2009/0153397 A1 | 6/2009 | Li et al. | |
| 2009/0168843 A1 | 7/2009 | Waters et al. | |
| 2009/0213912 A1 | 8/2009 | Brenner | |

OTHER PUBLICATIONS

Hao Jianjun et al. An algorithm for improving sensitivity of GPS receiver based on cross-correlation mitigation. 2008 4th International Conference on Wireless Communications, Networking and Mobile Computing (WiCOM) Oct. 12-14, 2008 Dalian, China. 2 pp. Piscataway NJ: IEEE. FIG. 1.

Lopez-Risueno, G., et al. Detection and mitigation of cross-correlation interference in high-sensitivity GNSS receivers. 2007 IEEE 18th Int'l Symposium on Personal, Indoor and Mobile Radio Communications. Sep. 3-7, 2007 pp. 433-437. FIGS. 1-3.

Lopez-Risueno, G., et al. CNo estimation and near-far mitigation for GNSS indoor receivers. Proc. IEEE Vehicular Technology Spring Conf., 2005, 5 pp., FIGS. 3-4.

Glennon, E. et al. A novel GPS cross correlation mitigation technique. Proc. 18th Int'l Tech. Meet. Satellite Div. Institute of Navigation, ION GNSS 2005 pp. 190-199. FIGS. 2-3.

Glennon, E. et al. A Review of GPS Cross Correlation Mitigation Techniques. The 2004 International Symposium on GNSS/GPS Sydney, Australia. Dec. 6-8, 2004. 13 pp., FIGS. 1, 3-4.

* cited by examiner

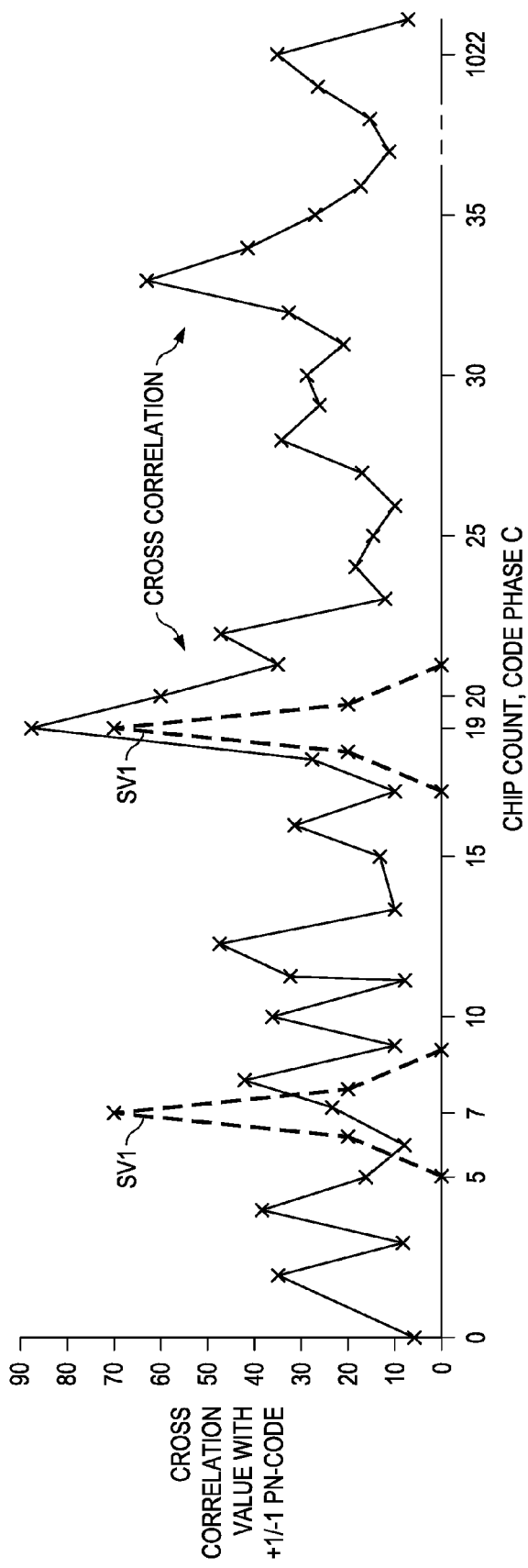

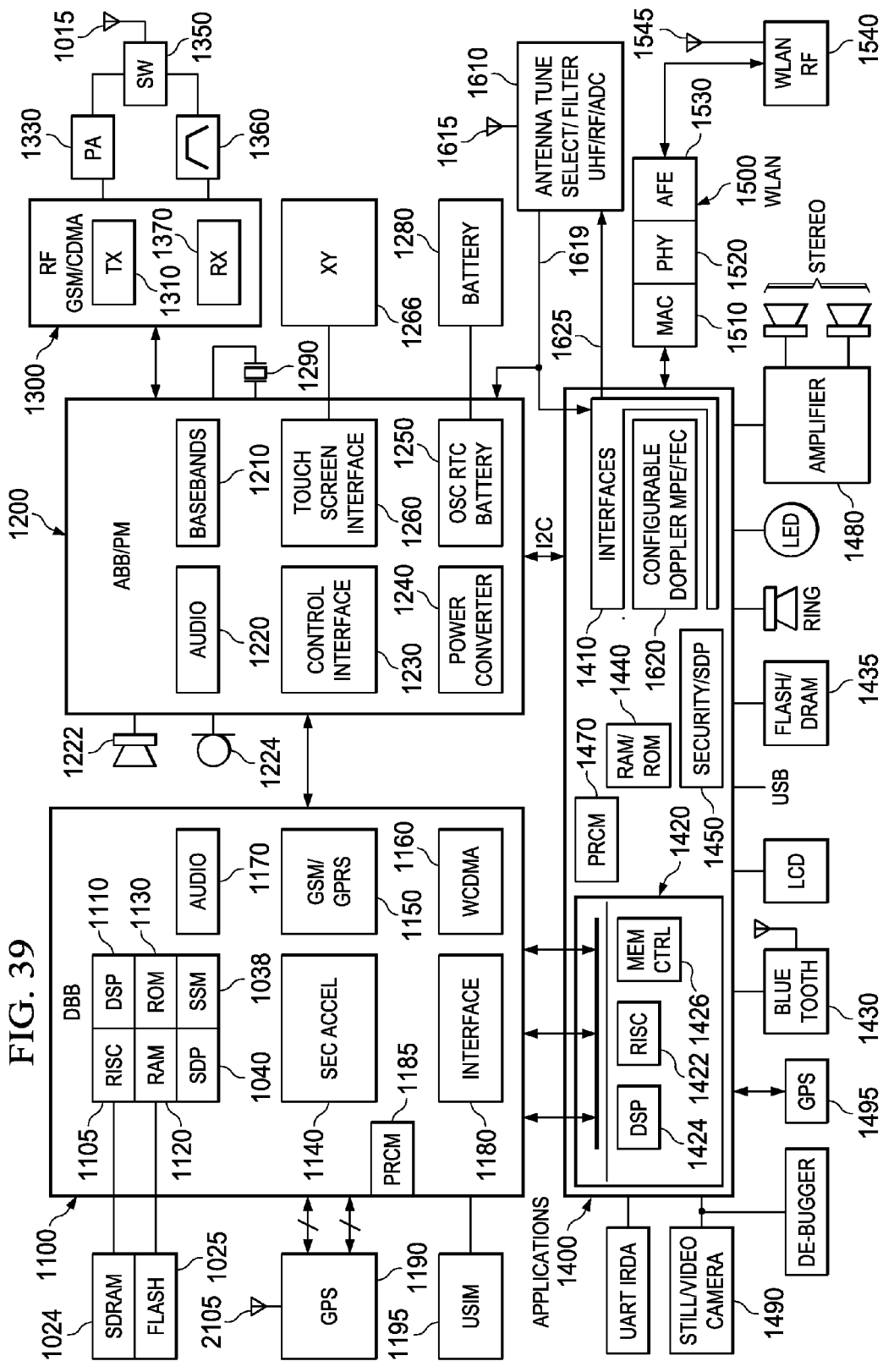

CROSS CORRELATION INTERFERENCE ESTIMATION CIRCUIT ISSUING TWO DIFFERENT PN CODES

CROSS-REFERENCES TO RELATED APPLICATIONS

This application is a Divisional of prior application Ser. No. 14/632,590, filed Feb. 26, 2015, now U.S. Pat. No. 9,407,318, issued Aug. 2, 2016;

Which was a Divisional of prior application Ser. No. 12/719,965, filed Mar. 9, 2010, now U.S. Pat. No. 9,036,683, granted May 19, 2015;

Which is related to provisional U.S. patent application "Enhanced Cross Correlation Mitigation Techniques For Positioning Receiver" Ser. No. 61/257,239, filed Nov. 2, 2009, for which priority is claimed under 35 U.S.C. 119(e) and all other applicable law, and which is incorporated herein by reference in its entirety.

US published patent application 20090168843 dated Jul. 2, 2009 "Power-Saving Receiver Circuits, Systems and Processes" Ser. No. 12/244,060, filed Oct. 2, 2008, is incorporated herein by reference in its entirety.

US published patent application 20090054075 Feb. 26, 2009, "Satellite (GPS) Assisted Clock Apparatus, Circuits, Systems and Processes for Cellular Terminals on Asynchronous Networks," Ser. No. 11/844,006, filed Aug. 3, 2007, is also incorporated by reference herein in its entirety.

STATEMENT REGARDING FEDERALLY SPONSORED RESEARCH OR DEVELOPMENT

Not applicable.

COPYRIGHT NOTIFICATION

Portions of this patent application contain materials that are subject to copyright protection. The copyright owner has no objection to the facsimile reproduction by anyone of the patent document, or the patent disclosure, as it appears in the United States Patent and Trademark Office, but otherwise reserves all copyright rights whatsoever.

BACKGROUND OF THE INVENTION

GPS (Global Positioning System) is an earth-satellite-based electronic system for enabling GPS receivers in ships, aircraft, land vehicles and land stations to determine their geographic and spatial position such as in latitude, longitude, and altitude. Discussion of GPS herein is without limitation to other analogous electronic systems as well as applicable receiver circuits in a variety of telecommunication systems.

It would be desirable to even more accurately, reliably, rapidly, conveniently and economically search for, acquire, and track received signals and maintain accurate time, position, velocity, and/or acceleration estimation in a communication device having a satellite positioning receiver (SPR) or other receiver and its clock source.

Current GPS (Global Positioning System) receivers and other positioning and communications receivers are expected to operate in high dynamic range (e.g., a range of 38 db or so) of receive powers from different satellites and other transmitting sources. The cross correlation protection provided by the 1 ms PN (pseudorandom noise) codes used by GPS satellites, for instance, is not sufficient for such a large dynamic range, which is problematic. The cross correlation problem occurs mainly when the Dopplers are close by or same as each other or their Doppler difference is close to a one kilohertz (1 Khz) or a multiple of 1 KHz. The 1 KHz or multiple is involved because of the periodicity of the PN-code, e.g., 1 ms in GPS.

Some positioning receivers such as GPS receivers need to operate in indoor environments and/or for urban canyon environments and otherwise where the dynamic range of receive satellite signal powers is high, typically 25-35 db or more. Cross correlation interference is a problem especially in GPS receivers because the PN-codes are not designed to operate in such wide power ranges. For another example, the open-sky power level can be as high as −125 dBm whereas current GPS receivers can target to acquire and track signals with power level as low as −163 dBm or smaller. The GPS system was not designed for such a large dynamic range of nearly 38 db. The basic cross correlation protection offered by the PN codes of various satellites is only about 20 db. Cross correlation issues arise with zero and non-zero Doppler-difference multiples of 1 KHz across satellites.

Cross correlation mitigation techniques hitherto have been undesirably conservative or pessimistic in nature and tend to reject valid lower power satellite vehicle (SV) signals as cross correlation. One approach, called Approach 1 here, involves a power difference determination. If a low power peak is detected at a Doppler difference of one kilohertz or multiple away from already detected higher power Sv2 peak and if a difference of SV signal powers C/No is 18 dB or more, then the low power peak is declared or regarded as a cross correlation peak and not used. Such threshold of 18 db is based on or derived from the worst-case cross correlation coefficient between two PN codes. This detection approach is undesirably conservative or pessimistic in nature because the low power measurement could be a genuine or uncorrupted valid lower power peak of an actual satellite vehicle, designated Sv1 here.

Limitations of such approach are first, being undesirably conservative in nature and regarding even true lower power peaks as suspect and rejecting them as if they were undesirable cross correlation peaks. This results in a starvation of positioning and other navigational measurements in difficult satellite visibility conditions. It is believed that one cannot make such conservative approach more aggressive without undesirably impacting the probability of false detection that such approach by nature also involves.

New GNSS (Global Navigation Satellite Systems) standards are being designed to have better cross correlation rejection properties. The Russian system called Glonass uses FDMA (Frequency Division Multiple Access) technique wherein each satellite vehicle SVx uses a different carrier frequency and provides cross correlation rejection of around 45 db or higher. The European system called Galileo uses a longer pseudo-noise PN code (4 ms, 4092 long, four times longer than GPS), thereby having less issue with cross correlation compared to the cross correlation problem that GPS poses. This disclosure is applicable to Galileo as well, since even Galileo will have cross correlation problems, even though it is better than GPS. However, GPS is a widely used GNSS and the need for improved GPS receivers is substantial both in terms of the cross correlation performance issue itself as well as the large market for GPS receivers. Moreover, the cross correlation problem can be expected in any GNSS whether GPS or otherwise in which the dynamic range of received satellite signal powers exceeds in magnitude the cross correlation protection offered by the code. Accordingly, as GNSS receivers with wide and wider dynamic ranges become increasingly pervasive in the market, this problem can increasingly confront users of GPS and any other applicable GNSS. In addition, this problem can confront users of any spread spectrum system such as CDMA (code division multiple access) processing received signals of wide enough dynamic range relative to cross correlation protection.

SUMMARY OF THE INVENTION

Generally and in one form of the invention, a receiver is provided for signals of different signal strengths and modulated with respective pseudorandom noise (PN) codes. The receiver includes a correlator circuit operable to correlate the signals with a selectable locally-issued PN code having a Doppler and a code lag to produce a peak, the correlator circuit being subject to cross correlation with a distinct PN code carried by least one of the signals that can produce cross correlation; and a cross correlation circuit operable to generate a variable comparison value related to the cross correlation as a function of values representing a Doppler difference and a code lag difference between the locally-issued PN code and the distinct PN code, and to use the variable comparison value to reject the peak as invalid from cross correlation or to pass the peak as a valid received peak.

Generally, a further form of the invention involves a power management process for use with a receiver for signals of different signal strengths and modulated with respective pseudorandom noise (PN) codes, the process including electronically seeking a higher-power peak and its code lag and Doppler using one locally-issued PN code and electronically seeking a lower power peak using a second locally-issued PN code having an associated code lag and associated Doppler; and selectively executing and selectively preventing electronic generation of a value related to the cross correlation between the first and second locally-issued PN codes given a relative code lag and rotated as a function of a difference between the Doppler of the higher-power peak and the associated Doppler, wherein the selectively preventing is operative if the higher power peak is insufficiently higher in power than the lower power peak, whereby power is saved.

Generally, an additional form of the invention involves an interference mitigation device for signals of different signal strengths and modulated with respective pseudorandom noise (PN) codes, the interference mitigation device including a correlator circuit operable to correlate the received signals with a selectable locally-issued PN code to produce a peak having a pseudo range and a pseudo range estimation error, the correlator circuit being subject to cross correlation that produces a cross correlation peak; and a cross correlation detector operable to determine whether a computed pseudorange, considering the pseudo range estimation error, fails to encompass an integer chip value away from the pseudorange of a high power peak already produced by the correlator using another locally-issued PN code, and to use the determination to validate a cross correlation peak.

Generally, a still further form of the invention involves a cross correlation interference estimation circuit including a pseudo random noise (PN) code issuing circuit operable to issue a selected pair of different PN codes having a relative code lag and continually rotated relative to each other according to a relative Doppler shift, and a multiply accumulate circuit (MAC) operable to cross correlate the selected pair of PN codes having the relative code lag and continually rotated.

Generally, still another form of the invention involves a code-division signal processor for signals of different signal strengths and modulated with respective pseudorandom noise (PN) codes, the code-division signal processor including a correlator circuit operable in first and second integration periods of different durations to correlate the received signals each of the integration periods with a selectable locally-issued PN code to find a given peak in each of the integration periods, the correlator circuit being subject to cross correlation peaks; and a cross correlation detector operable to do a comparison of the strength of the given peak in the first integration period with its strength in the second integration period and to reject the given peak as a cross correlation peak or pass the given peak as a valid received peak depending on the comparison.

Generally, another further form of the invention involves a correlation detector for signals of different signal strengths and modulated with respective pseudorandom noise (PN) codes, the correlation detector including a correlator circuit operable to correlate the received signals with a selectable locally-issued PN code to produce a peak, the correlator circuit being subject to cross correlation; and a cross correlation circuit operable to concurrently cross correlate the locally-issued PN code, using another locally-issued PN code with plural relative code lags between the PN codes and continually rotated relative to each other, thereby to supply plural values representing cross correlation, and further operable according to a decision criterion to make a determination whether any of the plural values both represents significant correlation and lies close enough to the peak to interfere with the peak.

Generally, further additional form of the invention involves a cross correlation protection system including non-zero integer KHz relative Doppler cross correlation mitigation mechanisms having outputs coupled according to a decision function for increasing confidence of a valid peak identification, and at least one zero relative Doppler cross correlation mitigation mechanism selectively operable in coordination with the non-zero integer KHz relative Doppler cross correlation mitigation mechanisms so that a combined mechanism for integer KHz relative Doppler cross correlation mitigation is provided.

Generally, another form of the invention involves a satellite tracking process for a lower power satellite signal in the presence of at least one higher power satellite signal wherein Dopplers of the satellite signals change with time. The tracking process involves tracking a correlation peak having a position for the lower power signal, evaluating a difference between the Dopplers over time, and detecting when the evaluated difference between the Dopplers comes close to an integer KHz amount. If the evaluated difference comes close, then the process estimates cross-correlation between the signals at the position of the peak, compares the peak with the estimated cross-correlation, and validates or invalidates the peak depending on the comparison. The foregoing tracking process is repeatedly performed to update the validating and invalidating over time.

Other receivers, circuits, devices, systems, methods of operation and processes of manufacture are also disclosed and claimed.

BRIEF DESCRIPTION OF THE DRAWINGS

FIG. 10 is a pair of superimposed graphs, with a first graph of amplitude versus code lag $c_1$ of a valid Sv1 satellite signal peak having Doppler shift f1 shown at two different example low power Sv1 peak positions as the Sv1 peak moves, and a second graph of amplitude versus a code phase variable $c_1$-$c_2$ representing cross correlation coefficients as a function in general of the code phase variable and a Doppler difference variable f, and the second graph superimposed on the first graph to make the particular cross correlation coefficient value corresponding to a particular code lag $c_1$-$c_2$ and particular Doppler difference f=f1−f2 between the satellite signals for Sv1 and Sv2 in FIG. 8 coincide with the Sv1 peak at a given time, where the Sv2 satellite signal of FIG. 8 has code lag $c_2$ and Doppler shift f2 at the time.

FIG. 39 is a block diagram of circuit blocks of a cellular telephone handset for GPS or assisted GPS for use with the positioning receiver of FIGS. 2, 5, 36 and the other Figures herein.

Corresponding numerals in different Figures indicate corresponding parts except where the context indicates otherwise. A minor variation in capitalization or punctuation for the same thing does not necessarily indicate a different thing. A suffix .i or .j refers to any of several numerically suffixed elements having the same prefix.

DETAILED DESCRIPTION OF EMBODIMENTS

Figure 1:
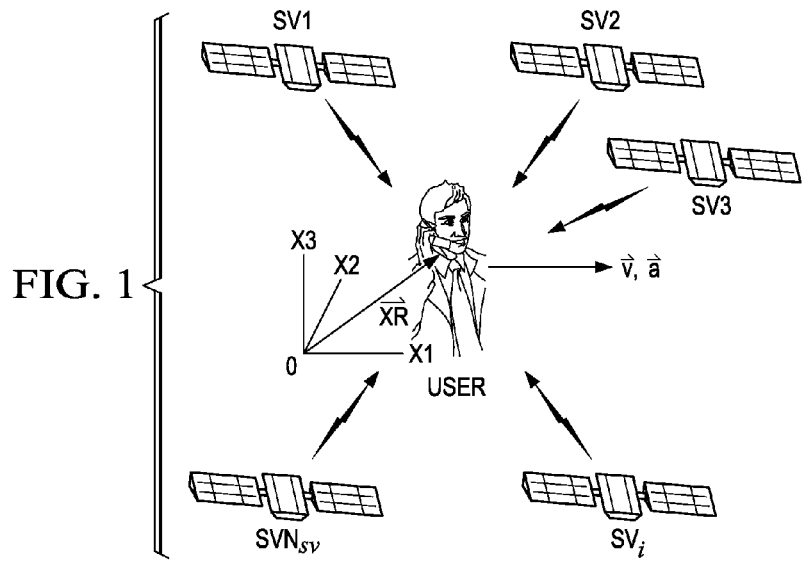
FIG. 1 is a pictorial diagram of a user with an inventive mobile device supported by a positioning system with satellite vehicles (SVs).

In FIG. 1 a user has a mobile device supported by a positioning system with satellite vehicles (SVs). The mobile device includes a receiver 100 as in FIG. 2 that searches for and tracks the satellites, recovers the transmitted information from each of them, and solves navigation equations as discussed later hereinbelow to yield the position $X_R$ of the receiver for user applications involving position, velocity and/or acceleration relative to the ground or water or at some elevation.

Figure 2:
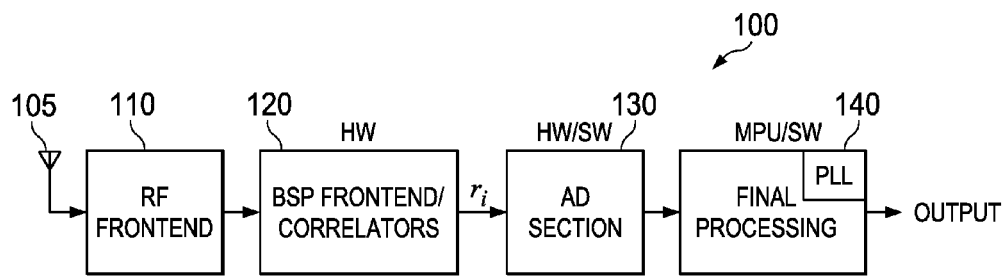
FIG. 2 is a block diagram of an inventive positioning receiver for use in the mobile device of FIG. 1 and improved according to the inventive structures and processes depicted in the other Figures.

In FIG. 2 and the other Figures herein, special accumulate-and-dump (AD) receiver circuits, systems and processes of operation and manufacture are disclosed. AD receivers accumulate an incoming signal in order to boost the signal-to-noise ratio (SNR) of the signal. Accumulate-and-dump refers to either or both coherent and noncoherent accumulation and transfer of the results in either case to a following stage or to a memory. The AD receiver is suitably used for GPS and modernized GPS reception, and code-division multiple-access (CDMA) cellular communications and other systems.

In FIG. 2, the receiver converts the incoming signal to a digital baseband signal using a radio-frequency (RF) front end 110 coupled to one or more antennas 105. RF front end 110 delivers a baseband signal in digital form to a block 120 having a baseband signal processor BSP and correlators. Block 120 delivers a received signal r, to an accumulate-and-dump AD section 130 followed by a block for final processing 140 including a microprocessor MPU with software SW.

One category of embodiments involves GPS receivers and other GNSS receivers. GPS satellites transmit time of transmission, satellite clock correction parameters and ephemeris data. The spread spectrum transmissions of GPS have either of two microwave carrier frequencies (above 1 GHz). The modulation involves two pseudorandom noise PN code types—a high-rate Precision P code and a lower rate one-millisecond period C/A (Coarse/Acquisition) code. C/A is discussed here without limitation. Each PN code type has various possible orthogonal sequences, and a particular unique PN sequence is assigned to each satellite SV.

In FIGS. 1, 2, 3B, 5, and 7, receiver 100 finds satellites by locally generating different PN sequences and electronically correlating or synchronizing them with each unique PN sequence assigned to receptions from available satellites. In the receiver processing, Doppler frequency removal (wipe-off) is performed for each satellite ahead of the correlating, so that correlation produces narrower single peaks with higher strengths. The receiver monitors for high correlations to individually receive (and distinguish) satellite signals of different satellites from each other. The information data modulated on a given received satellite signal then is demodulated to obtain the information, including the time of transmission, satellite clock correction parameters and ephemeris data.

Figure 3A:
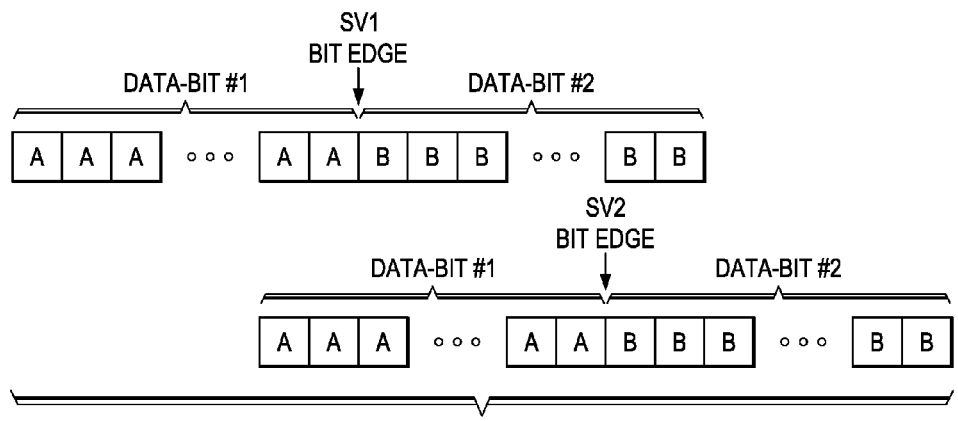
FIG. 3A is a diagram of received signal information versus time for the receiver of FIG. 2 showing repetition of a symbol A followed by repetition of another symbol B with randomly displaced inter-symbol bit edges for two satellites Sv1 and SV2.
Figure 3B:
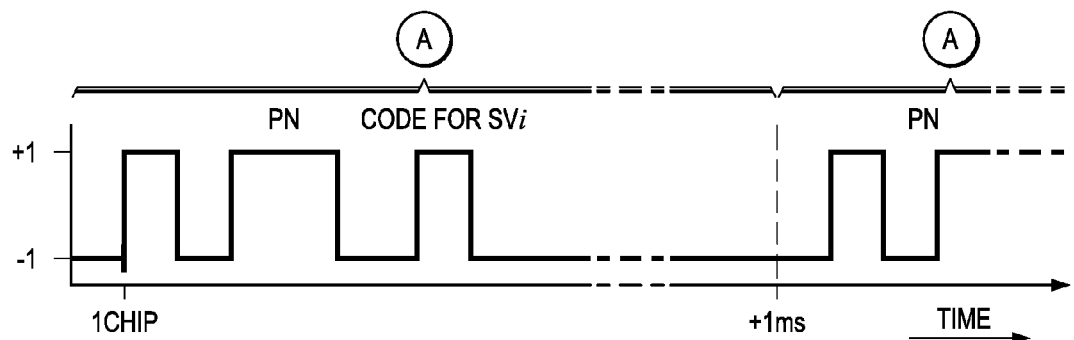
FIG. 3B is a voltage versus time diagram with the time scale magnified relative to that of FIG. 3A showing a repeated pseudorandom noise (PN) sequence.
Figure 3C:
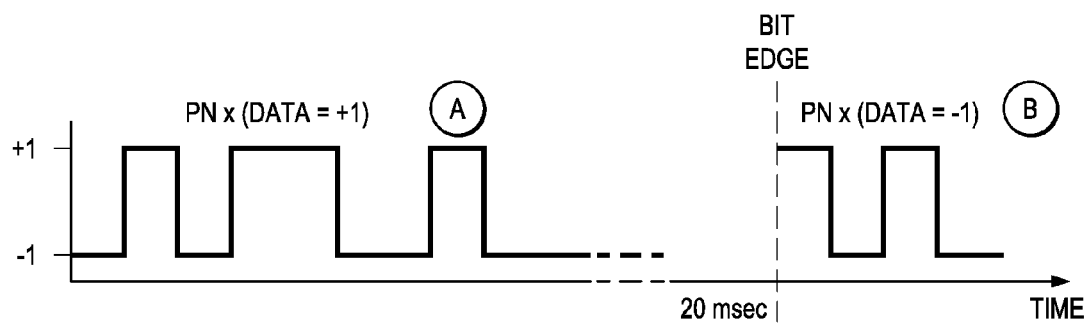
FIG. 3C is a voltage versus time diagram with the time scale same as in FIG. 3B showing binary (+1, −1) data impressed on successive repetitions of the pseudorandom noise (PN) sequence of FIG. 3B.

In FIGS. 3A and 3C, this information comes modulated on the unique PN sequence from the satellite as binary phase shift keyed BPSK (+1/−1) data bits that are repeated each millisecond for signal-enhancing accumulation in block 130 of the AD receiver 100. Repetition of a symbol A twenty (20) times over 20 milliseconds is followed by a similar repetition of another symbol B, etc. In FIG. 3A, two satellites Sv1 and Sv2 have independently or randomly displaced inter-symbol bit edges.

The receiver 100 tracks four or more satellites (FIG. 1), recovers the transmitted information from each of them, and operates a microprocessor or other solution block to act as a Position Engine to solve navigation equations to yield the position $X_R$ of the receiver in FIG. 1 for user applications involving position on and above the surface of the earth. A simple example of navigation equations in three position coordinates x indexed i=1, 2, 3 that are simultaneously solved based on signals from satellites $SV_j$ (j=1, 2, 3, 4, . . . ) is given in rectangular coordinates by $$\sum_{i=1}^{3}(x_{ij}-x_{iR})^2 = c_L^2((t_{Rj}+e)-t_j)^2 \quad (1)$$

In words, the equation says that the square of the distance from the satellite to the receiver is equal to the square of the product of the speed of light times the propagation time to traverse the distance. Parameters $x_{ij}$ represent each (known) coordinate position i of satellite j communicated by the ephemeris data. Variables $x_{iR}$ represent each (unknown) coordinate position i of the receiver itself. Time $t_j$ is the time of transmission from satellite j received with the data signal and corresponding to receiver R local time $t_{Rj}$. The receiver local time has a bias error e relative to the atomic time base of the GPS system, so the GPS time at the receiver is $t_{Rj}$+e. Speed of light $C_L$ times the GPS time difference between transmission and reception is expressed by $c_L((t_{Rj}+e)-t_j)$ and equals the distance to the satellite j. Given enough information such as from four or more satellites, the navigation equations are solved for position coordinate unknowns $x_{iR}$ and unknown bias error e. In spherical coordinates, the three parameters $x_{ij}$ and the three variables $x_{iR}$ in the navigation equations are each replaced by a trio of expressions r cos θ cos φ, r cos θ sin φ, r sin θ appropriately subscripted and with a summation over the three coordinates explicitly written out.

Figure 4:
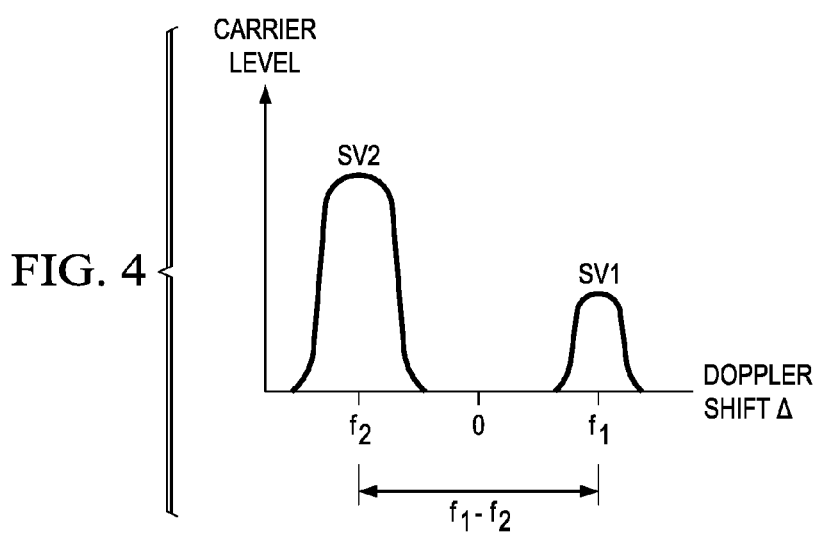
FIG. 4 is a hypothetical spectrum of signal level versus Doppler shift for two satellites.

In FIG. 4, the known carrier frequency from each satellite Sv1, Sv2, etc is, in general, Doppler shifted by a different amount f1, f2, etc. The microprocessor solves Doppler on a equations to determine the velocity $V_R$ of the receiver in FIG. 1 for user applications that involve velocity. More specifically, the receiver 100 has a local velocity vector v relative to the local surface of the Earth at that geographic position that subjects the signals received by receiver 100 to a degree of Doppler shift in frequency that goes beyond that Doppler shift of the signals from the moving satellites relative to a seemingly-stationary receiver at the same place on the rotating planet Earth. Some receivers also determine the acceleration a for the receiver. Some receivers have multiple antennas and multiple circuits that additionally determine physical orientation or attitude in terms of roll, pitch, and yaw.

FIG. 4 shows a hypothetical spectrum of signal level versus Doppler shift for two satellites Sv1 having a lower power signal, and Sv2 having a high power signal. In FIG. 4, the Doppler shift $f_i$ for a given GPS SVi is the difference between the 1.575 GHz GPS frequency (zero "0" in FIG. 4) nominally shared by all SVs and the actual carrier frequency of a particular SV carrier due to Doppler shift away from 1.575 GHz. Doppler shift is also caused by receiver clock offset. The signal null-to-null bandwidth is around 2 MHz whereas the Doppler difference is maximum of the order of 10 KHz. So the spectrum for Sv1 and the spectrum for Sv2 will overlap to a great extent in general whereas FIG. 4 shows them as non-overlapping merely for illustration.

Figure 5:
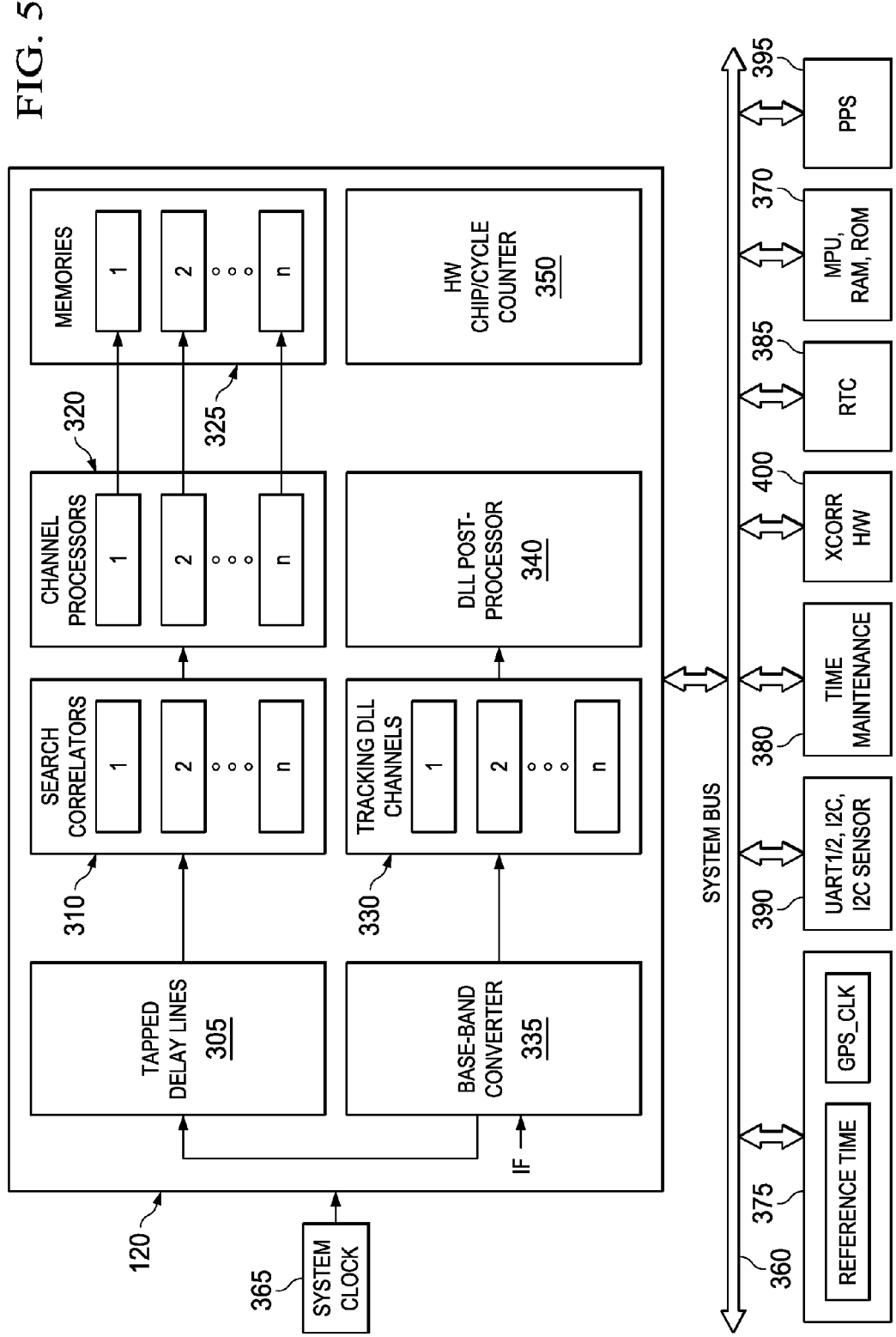
FIG. 5 is a block diagram of a portion of the positioning receiver of FIG. 2 and improved according to inventive structures and processes detailed in the other Figures.
Figure 38:
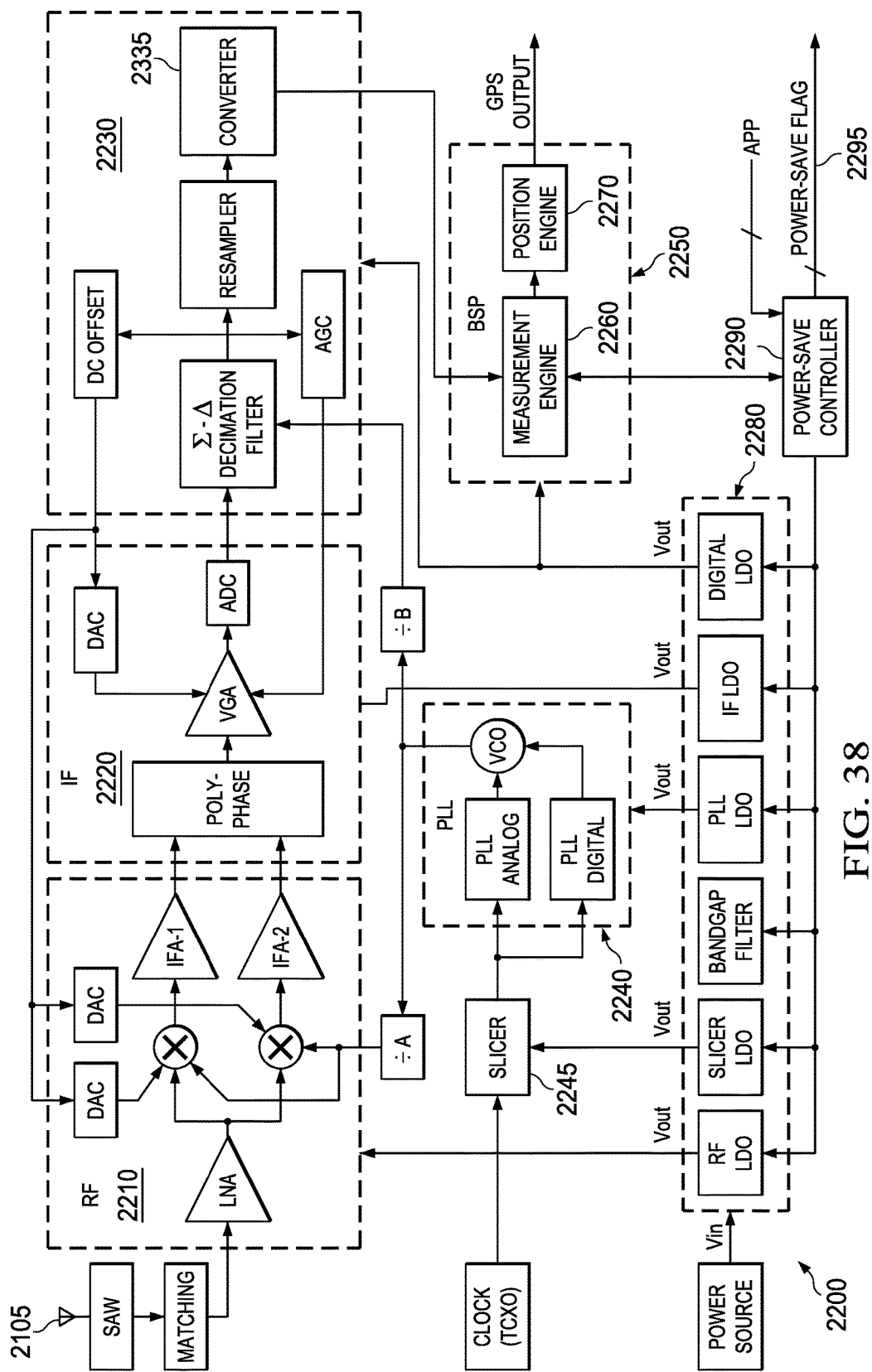
FIG. 38 is a block diagram for a front end and power management circuitry for the inventive receiver structures and processes detailed in the Figures herein.

FIG. 5 is read together with FIG. 38. In FIG. 38, digital front end 2230 has a baseband converter 2335 (335) that feeds a Measurement Engine 2260. FIG. 5 details the Measurement Engine 2260 which includes a Search section for performing intensive calculations to identify a new SV, and a Tracking section for performing calculations to keep track of several already-identified SVs. Cross correlation mitigation hardware 400 supports both the Search and Tracking functions.

In FIG. 5, converter 335 feeds tapped delay lines 305 that go to a fast correlation engine 310 having a set of parallel Correlators (multiply-add channel filters) 310.

In FIGS. 2, 5, 6 and 7, the correlators in block 310 (120) each operate over a 1 ms characteristic PN sequence of a satellite such as Sv1 or Sv2 and multiply-add by a locally selected and generated PN sequence from the receiver's stored set of satellite-specific unique PN sequences to despread a spread-spectrum satellite signal. An hypothesis search engine block 220 (FIG. 7) repeatedly issues a different code lag value c and Doppler f to a PN code-issuing block 210 so that the receiver performs correlation at all the lags and accumulates the correlation outputs over multiple milliseconds to detect the signal. In this way, a generated PN sequence is found that is properly time-shifted by a respective code lag $c_1$ or $c_2$ relative to the receiver time-base to synchronize with and produce a peak with the characteristic PN sequence received from the corresponding satellite Sv1 or Sv2. Doppler frequency removal or "wipe-off" for the Sv1 to be identified is provided in any appropriate way by block 210 in FIG. 7. One way pre-multiplies the collection r(t) of received signals (and noise) for the various SVs by the Doppler f1 function exp(j2π(−ƒ1)t) and delivers for correlation with a Gold code P1 for Sv1. Another alternative and equivalent way impresses Doppler by pre-multiplication by exp(j2π(ƒ1)t) with the Gold code P1 for Sv1 and delivers for correlation with the collection r(t) of received signals (and noise) for the various SVs.

Figure 6:
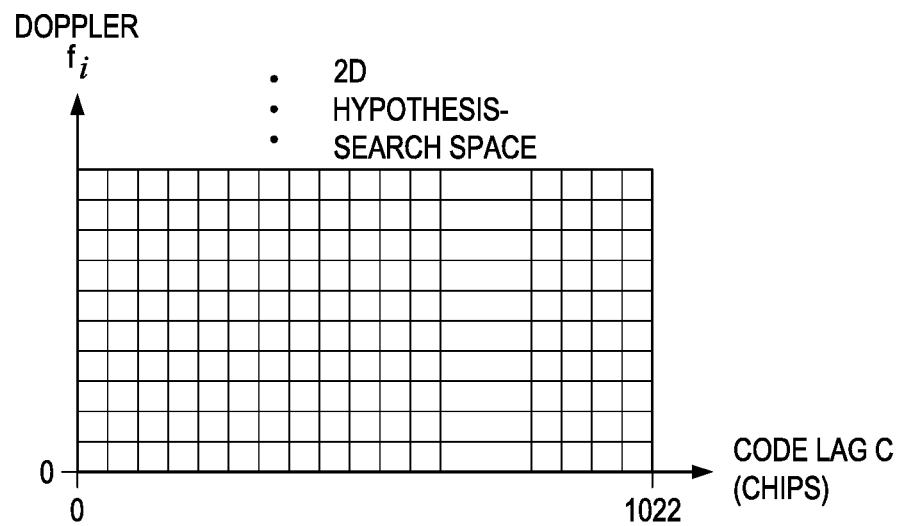
FIG. 6 is a graph of an hypothesis search space having two dimensions for Doppler and code lag (code phase), for use by the receiver structures and processes in FIG. 5.

In FIGS. 5 and 6, the Search section repeatedly operates numerous correlators 310 and Channel Processors 320 with parallelism where possible to hypothesis—it search for a given satellite such as Sv1. A corresponding number of Channel Processors 320 are provided to process the output of the correlators 310, and identify a peak for a given satellite when a locally generated PN sequence is successfully de-spreaded by a correlator, and obtain GPS information from acquired satellites.

Figure 7:
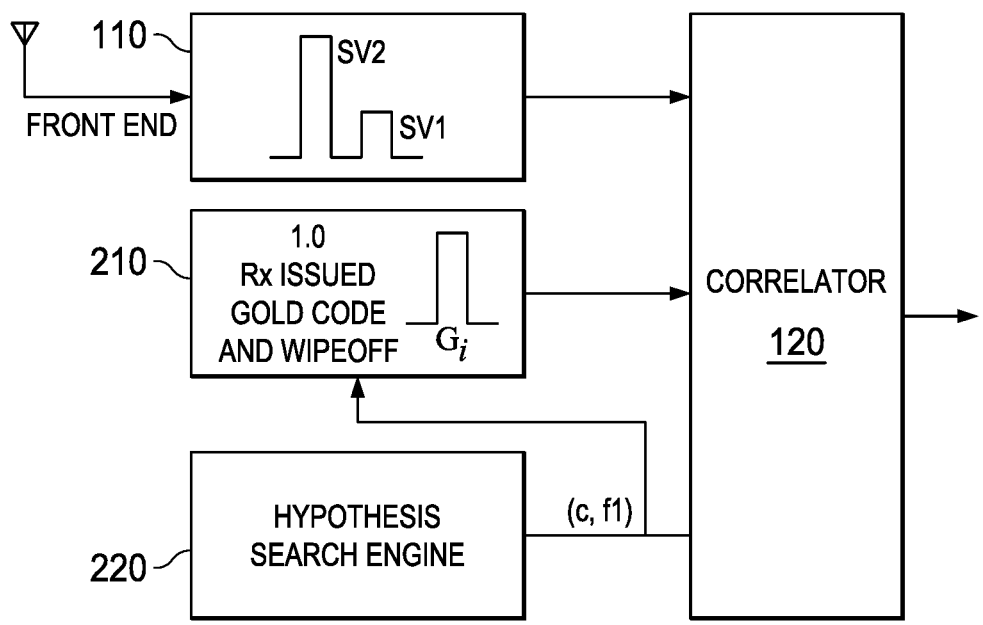
FIG. 7 is a block diagram emphasizing receiver structures pertaining to the hypothesis search of FIG. 6.

In FIG. 6, an hypothesis search space suitably has two dimensions for Doppler and code lag (code phase) for use by the receiver structures and processes in FIGS. 5 and 7. The hypothesis search can be exhaustive of all possible Doppler shift f1 and code lag c, or can be suitably reduced to save time and energy using ephemeris data and/or assisted GPS data from a communications network. The search provides, e.g., numerous correlations each based on a respective given (hypothesized) pair of values of possible Doppler shift f1 and code lag c according to the summation (2):

$$\sum_{n=0}^{1022} P1(n+c) * \exp(j2\pi(f1)t) * r(t) \quad (2)$$

If Sv1 is visible (receivable), r(t) includes a Doppler-shifted Gold code $P1(n+c_1)*\exp(-j2\pi(f1)t)$. Correlation performs a sum of products which cancels or wipes off the Doppler and finds the code lag $c_1$ of the received Gold code from Sv1 for which the correlation is greatest, i.e., at the correlation peak for Sv1 as represented by summation (3) when hypothesized code lag c equals the actual code lag $c_1$ for Sv1.

$$\sum_{n=0}^{1022} P1(n+c_1) * P1(n+c) \quad (3)$$

Figure 8:
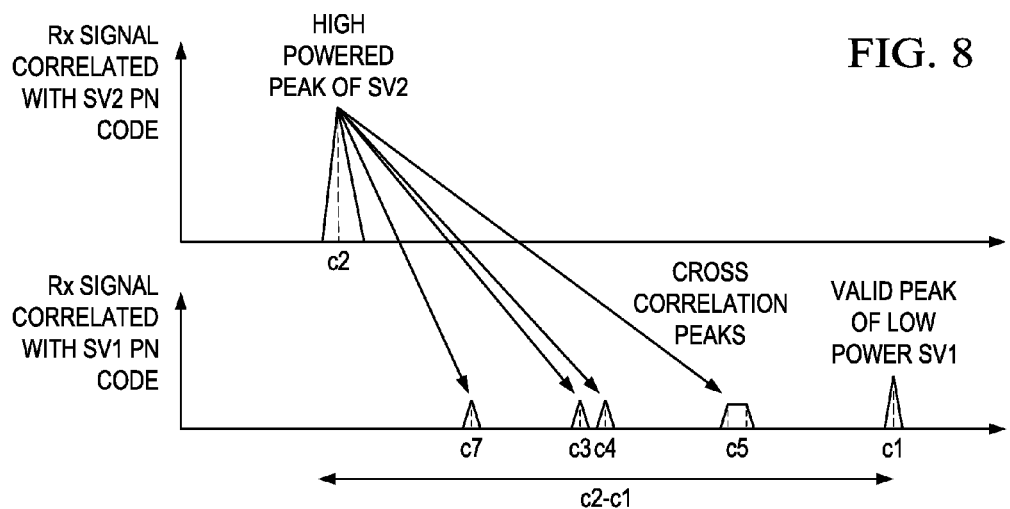
FIG. 8 is a composite graph of correlation output strength versus PN code lag c, depicting peaks for a high-powered and a low powered satellite signal as well as invalid cross correlation peaks that result from correlation in the receiver of FIGS. 2, 5, and 7.

In FIG. 8, peaks for a high-powered signal Sv2 and a low powered signal Sv1 are received, but they are undesirably accompanied by some invalid cross correlation peaks that result from correlation in the receiver 100 of FIGS. 2, 5, and 7. A narrow triangular correlation peak at code lag $c_2$ (or a time t2) represents a receiver Rx 100 and signal correlation with the pseudonoise (PN) code carried by or found in the high power signal from satellite vehicle Sv2. Sv2 sends its satellite ID to the receiver, and the receiver 100 has pre-programmed information identifying the Gold code specific to that satellite ID. The receiver 100 thus performs a signal correlation in its correlator 120 fed from block 210 (FIG. 7) with an internally generated Gold code thus identified. The correlator 120 is also fed with the SV2 received PN code from front end 110. The code lag $c_j$ indicates the difference in receiver time between the time $t_{Rj}$ when the PN code was issued by block 210 and the satellite SVj time $t_j$ when the same PN code was issued, as expressed in Equations (4A) and (4B):

$$c_j = t_{Rj} - t_j \quad (4A)$$

$$c_j + e = (t_{Rj} + e) - t_j \quad (4B)$$

The time t position of the correlation peak is determined by the correlator 120 and provides vital positioning information because the beginning of each 1 ms PN sequence is locked in the satellite to the satellite time base that keeps time $t_j$ and in the receiver to the receiver timebase that keeps time $t_R$. Consequently, the code lag position of the autocorrelation peak at the receiver, which is the desired valid received peak for satellite SVj, is the position that is useful to establish true time $t_{Rj} + e$ in the navigation equations (1). The beginning of each 1 ms PN local sequence (the receiver-provided PN sequence or Gold code) is locked to the receiver timebase, or search-shifted in the hypothesis search a known amount c relative to the receiver time base. The code lag value $c_j$ measured by the correlator amounts to the true time lag that the satellite signal takes to get to the receiver minus the bias e of the time base of the receiver 100 relative to the atomic time base of the system of satellites. Even if a satellite time value is only subsequently decoded from the data sent by the satellite after the valid received peak for that satellite is detected herein, the receiver time base can very accurately measure any time interval value needed to backtrack that satellite time value to, or otherwise provide, a value $t_j$ representing the same instant signified by a receiver time value $t_{Rj}$ for that instant. Then, using the positions of several autocorrelation peaks, such as from four or more satellites, the Position Engine 2270 not only obtains the receiver position ($x_{1R}, x_{2R}, x_{3R}$) but also the bias error e by solving the navigation equations (1). It should be understood that the above discussion relates to one example of many possible alternative GNSS approaches useful in various embodiments herein and helps point out that code lag is intimately related with time, signal propagation delay, and bias error.

In FIG. 8, several narrow triangular correlation peaks at times t1, t3, t4, t5 and t7 (code lags c1, c3, c4, c5, c7) result from the receiver signal correlation with the pseudonoise (PN) code in a lower powered signal from satellite vehicle SV1. One higher intensity peak at t1 is a valid peak for actual satellite SV1, and the lower intensity peaks at t7, t3, t4, t5 represent cross correlation peaks due to cross correlation by the Gold code identified and generated for detecting SV1 by the receiver and cross correlated with the Gold code arriving by reception of the high power signal from SV2. The peak at t5 is wider because the adjacent cross correlation coefficients are large and similar in magnitude.

When a substantial correlation (a peak) is detected in the Search section of FIG. 5, then such peak may represent useful information from the actual SV1. Unfortunately, with a low power signal received from a new satellite SV1 for which the code lag $c_1$ is to be measured, confusion can arise because of cross correlation of the Gold code P1 fed to the correlator to search for SV1 with the Gold code P2 arriving on the high power signal from SV2. Furthermore, the Doppler wipe-off for SV1 to be detected leaves, in general, a relative Doppler function with a Doppler difference frequency f2-f1 impressed on the SV2 Gold code cross-correlation. In other words, spurious peaks due to cross correlation with one or more high power signals from satellites such as SV2 can exist. Embodiments including cross-correlation mitigation hardware Xcorr 400 to estimate and help mitigate this cross correlation in the Search section are described herein.

Figure 25:
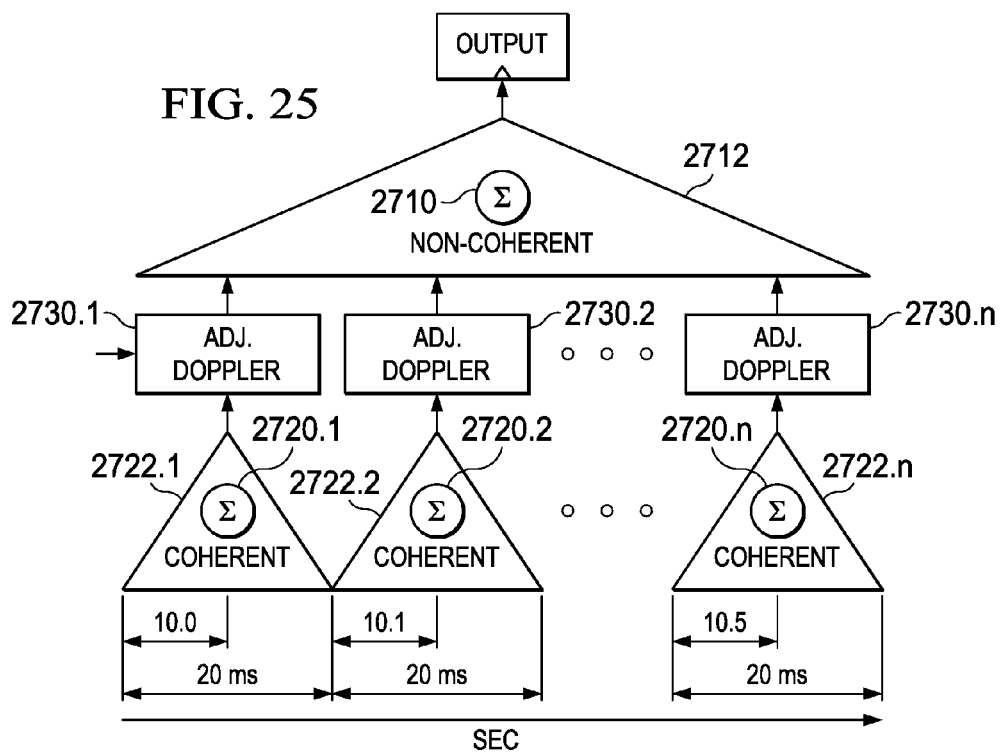
FIG. 25 is a block diagram of a set of coherent summing processes, Doppler adjustments over time to them, and a noncoherent summing process for an inventive AD (accumulate and dump) receiver of FIGS. 2, 5, 11 and other Figures.

In FIG. 5, de-spreaded modulation is coherently accumulated and dumped to memory 325 to increase the signal to noise ratio, see also FIG. 25. A block of memory 325 in FIG. 5 provides a number of memory sections for each of the Channel Processors 320 and for noncoherent summation results. In this way, the cumulated information from coherent and noncoherent summation is recorded and maintained. A hardware counter block 350 counts chips and/or cycles and together with blocks 375 and 380 keeps time $t_R$ for receiver 100. ("Chips" depending on the context means or is related to PN spreading sequence bits as in FIG. 3B, or to amount of code lag in FIG. 10. The meaning is thus distinct from that of chip as an integrated circuit chip such as in FIGS. 36-39.) Also, counter block 350 includes counters and registers and associated circuitry for configuring and establishing power management duty cycles as described in the incorporated patent application 12/244,060.

Further in FIG. 5, the baseband converter 335 in digital front end 2230 of FIG. 38 provides an output to a Tracking section that has a set of Tracking DLL channels 330 that in turn supply output to a DLL postprocessor 340. These channels are delay lock loop SV peak tracking channels to accommodate an at-least-adequate number of satellites for the receiving purposes. The Tracking section handles SV signals that have been successfully searched by the Search section. The Tracking section can also have its own correlators in Tracking DLL channels 330 that are optimized to deliver a smaller number of hypothesized pairs of values of possible Doppler shift f1 and code lag $c_1$ to apply to the correlators in the Tracking section according to the summation Equation (1). The DLLs compute or keep track of peaks to track the time delay or code lag $c_2$ of the PN sequence for each given already-acquired low power SV1 signal and high power SV2 signal and in the process can track Doppler for each such SV. Frequency lock loop(s) (FLL) are also suitably provided to get a more accurate estimate of the Doppler frequency by locking onto each available Doppler shifted satellite carrier signal and determining Doppler shift D and time-differenced Doppler $\Delta D$ (delta-D) for each satellite that is acquired.

In FIG. 5, the Tracking section is also subject to cross-correlation peaks between SV1 and SV2 being confused with actual lower power SV1 to be tracked. When a substantial correlation (a peak) is detected in the Tracking section, then this peak may represent useful information from the actual SV1. Unfortunately, with a low power signal received from a satellite SV1 for which the code lag $c_1$ is to be measured, confusion can arise because of cross correlation of the Gold code P1 fed to the correlator to search for SV1 with the Gold code P2 arriving on the high power signal from SV2. The tracking DLL might undesirably lock onto the cross correlation peak or lobe. Embodiments such as cross-correlation mitigation hardware Xcorr 400 to mitigate this cross correlation in the Tracking section as well are discussed elsewhere herein. Notice that cross-correlation mitigation hardware Xcorr 400 can have a single block or separate blocks to support the Search section and Tracking section respectively, and any block can have parallel subblocks to support concurrent calls for electronic computation or a series of calls that are so close in time to one another as to justify the parallel subblocks to support the computations involved. In tracking, scenario changes with time. That is Doppler difference, code lag difference and SV receive powers change with time. Hence SV1 may not be affected by cross correlation at one point in time and is affected later on.

In a system aspect of FIG. 5, a system bus 360 couples the block 120 for Search/Tracking to a microprocessor MPU 370 and its associated memory RAM and ROM. The system also has a clock calibration block 375 including a reference time counter and a GPS clock counter; and a time maintenance block 380, and a real-time clock counter 385. Communications peripherals 390 include first and second UARTs (parallel to serial interfaces also known as universal asynchronous receiver transmitter), a serial I2C interface and a sensor interface using serial I2C. The sensor interface suitably includes tilt sensors and/or accelerometer sensors for providing data by which MPU 370 computes or augments GPS phase-tracking estimation of user kinematics. A PPS pulse-per-second generator 395 is further connected via system bus 360 with MPU 370 and establishes precise one-second intervals.

In FIGS. 2, 5, 11 and 20, the receiver 100 has front end 110 that receives signals of different signal strengths and the signals are modulated with respective pseudorandom noise (PN) codes. Front end 110 and a correlator circuit 120 are operated to receive any suitable signals such as satellite positioning system signals, pseudolite and/or satellite positioning system signals, code division multiple access CDMA signals, and spread spectrum signals. The correlator circuit 120 is coupled to front end 110 and correlates the received signals with a selectable locally-issued PN code to produce a valid received peak, such as a higher power peak for SV2. However, the correlator circuit 120 is subject to cross correlation that produces cross correlation peaks when it correlates the received signals with another selectable locally-issued PN code for SV1. A cross correlation circuit such as the combination of microprocessor 370 and cross-correlation mitigation hardware Xcorr 400 operates to generate a variable comparison value or threshold Th related to the cross correlation Xcorr_coeff as a function of both a relative Doppler shift f1-f2 and a relative code lag c1-c2. The cross correlation circuit uses the variable comparison value Th to reject one or more cross correlation peaks and pass a valid received peak.

In some embodiments, programmable microprocessor 370 is coupled to configure cross-correlation mitigation hardware Xcorr 400. Microprocessor 370 acts as an example of a supervising processor, a controller, a control circuit or the like in its communications with and utilization of the Search and Tracking correlator channels and DLLs in FIG. 5 and the cross-correlation mitigation hardware Xcorr 400 in FIGS. 5, 11, and 20. Various embodiments can have a programmable microprocessor and/or control hardware in various forms to accomplish the operations described herein. Cross-correlation mitigation hardware Xcorr 400 generates a cross correlation value Xcorr_coeff when called by microprocessor 370. Microprocessor 370 then generates the variable comparison value based on the cross correlation value from hardware 400. Correlator 120 has multiple channels and the cross correlation circuit includes a controller for the correlator circuit. The controller rejects and passes peaks for applicable channels based on generating the variable comparison values. Microprocessor 370 in some embodiments is used to do controller functions, and in other embodiments a separate controller is provided.

The partitioning or implementation of the blocks is established different ways in various embodiments. In some of them, the correlator 120 is controllable and operates to find a high-power peak and its code lag and Doppler using one locally-issued PN code and to seek a given lower power peak using another locally-issued PN code with associated code lag and associated Doppler. Correlator 120 in some embodiments interrogates the cross correlation circuit with a relative Doppler representing the difference of the Doppler of the high-power peak and the associated Doppler and with a relative code lag representing the difference of the code lag of the high-power peak and the associated code lag. In response to the cross correlation circuit based on the variable comparison value, the correlator 120 either passes the given lower power peak or rejects the given lower power peak and seeks another lower power peak.

Signal strength is considered in more detail by further reference to FIGS. 3A, 3B and 3C. GPS satellites transmit CDMA signals each with a different and intended PN pseudo-noise sequence having a 1 ms repetition period, and with data modulated on top of the PN sequence at a rate of 50 Hz. Each data bit is transmitted 20 times in 20 ms. For example, in FIG. 3A and FIG. 3C, a data bit A is modulated on a 1 ms PN signal repeated 20 times, followed by a data bit B similarly repeated. Unintended noise (not shown, like wireless noise arriving in the propagation path, spread spectrum crosstalk, and receiver thermal noise) is impressed upon the signal in FIGS. 3B and 3C. This unintended noise is what is referred to as the "noise" in the metric of signal to noise ratio SNR.

The SNR is boosted by 13 dB (decibels) by adding the 20 repetitions of the signal coherently. $10 \log_{10}(20) = 13$ dB, as discussed in the incorporated application 12/244,060. Coherent accumulation adds the signal arithmetically with number of repetitions while noise, being statistical, accumulates in rms (root-mean-square) value more slowly as the square root of the number of repetitions so that SNR is boosted.

If the correlators 120 associated with Measurement Engine 2260 are arranged to deliver their output at a rate of 1 Hz in FIGS. 5 and 25, the SNR can be boosted by an additional 15 dB by non-coherently adding or accumulating the repetitions of the GPS signal within a dwell time, such as a one second interval, as shown in FIG. 25. The total SNR boost may be 28 dB (13 dB coherent+15 dB noncoherent) A receiver that coherently adds 20 repetitions of the signal, and then non-coherently adds or accumulates 50 signal repetitions represented in the 50 coherent summations (20 each), is denoted as a (20, 50) receiver. The dB number for non-coherent accumulation is an example scenario. Sensitivity gain because of non-coherent accumulation depends on squaring loss which in turn depends on original coherent SNR. Various types of receiver uses several different combinations of coherent and non coherent integration. (20,50) is one example. Coherent and noncoherent summations are also discussed in further detail in the incorporated patent application 12/244,060 in connection with numerous power saving modes.

The +/−1 data from a coherent summation x is demodulated by a threshold function such as SIGN(x). Note that an estimate of the data is extracted from the coherent accumulation of the received signal, during all or some subset of the repetitions of the same data symbol on received signal $r_i$. The bit error rate for this data demodulation is discussed in connection with FIG. 8A of the incorporated patent application 12/244,060.

If the receiver is switched off, such as for power management and power savings, the receiver 100 accounts for the time it was switched off in order to track the signal dynamics, as discussed in the incorporated patent applications 12/244,060 and 11/844,006. Improved cross correlation mitigation processes, circuits and systems are provided herein and are compatible and combinable with power management as improved herein to address the stringent power and battery life demands of mobile devices and similar considerations and constraints in other portable and fixed applications.

Some embodiments called Mechanisms are described herein to solve cross correlation problems and other problems. The Mechanisms are provided for mitigation, detection, discrimination, identification or rejection of cross correlation in GPS receivers during acquisition and tracking with the aid of qualitatively improved hardware and/or software. These Mechanisms facilitate detection by searching, and acquisition and identification and tracking of more satellites more of the time when such satellites provide lower power satellite signals that hitherto had been more difficult to identify as valid or not. The positioning receiver 100 searches for signal from Satellite Vehicle SV1 and finds a lower power correlation peak at code phase c1 and Doppler f1, and the receiver has already detected a higher power peak from another Satellite Vehicle SV2 at code phase c2 and Doppler f2. Code phase or code lag is the difference in time between the beginning of the 1 ms PN receiver issued Gold code for the SV and the beginning of the satellite-originated Gold code riding on that SV carrier. Relative code phase φ is the difference between the code phases for a pair of SVs such as SV2 and SV1 so that φ=c2−c1. Numerically, for instance, if the code phase $c_1$ for SV1 is 100 chips and the code phase $c_2$ for SV2 is 7 chips, then the relative code phase φ is −93 chips. In general, code phase is a fractional number obtained after interpolation. For example, it can be 100.22 chips, 7.89 and −92.33 chips in the example.

The problem of cross correlation is now discussed further and remarkable solutions or embodiments are further described in detail. The PN-codes used by GPS satellites do not offer sufficient protection against cross correlation. In GPS, for example, the worst-case cross correlation coefficient turns out to be 21 dB, as discussed elsewhere herein. Unfortunately, that worst-case cross correlation coefficient is smaller in magnitude than the dynamic range of receive satellite powers in GPS, which is as high as 38 dB (i.e., the difference between −125 dBm and −163 dBm). In other words, an undesirable cross correlation peak generated by the receiver itself due to cross correlation between higher and lower power satellite signals can be sufficiently strong to lie within that dynamic range. The presence of a higher powered signal from a satellite SV2 can cause detection of a false peak that is not the lower power signal from another SV1 because of a large cross correlation coefficient. This problem happens only when the high-powered SV Doppler is close to an integer KHz-multiple (0, +1−1, +/−2, . . . ) away from the Doppler at which the low power SV is searched. The problem is inherent because of the underlying periodicity of PN code, which has a one millisecond (1 ms) period in GPS. False detection of a satellite SV1 can lead to huge position errors in an unimproved satellite receiver. Various embodiments disclosed here provide significantly improved cross correlation mitigation and/or qualitatively improved discrimination that on the one hand identifies and passes true lower power peaks and on the other hand rejects false cross correlation peaks and lower power peaks corrupted by sufficient cross correlation.

One type of embodiment (Mechanism 1) searches for or tracks a low power peak and during such searching or tracking electronically computes an estimated cross correlation coefficient that could arise in the receiver due to interference with an already-acquired higher power peak. The low power peak might be from a real satellite vehicle SV1 or might merely be a cross correlation peak that is invalid for position determination purposes. The embodiment electronically compares each actual low power peak with the estimated cross correlation coefficient, or with a threshold value computed as a function of such coefficient. If the actual low power peak is the larger amount in comparison, then that actual low power peak is identified as a valid peak from a satellite such as SV1. The estimated cross correlation coefficient or threshold based thereon is a dynamic, less pessimistic measure than a static threshold parameter would be. The electronic comparison ensures that the low power peak is from a real satellite vehicle SV1 from which positioning measurements derived from the lower power peak by the receiver would be valid and not merely an undesirable artifact of cross correlation in the receiver.

Figure 11A:
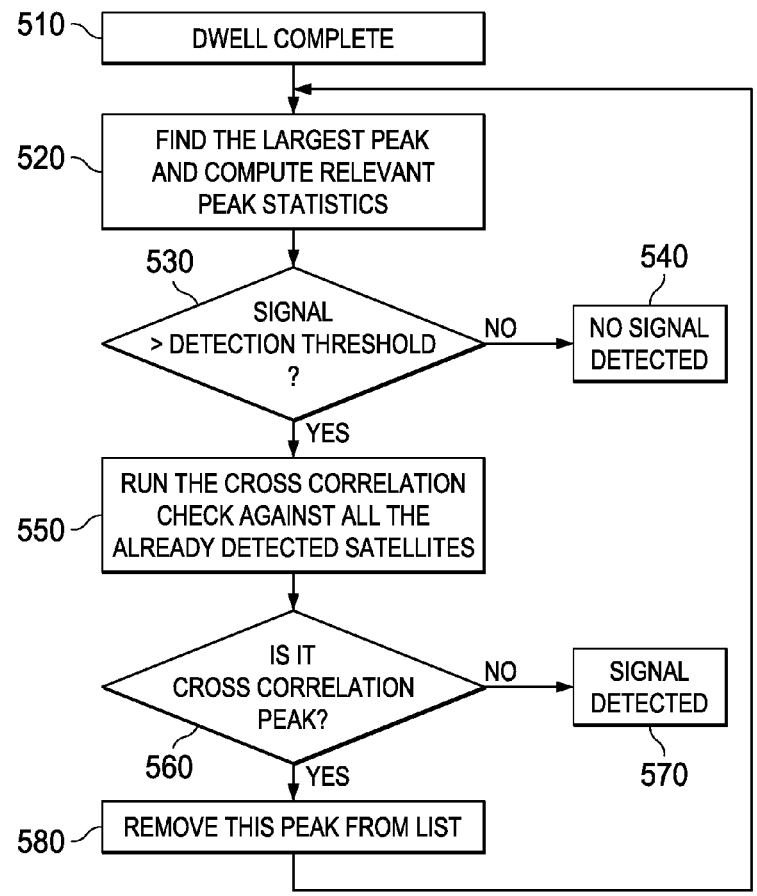
FIG. 11A is a dwell processing flow diagram of an inventive process for checking whether a peak is a true peak or a cross correlation peak, with the process suitably performed in the structures of FIG. 11.
Figure 11:
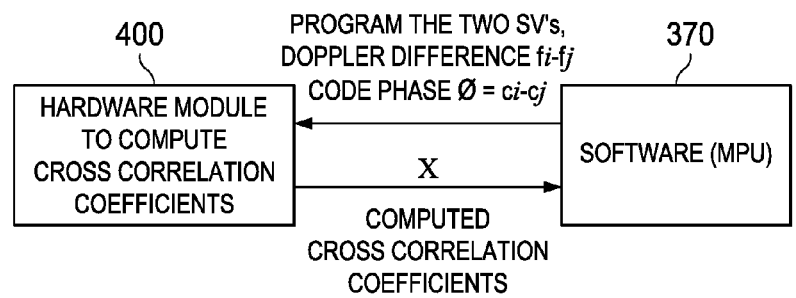
FIG. 11 is a block diagram emphasizing inventive receiver structures in FIGS. 5 and 20 wherein a control microprocessor has software that calls for electronic computation or estimation of one or more cross correlation coefficients of FIG. 10 from a dedicated hardware module.
Figure 16:
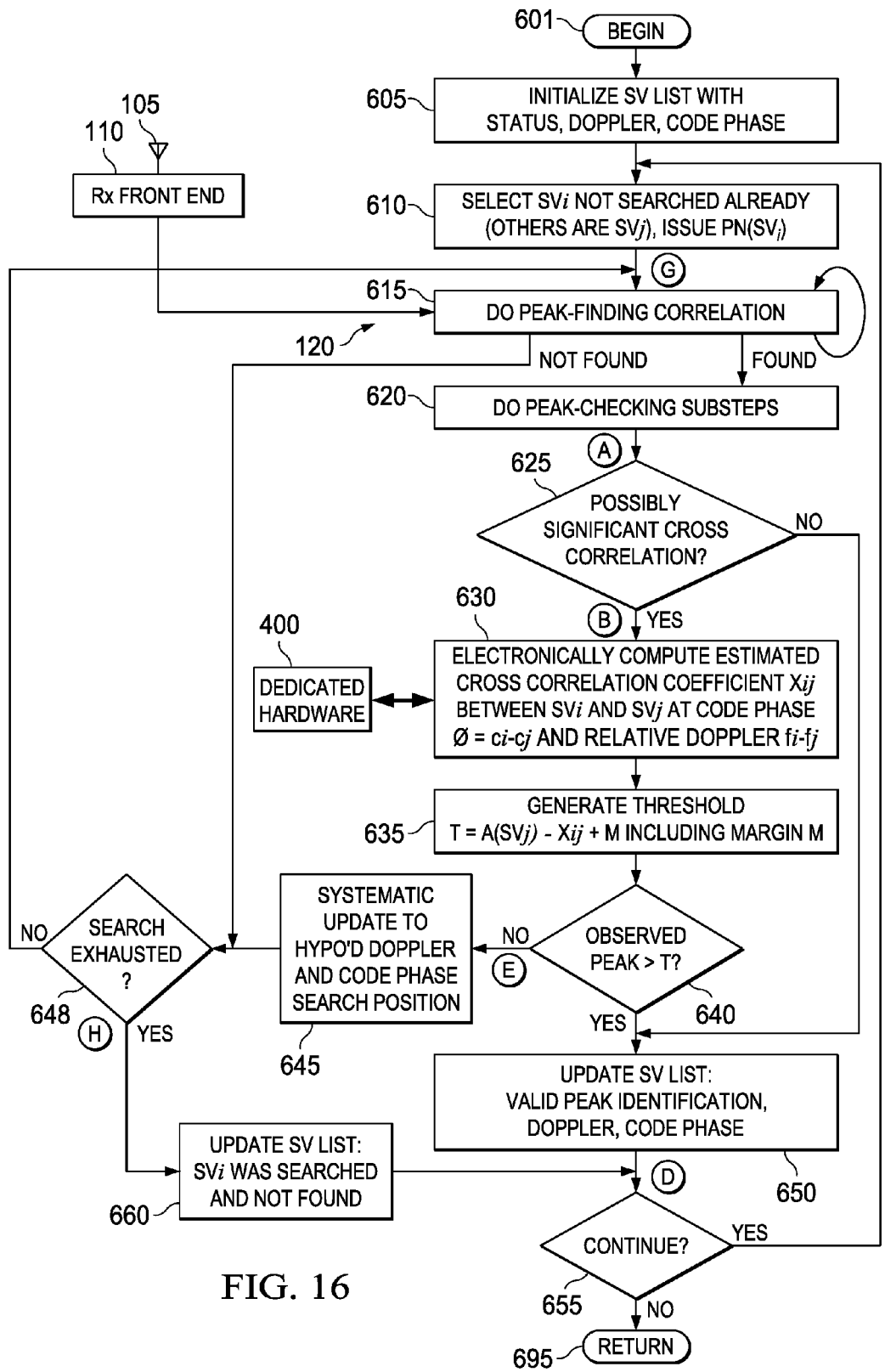
FIG. 16 is a flow diagram of another inventive process (Mechanism 1) for qualifying a peak as a true peak, with the process suitably performed in the structures of FIGS. 5, 11 and 20.
Figure 20:
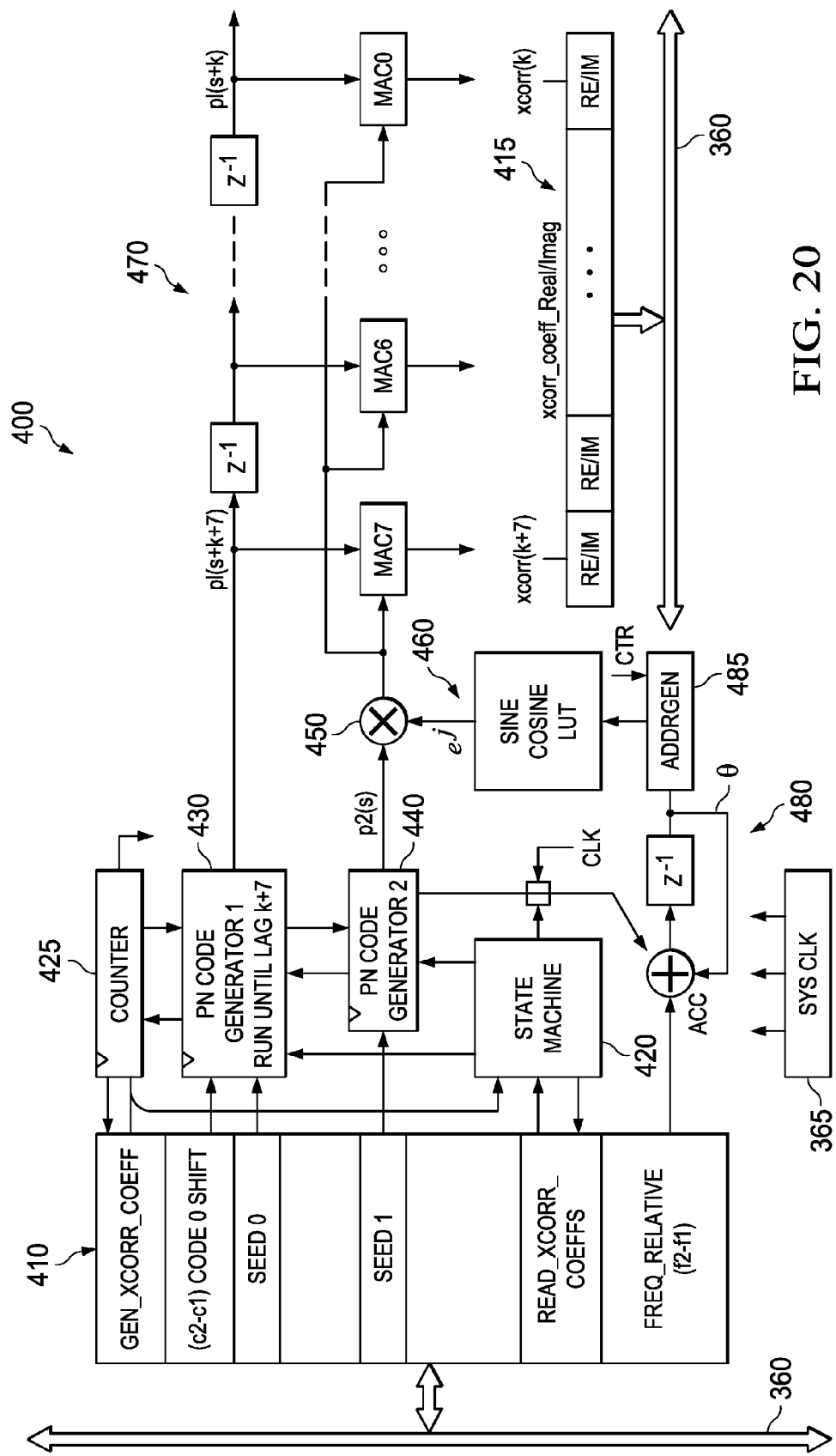
FIG. 20 is a block diagram of an inventive dedicated hardware module or structure for FIGS. 5 and 11 and other Figures to electronically compute one or more estimated cross correlation coefficients in response to a request issued by software, hardware, or firmware.

In FIGS. 11, 16 and 20, among other Figures, structure and process embodiments for implementing Mechanism 1 herein compute the cross correlation coefficient between the two PN codes of SV1 and SV2 at the relative carrier Doppler f1-f2 and at the relative peak location $c_1-c_2$ between the low-power peak and the high power peak. Mechanism 1 uses this computed cross correlation coefficient to qualify and determine whether a low-power peak thus electronically analyzed is a cross correlation peak or not. Instead of a fixed threshold (18 dB), Mechanism 1 uses a dynamic threshold based on the actual cross correlation coefficient of the two SVs and indeed does the cross correlation check against all high powered SV's detected, as described further herein. In this way, various Mechanism 1 embodiments provide and confer a significant improvement over a conservative approach that simply assumes a worst-case cross correlation coefficient. This Mechanism 1 type of solution provides embodiments to compute cross-correlation coefficient between two PN codes at specific relative code lag and relative Doppler. An efficient implementation is suitably established in hardware; however, a mixed firmware or software embodiment is also feasible. Also, mixed embodiments of processor software and co-processing hardware combinations are contemplated as in FIG. 11.

Another type of embodiment (designated Mechanism 2 Way 2) monitors for an event of a cross correlation peak smearing the low power peak (FIGS. 24, 26, 28A, 29A. The magnitude of such smearing is suitably also electronically computed or estimated beforehand for detection purposes and, if the cross correlation is excessive, the measurements or information in the lower power peak are rejected. Mechanism 2 recognizes that a cross-correlation peak can smear or substantially widen the lower power peak, corrupting the information in the lower power peak and rendering the measurements it represents useless. The magnitude of the cross correlation is a dynamic, less pessimistic measure of the amount of the undesirable smearing. Suppose a low power correlation peak is found at code phase c1 for Satellite SV1, Doppler f1, and the receiver already detected a high power peak from another SV2 at code phase c2, Doppler f2. Such a Mechanism herein computes an estimated cross correlation coefficient at code phase difference c1–c2 at Doppler difference f1–f2 using a dedicated hardware unit and then compares the estimated cross correlation coefficient with the actual low power peak to judge whether the low power peak is a cross correlation peak or not. Also, during tracking of the low power peak the cross correlation coefficient is also computed in some embodiments to ensure that the measurements are valid. In the event of a cross correlation peak smearing the low power peak, this can be calculated beforehand and the measurements rejected.

The positioning receiver according to embodiments as described herein is made more efficient or effective and qualitatively more accurate in distinguishing cross correlation peaks from valid low power peaks. Such receiver embodiments are less undesirably conservative than existing solutions without sacrificing the ability to identify and reject lower power peaks that are undesirable cross correlation peaks and pass, identify or select valid uncorrupted lower power peaks. Implementing any one or more of the receiver embodiments or Mechanisms advantageously helps the positioning receiver to avoid rejecting valid low power signals from satellites and hence improves position accuracy in tough, difficult and challenging dynamic range scenarios faced by a GPS receiver.

Figure 23:
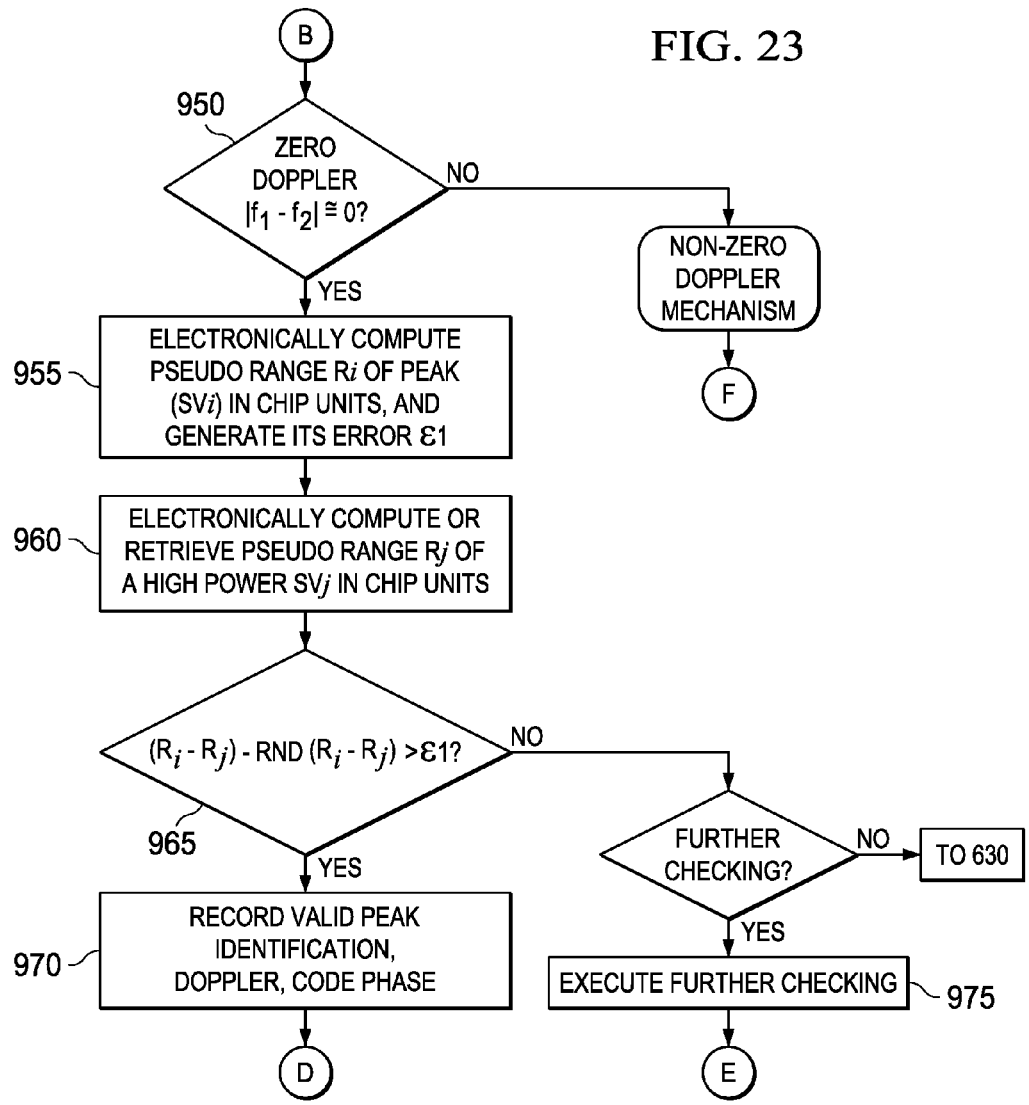
FIG. 23 is a flow diagram of another inventive process (Mechanism 3) for qualifying a peak as a true peak using a test of integer-chips-away from a higher power peak where the cross correlation peak will be a smeared peak if Doppler difference is larger, with the process shown as either an alternative or supplement to a portion of FIG. 16 and suitably performed in the structures and flows of FIGS. 5 and 11 and other Figures.

Another type of structure and process embodiments or solutions are designated Mechanism 3 (FIG. 23). Mechanism 3 uses the fact that for a zero Doppler difference, the location of a cross correlation peak obtained from a high-powered SV2 is located integer chips away from the actual correlation peak of the high-powered SV2. "Integer chips away" means that the code phase $\phi$ at which the cross correlation is maximum is an integer number of chips or chip periods 1 sec/(1.023e6), or quite close to an integer chip away. The reason that the cross correlation peak is located integer chips away is because if that peak were not integer chips away, the cross correlation would be less than the peak value where many chips match each other and at which the maximum cross correlation occurs. Also, because of the orthogonality of PN codes, the cross correlation is zero when the code phase $\phi$ is zero, i.e., when the PN codes are zero chips away from each other. Such integer location also happens because the cross correlation peak is obtained inherently from the same received pulse shape as the high-power signal. For example, GPS uses close to a rectangular pulse shape. Mechanism 3 accepts a low power SV1 measurement as valid if it is not close to an integer chip away from a high power SV2 measurement. A similar phenomenon happens for non-zero Doppler difference as well and is also detectable by Mechanism 3 embodiments (FIG. 23).

Various ones of these embodiments, and other embodiments herein, advantageously improve continuous tracking of low power SVs like SV1 in the presence of high power SVs like SV2. In difficult urban canyon conditions, it is important to track any or all low-power visible SVs from which useful measurement information can be acquired in the presence of any one or a few high-power signals from SVs that may be present and from which measurement information is also acquired. Providing valid measurement information from as many SVs as possible is desirable to improve the accuracy of physical position determination.

With very low computational complexity, various embodiments advantageously compute these cross correlation coefficients for improved detection of low-power peaks. The computation is readily performed at very low rates (on the order of one second) corresponding to the one-second rate in GPS. Moreover, computing the cross correlation coefficients in hardware is easy, and the hardware module complexity is low. Indeed, the real estate area for such a hardware module can be on the order of 15 K gates or less.

Such Mechanisms can significantly improve cross correlation rejection capabilities and thereby enable the GPS receiver to have better performance in tough scenarios, like urban canyon where dynamic range is high and the visibility of number of satellites is low. Such Mechanisms also enable the GPS receiver to have better performance than conservative cross correlation approaches would have in standards compliance tests, such as in the 3GPP Dynamic Range Test as described later hereinbelow and also other lab tests that test dynamic range capability. Cross-correlation mitigation techniques that can do well on such tests are important care-abouts to system manufacturers. Ultimate users can benefit from these Mechanism embodiments because such embodiments can improve the user experience and more reliably provide them with vital positioning information.

Figure 12:
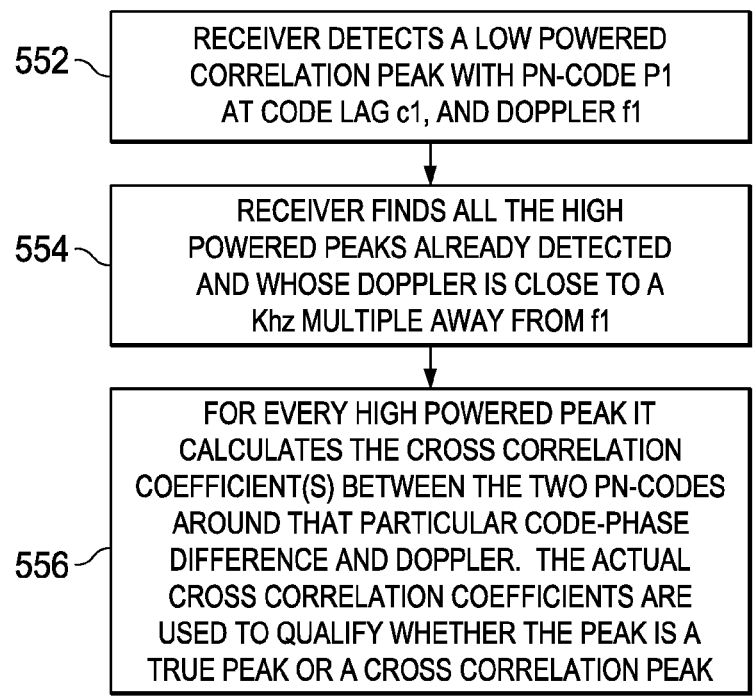
FIG. 12 is a flow diagram of another inventive process for qualifying a peak as a true peak or an invalid peak, with the process suitably performed in the structures of FIG. 11.

Some embodiments involve a receiver integrated circuit chip and/or system to improve the performance of GPS reception. Such embodiments can desirably also avoid false locks on the cross correlation peaks from stronger existing satellites SV2 when a positioning receiver is subsequently looking in the Search process or Tracking process for additional satellites SV1 that have lower power signals. Moreover, such embodiments can alternatively or additionally avoid false locks on the cross correlation peaks from a subsequently-acquired stronger existing satellite Sv2 when a positioning receiver is currently tracking in the Tracking process already-acquired satellites like Sv1 that have lower power signals. As noted hereinabove, current approaches and algorithms are too pessimistic. Hence, one type of embodiment provides an adaptive process or hardware that computes cross correlation estimates for the existing satellites and uses those cross correlation estimates to change the threshold under which the additional or new satellites are accepted or rejected. In FIGS. 11 and 12, the cross-correlation coefficients are either calculated by software itself or preferably through a dedicated hardware module.

Each satellite SVx has its unique PN code, and the receiver is preprogrammed with information identifying the PN code that each satellite SVx transmits. PN codes are derived from Gold Codes to have better cross correlation properties. A total of around 32 satellites are used in GPS. The satellites transmit a sequence of bits that is repeated every 20 ms, but by negating the PN-code as in FIG. 3C, similar to CDMA (Code Division Multiple Access). The receiver searches for presence of these PN codes through correlation as in FIGS. 6 and 7. The code phase location, or $\phi$ value, at which a correlation peak is found has the information about the transmission delay between satellite and receiver. This information is used for positioning.

In GPS, each satellite (SV) repeatedly transmits 1 ms long, 1023 length PN-code at a carrier of 1.57542 Ghz. 1023 long PN-code is a sequence of +1/−1's called chips. Chip Rate is 1.023 Mhz (1023 chips per millisecond). The pulse shape used is close to a rectangular pulse in the time domain and has a functional shape known as a Sinc shape that undulates in the frequency domain. Approximately 10 lobes or undulations of Sinc in the range [−10*1.023 Mhz, 10*1.023 Mhz] are transmitted by an SV.

High frequencies, in the sense of Chip rate and number of lobes, provide more precise or better timing information and thus better positioning information. Receivers in general will see a Doppler shift in received satellite signals because of satellite motion, user device motion and Receiver clock offset. Doppler shifts due to satellite motion can be in the range [−6 KHz, 6 KHz].

Receivers search across Doppler shifts to detect presence of signal and thereby acquire an SV, or might acquire a false peak due to cross correlation instead. As pointed out hereinabove, the presence of a high powered Sv2 satellite can cause a false detection of another satellite Sv1 with low power because of large cross correlation coefficients. Among basic properties of GPS PN-codes are that for these PN-codes (Gold codes) the cross correlation coefficient takes only four values 0, 1, 63 or 65 over all the 1023 various possible values $\phi$ of code phase. It takes only these four values for zero Doppler difference. For non zero Doppler difference it can take any value in the range 0-90 roughly. Dozens of values $\phi$ of code phase may exist among 1023 possible such values for which the cross correlation coefficients are significant in magnitude.

The correlation of a Gold code with itself is 1023

$$\left(\text{i.e.,} \sum_{i=0}^{1022} (1, -1)^{\wedge}2 \text{ regardless of the sequence of } +1\text{'s and } -1\text{'s}\right).$$

Accordingly, in decibels, the worst case cross correlation coefficient between GPS SVs with zero relative Doppler between them is −23.94 db (i.e., 20*log 10(65/1023)).

Since the Doppler shift of each SV is in the range [−6 KHz, 6 KHz], the relative Doppler shift between SVs as a practical matter lies in the magnitude range of [0, 13 KHz] i.e., f1-f2 can have any value in the range [−13 KHz, 13 KHz]. Relative Doppler shifts (also called Doppler difference) close to multiples of one Khz present a cross correlation interference problem. Consider a receiver correlator channel searching for satellite Sv1 that has PN code P1(n), and SV1 has a Doppler shift f1; and also a high powered Sv2 is present with a Doppler shift f2. Then (with wipeoff for f1) the correlator channel sees a new PN code which involves Sv2's distinct PN code P2(n) of Equation (4) rotated by the Doppler difference (f2-f1) as represented by Equation (5). Hence cross correlation properties of Sv1's PN code of Equation (6) with rotated Sv2's PN code now come into play as in Equation (7).

$$SV2\_PN\_code = \sum_{n=0}^{1022} [P2(n) * rect[(t - nT_s)/T_s]] \quad (4)$$

$$SV2\_PN\_code\_rot = \quad (5)$$
$$\sum_{n=0}^{1022} [P2(n) * rect[(t - nT_s)/T_s] * \exp(j2\pi(f2 - f1)t)]$$

The Gold code for Sv2 is represented by P2(n) and for Sv1 by P1(n). The chip number n lies in the range [0:1022]. The rectangular function rect[ ] is unity for argument range [0:1] and is zero outside that range [0:1]. The time variable is t. $T_s$ represents chipping period which is 1e-3/1023 sec in GPS. The product P2(n)*rect[t−$nT_s$]/$T_s$] is a function of time t that represents a one-chip wide nth segment displaced from time t=0 by an amount $nT_s$, and zero elsewhere. Such nth segment has a height +1 or −1 specified by P2(n). The summation $$\sum_{n=0}^{1022}$$

effectively assembles all 1023 such segments into a composite function of time over 1023 chips. The code phase $\phi$ of the Sv1 PN code is relative to the Sv2 PN code.

$$SV1\_PN\_code = \sum_{n=0}^{1022} [P1(n + \phi) * rect[(t - nT_s)/T_s]] \quad (6)$$

The cross correlation between Sv1 and Sv2 at this specific lag $\phi$ is expressed by summation of products:

$$\sum_{n=0}^{1022} (SV1\_PN\_code * SV2\_PN\_code\_rot) \quad (7)$$

Substituting into Equation (7) from Equations (6) and (5) yields Equation (8)

$$\sum_{n=0}^{1022} (P1(n + \phi) * rect[(t - nT_s)/T_s] * \quad (8)$$
$$P2(n) * rect[(t - nT_s)/T_s] * \exp(j2\pi(f2 - f1)t))$$

Equation (8) simplifies to Equation (9):

$$\sum_{n=0}^{1022} (P1(n + \phi) * P2(n) * rect[(t - nT_s)/T_s] * \exp(j2\pi(f2 - f1)t)) \quad (9)$$

Notice in Equation (9) that the expression P1(n+$\phi$)* P2(n)*rect[(t−$nT_s$)/$T_s$] as summed represents the cross correlation between the Gold codes for Sv1 and Sv2, at zero relative Doppler, with code phase between those codes included. The entire summation of Equation (9), however, is somewhat complicated by the relative Doppler function exp(j2π(f2-f1)t) if relative Doppler (f2-f1) is non-zero. Some of the embodiments use hardware block 400 to electronically swiftly return a signal representing a value equal to the magnitude of this complex summation or otherwise instantiate a computation using this complex summation directly or as a loop kernel.

Notice that no phase is shown riding on the exp( ) function in Equations (5), (8) and (9). If a phase is included with the Doppler difference function, it merely amounts to a complex constant factor with unity magnitude. The threshold calculation of magnitude is therefore unaffected for cross correlation mitigation as described herein, and so such a phase is ignored.

Coherently integrated cross correlation between Sv1 and Sv2 is expressed by summing over the 20 repeated 1 ms GPS intervals:

$$\sum_{k=1ms}^{20ms} \sum_{n=0}^{1022} (SV1\_PN\_code * SV2\_PN\_code\_rot) \quad (10)$$

Substituting into Equation (10) from Equations (6) and (5) yields coherently integrated Equation (11):

$$\sum_{k=1ms}^{20ms} \sum_{n=0}^{1022} (P1(n+\phi) * P2(n) * rect[(t-nT_s)/T_s] * \exp(j2\pi(f2-f1)t)) \quad (11)$$

Cross correlation properties include properties relating to the 0, +/−1 Khz, or multiple of +/−1 Khz, relative Doppler. The positioning receiver 100 employs one or more correlators as in FIG. 5 that perform coherent integration represented by Equation (10) to generate correlations for 20 ms. In electronic operations represented by Equation (10), a correlation over 1023 chips in one millisecond is performed and the correlator outputs separated by 1 ms are added up to cover the integration period (e.g., 20 ms). If the Doppler difference (f2−f1) is not close to an integer multiple (0, +/−1, +/−2, . . . ) of 1 Khz, then the twenty 1 ms cross correlation outputs will add up destructively and produce a negligible output. For one simple example, if the Doppler difference is 0.5 Khz (2 ms period), then the cross correlation exactly cancels out in 2 ms because the Equation (11) exponential function exp( ) in the second 1 ms is opposite in sign to the exp( ) function in the first 1 ms, and the coherent integration adds up their opposite signed contributions to equal zero. If the Doppler difference is an integer (0, +/−1, +/−2, . . . ) multiple of 1 Khz, there is no such cancellation during the coherent integration, because the exp( ) function in each 1 ms time segment has the same sign and the coherent integration adds up the 1 ms contributions constructively. Thus a not-insubstantial cross correlation peak can occur at certain values of code phase ϕ. Cross correlation of PN codes when Doppler difference is any integer multiple of 1 Khz effectively generates a completely different PN-code. If the receiver as allowed to respond to the cross correlation peak is if it were a valid Sv1 peak, the receiver can produce time of arrival or pseudorange information that is merely an artifact and useless and erroneous for positioning purposes.

Figure 9:
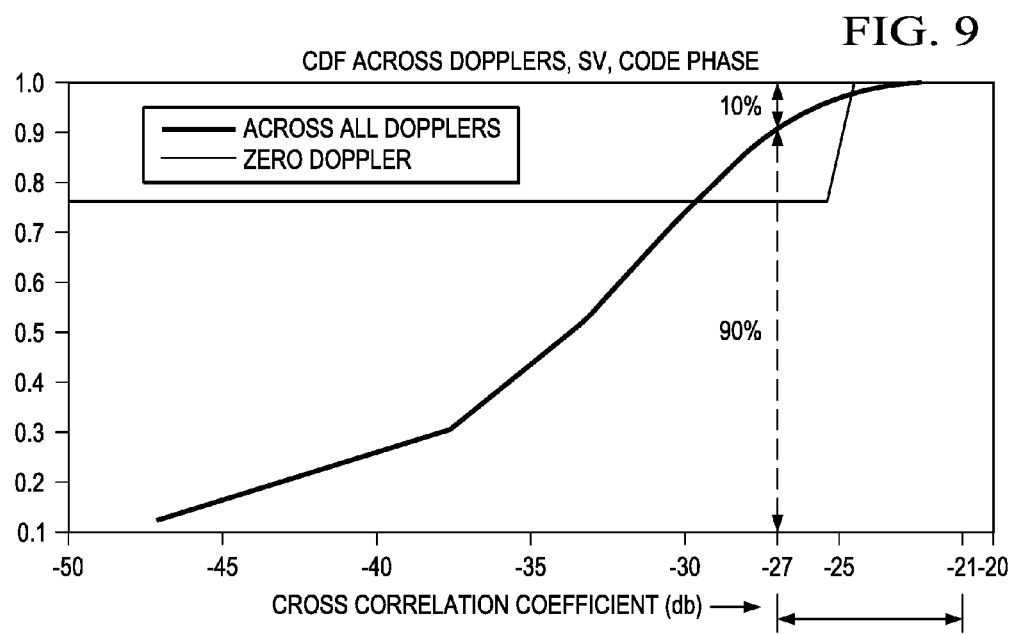
FIG. 9 is a graph of cumulative probability density as a function of amplitude in db of cross correlation coefficients arising across Doppler differences, PN codes of satellites, and code phases.

FIG. 9 shows, further as to cross correlation properties, all the possible cross correlation coefficients—across SVs (i.e., across their respective Gold codes), across Doppler differences f2−f1 that are integer multiples of 1 Khz, and across code-phases ϕ—calculated from data obtained through simulation. Worst case cross correlation coefficient is −21.08 db (i.e., 20*log 10(90.3/1023)), which is approximately 3 db worse (stronger) than the worst-case −23.94 db at zero Doppler difference (i.e., 20*log 10(65/1023)). The statistical CDF (Cumulative probability Density Function) of the cross correlation coefficient as a random variable is shown in FIG. 9 based on cumulation of frequencies of cross correlation coefficient values calculated from the simulation. (Note that for zero Doppler difference, a separate CDF line has a step near 24 db corresponding to the cross correlation values 63 and 65. That separate CDF line also has another step at about 60 db (not shown) that steps down to zero and corresponds to other possible cross correlation of value 1.)

FIG. 9 thus shows the CDF (cumulative distribution function) of amplitude of cross correlation coefficients arising across Doppler shifts, PN codes of SVs (satellite vehicles) and code phases. 90% of the time the cross correlation coefficient is smaller (weaker) than −27 db compared to the worst case of −21 db. But this also means that 10% of the instances, the cross correlation is not small: −27 db to −21 db. Given a 38 db dynamic range of the receiver, the 10% result also means that artifact peaks due to cross correlation can be a recurring and not-inconsequential phenomenon.

As noted in the previous paragraph, some cross correlations in FIG. 9 at non-zero Doppler difference can be stronger than even the worst case at zero Doppler difference. This is because the variations of complex exponential exp( ) at non-zero Doppler difference when multiplied across the PN code sequences of +1's and −1's can take away some negative (−1*+1) product contributions to the Equation (11) sum at zero Doppler difference that would otherwise diminish the net correlation. To demonstrate an example of this phenomenon of stronger cross correlation at integer non-zero Doppler difference, FIG. 10 is used.

FIG. 10 profiles amplitude versus code phase $c_1-c_2$ of cross correlation coefficients, with Doppler difference f1−f2 assumed constant as between a pair of satellite signals. FIG. 10 shows a Cross correlation profile involving the PN code of SV's 10 and 29 (SV pair 10.29) at +3 Khz Doppler difference (relative Doppler) around a sample code phase. The y-axis for FIG. 10 is cross correlation value with +1/−1 PN code. The x-axis represents code phase ϕ as a Chip Count. The plot of FIG. 10 is in linear scale with a value V of 1023 for perfect maximum correlation. A peak value V of 89 is observed at chip count 19. So the peak value V of 89 corresponds to a cross correlation peak at 20*log 10(89/1023) down from the high power peak. Such peak value V of 89 thereby contributes to the phenomenon of stronger cross correlation at integer nonzero relative Doppler than worst case cross correlation value V=65 at zero relative Doppler.

In FIG. 10, a valid Sv1 satellite signal peak (dotted) is superimposed on the profile of cross correlations. (For further discussion of FIG. 10 about visualizing motions of the superimposed graphs, see description of FIG. 24.) The valid Sv1 peak is shown at two different example positions among the cross correlation values or peaks. Note that at code phase 7 the valid Sv1 peak quite substantially exceeds the cross correlation and there is no reason to pessimistically reject the valid Sv1 peak. At code phase 19 the same amplitude of the Sv1 peak is conversely exceeded by cross correlation. Numerous code phases exist, indeed in many or most cases in FIG. 10, at which the amplitude of the Sv1 peak substantially exceeds the cross correlation. Accordingly, embodiments or Mechanisms are described herein for intelligently identifying and recovering positioning information from the valid Sv1 peak.

GPS receivers are presently expected to operate at power levels in the range of about −125 dBm to about −163 dBm, i.e., a range of 38 db and a lot greater or higher than a worst-case cross correlation coefficient of 21 db. So a SV at −130 dBm can cause a false detection of a cross correlation peak 21 db down as if that peak were from another SV at −151 dBm. Low received powers are expected in indoor environments, and in cases of signal blockage or attenuation in an urban canyon. Accordingly, there is a need for mechanisms to reject false peaks that arise because of cross correlation. Also, there is a need for mechanisms to detect low power SVs reliably in the presence of high power SVs and also to track the low power and high power SVs.

A conservative Approach 1 to cross correlation mitigation might operate so that if a low power SV signal is detected with the Doppler shift of its 1.575 GHz carrier at close to a multiple of one kHz (because the periodicity is 1 ms which corresponds to 1/1 ms=1 kHz) away from the carrier Doppler of a high power SV, and if the $C/N_o$ difference between Sv1 and Sv2 is greater than a static threshold (18 db Hz), the signal is assumed to be a cross correlation peak and rejected. (The expression $C/N_o$ signifies the ratio of Carrier signal power C for the SV to Noise Spectral Density $N_o$. The Hertz Hz unit represents reciprocal integration period.) Note the use of a single value (18 db Hz down from Sv2) for declaring cross correlation peak in this conservative Approach 1. That 18 db can throw away more than half the 38 db dynamic range of the receiver when the Doppler difference is integer kHz.

Figure 13A:
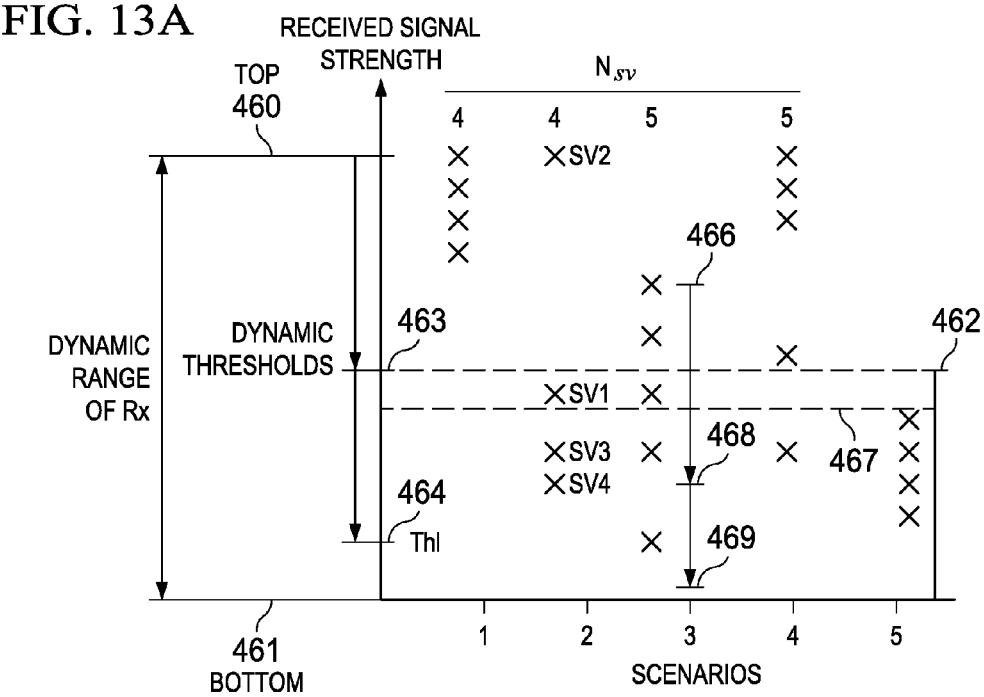
FIG. 13A is a graph of "X" symbols representing various scenarios of received signal strengths of different acquired satellites for inventive processing with dynamic thresholds or variable comparison values according to inventive processes of FIGS. 11A, 12, 16, and other Figures.
Figure 21:
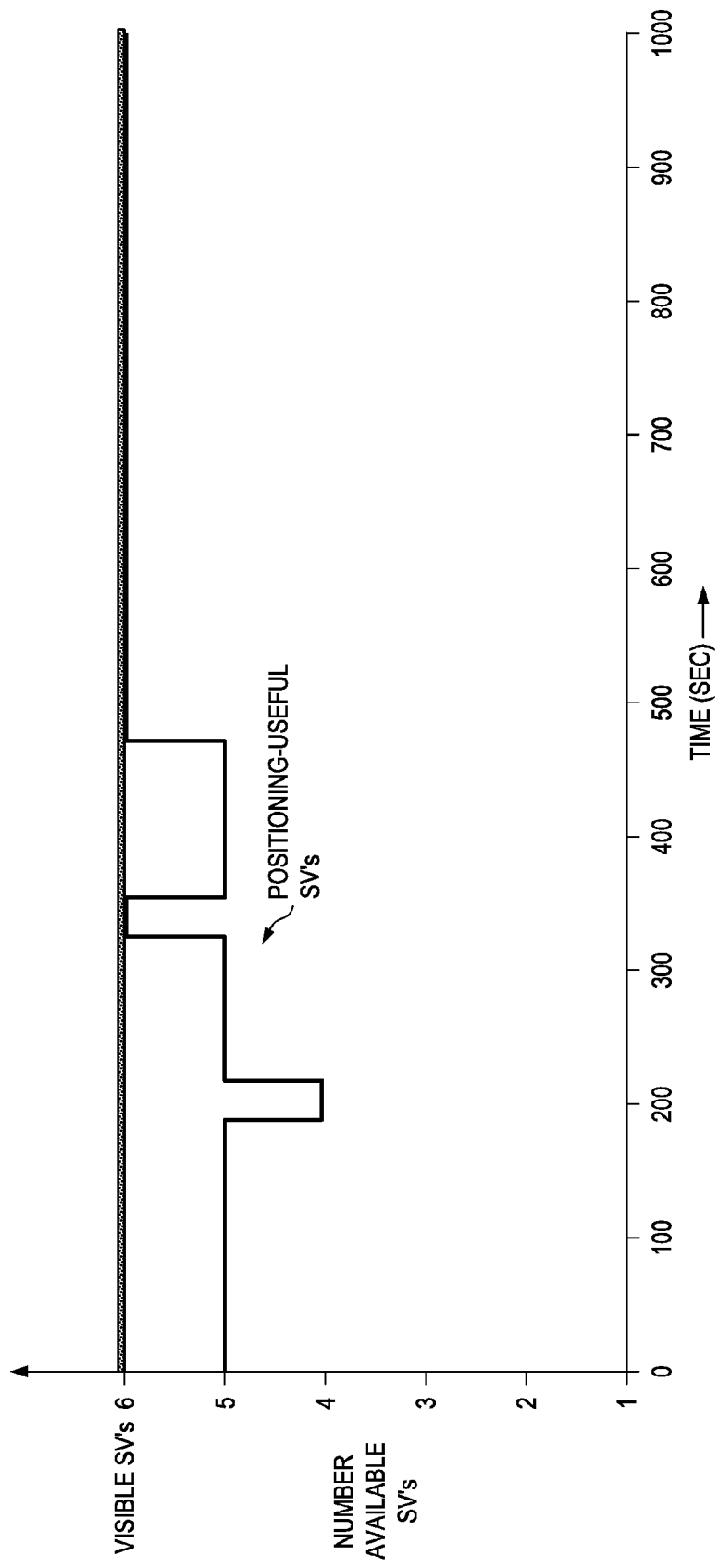
FIG. 21 is a graph of number of positioning-useful satellites versus time in a pessimistic reception process, when by contrast the use of an inventive receiver can utilize all the visible SVs.

By using the single value, Approach 1 undesirably rejects genuine measurements from low power SVs, as discussed more in connection with FIGS. 13A and 21. For example, in the 3GPP Dynamic Range Test, one high power SV is at −129 dBm and three (3) smaller power SVs are at −147 dBm, which is near the 18 db below the strong SV discussed for undesirably conservative Approach 1. Any smaller power SVs can get rejected by Approach 1 and throw a away half the dynamic range of the receiver. This causes a fewer number of SVs measurements to be used in the position calculation than are potentially available to be used, thus leading to the risk of a higher, exacerbated position error in practice. On the other hand, suppose the 18 db Hz based threshold were increased to 22 db (−151 dBm) to accept these smaller power SVs as well as somewhat lower power SVs as well. A worst-case cross correlation peak (invalid peak) 21 db down from −129 dBm could then undesirably be accepted as valid by the Approach 1 threshold of −129−21=−150 dBm. And, as noted above in the CDF analysis of FIG. 9, a cross-correlation peak that strong will probably be encountered sooner or later. A cross correlation peak that strong will always exist. As the receiver is searching for the low power SV's across Doppler and code domain, it will encounter this high cross correlation peak soon. Also, over time the Doppler shifts and code phase keep changing. The Doppler of any of the smaller power SVs can become an integer multiple (0, +/−1, +/−2, . . . ) of Khz with respect to the high power SV sooner or later. Indeed, circumstances do not need to wait for the Doppler to shift. In a search mode, the receiver can always be at risk to detect the cross correlation peak instead of the low power peak. The cross correlation peak always exists. It all depends on the search sequence it follows. In a receiver with 38 db dynamic range, even that 22 db based, revised threshold for conservative Approach 1 would still be throwing away 16 db of the dynamic range of the receiver. And if the 22 db Hz threshold example for Approach 1 were reduced so as to reduce the probability of accepting invalid cross correlation peaks, then Approach 1 effectively reduces the dynamic range of the receiver and rejects more signals from lower-power potentially useful SVs.

In FIGS. 11, 11A and 12, to address these problems, a first solution embodiment called Mechanism-1 is operative to detect a low-powered peak of Sv1 at Doppler f1 and code-phase c1 in the presence of a high powered Sv2, Doppler f2 at code-phase c2. For example, Mechanism 1 computes the actual cross correlation coefficient between Sv2 and Sv1 at a particular code-phase c1-c2 and doppler f1-f2 using some dedicated hardware (or software) such as cross-correlation mitigation hardware Xcorr 400 in FIGS. 5, 11 and 20. Mechanism 1 checks whether the observed peak is higher than what the actual cross correlation peak would be, by using a dynamic threshold. Based on this check, Mechanism 1 validates whether this peak in question is an actual peak. Cross correlation is checked across all the high power SV's visible and close to a Khz multiple. The $C/N_o$ estimate of the high powered SV's should be accurate enough as a base value relative to which the height of the cross correlation peak is determined for comparison with the observed peak. In general, code phase difference c1−c2 will not be a multiple of chips and cross correlation coefficient is calculated at the two neighbouring chips and appropriately interpolated. Margin is kept for the $C/N_o$ estimation error. In general, code phase difference would be changing within the dwell time of the low power SV. Hence more than two cross correlation coefficients are involved in general.

In FIG. 11, Mechanism-1 is implemented with a Hardware Module that gets inputs from MPU 370 software on what cross correlation coefficients are to be computed. Software programs and specifies the two SVs, doppler difference f1−f2 and code-phase $c_1-c_2$ at which the coefficients are to be computed. A hardware module 400 embodiment is ideal for this process since calculating cross correlation coefficients imply multiplication of +/−1's with some Doppler rotation and hence will be low area (integrated circuit real estate) compared to doing it in software, which is feasible for some embodiments in some cases but which will take a huge number of clock cycles to do the same thing.

In FIG. 11A, a process embodiment performed in the structures of FIG. 11 checks whether a peak is a true peak or a cross correlation peak. In a step 510, integration operations over a latest dwell interval in FIGS. 5 and 25 are completed. Then a step 520 finds the largest peak and computes relevant peak statistics. A succeeding decision step 530 determines whether the signal represented by that peak exceeds a detection threshold. If not, a step 540 proceeds to other operations since no signal is detected. If Yes in decision step 530, operations in a step 550 then run cross correlation checks against all the already detected higher powered satellites such as SV2 using module 400. A further decision step 560 determines whether the computed amount of cross correlation is sufficient to indicate that the peak is a cross correlation peak or is uselessly corrupted by cross correlation. If not, the peak is regarded as a valid peak and operations proceed to Signal Detected step 570 to log the peak is valid and utilize it for positioning purposes. If Yes in decision step 560, operations proceed to step 580 to disregard the peak, or remove a speculative entry for the peak if it was entered on a list of valid peaks, or enter the status of the peak as a Invalid. Operations loop back to step 520.

In FIG. 12, another process embodiment performed in the structures of FIG. 11 qualifies a peak as a true peak or an invalid peak. This process embodiment of FIG. 12 is suitably performed in connection with step 550 or with some alternative to the process of FIG. 11A. In a step 552, receiver 100 detects a low powered peak with PN code P1 given a 0, +/−1, +/−2, etc integer KHz Doppler difference and code lag $c_1$. This peak probably is a cross correlation peak since there are so many of them in FIG. 10, but the peak might be a valid peak from Sv1. Then in a step 554 receiver 100 finds all the high-powered peaks like Sv2 already detected and having a Doppler difference that is close to some such integer Doppler difference value.

A further step 556 electronically calculates for every high powered peak j the cross correlation coefficient(s) Xij between two PN codes—the PN code for Sv1 and the PN code for a given high-powered peak j. For each such pair of PN codes, the cross correlation coefficient is calculated for the particular code phase difference and Doppler difference between the particular high-powered SVj code phase $c_j$ and Doppler fj and the hypothesized code phase c and Doppler f1 issued as in FIG. 7 to the correlator for the low-power peak in question. These actual cross correlation coefficients obtained by electronic computation are used to establish a variable comparison value or threshold to qualify whether the peak is a true peak or a cross correlation peak as discussed further in connection with the various Mechanisms herein.

In FIG. 13A, a collection of columns of "X" symbols represent different satellite visibility scenarios enumerated along the horizontal axis. From scenario to scenario, each different scenario has different numbers of acquired satellites and/or different received signal strengths for the satellites. Each "X" symbol in a scenario column represents an example of received signal strength of a different one of the acquired satellites. The vertical axis height of each "X" symbol is the received signal strength of the respective acquired satellite presented for processing. One or more dynamic thresholds are electronically generated and used for comparison according to inventive processes of FIGS. 11A, 12, 16, and other Figures. Receiver 100 has a dynamic range with a top value 460 such as −125 dBm and a bottom value 461 such as −163 dBm.

In Scenario 1, the number $N_{sv}$ of satellite vehicles is four (4), and they are all high-powered, so no cross correlation processing is needed. The maximum received signal strength difference between them is less than 21 db (plus some margin).

In Scenario 2, four (4) satellite vehicles include a single high-powered Sv2 at top 460. Three low powered ones Sv1, SV3, and SV4 do not exceed a level 463 that is 21 db down from the Sv2 received signal strength. Cross correlation processing is advisable, as taught herein.

Relative to top 460, or relative to the strongest SV2 466, a variable comparison value is generated on which various thresholds such as 463, 464, 468, 469 are based.

In Scenario 3, five (5) satellites include two (2) moderately powered signals relative to which cross correlation could occur and three lower powered SVs which the cross correlation might or might not interfere with. Because the amplitude or power level 466 of the highest powered satellite in scenario 3 is much lower than in Scenario 1 or 2, only the lowest powered SV in Scenario 3 is below some threshold 468, such as 21 db down (plus some Margin) at which cross correlation should be checked. A pessimistic approach might reject the lowest powered SV (or even the other lower powered SVs) because it is below threshold 468. But suppose the actual computed cross correlation from cross-correlation mitigation hardware Xcorr 400 shows the cross correlation is only as strong as an intelligently-established threshold 469 according to the teachings herein. The lowest powered SV is well above that threshold 469 and is acquired and tracked validly herein.

In Scenario 4, three (3) high powered satellite signals, one medium power satellite signal, and one low power satellite signal are visible. Only the low power satellite signal should be checked for cross correlation validity using module 400 because the other satellite signals exceed level 463 and thus are within 21 db (plus Margin) of each other. However, cross correlating them against the PN Gold code of the lowest power satellite might possibly disqualify a given peak that might or might not be due to that lowest power satellite.

In Scenario 5, four (4) low power satellite signals all lie below a preliminary threshold 467 below which cross correlation is negligible and does not need to be checked. Threshold 467 is about 21 db (minus some Margin) above the bottom 461 of the dynamic range.

Thus, in FIG. 13A numerous different scenarios can present themselves in actual operation of receiver 100 and are intelligently handled by threshold processing as described to pass valid signals without undue pessimism and also to operate the more extensive cross correlation computation and processing by cross-correlation mitigation hardware Xcorr 400 and software only when it is really needed whereby power is saved.

Figure 13B:
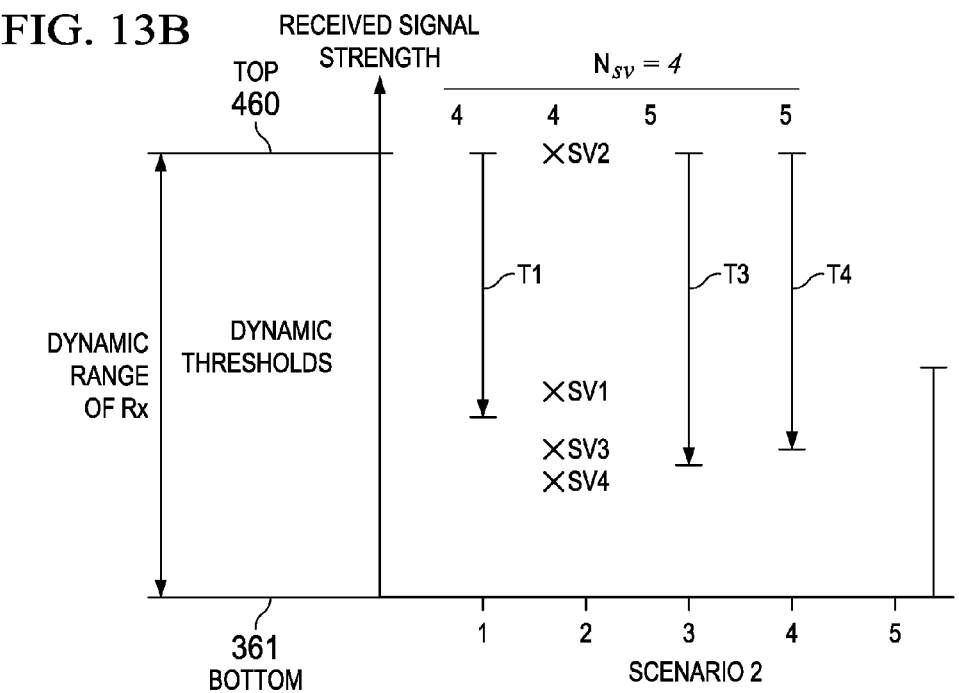
FIG. 13B is a detail of Scenario 2 of FIG. 13A showing different dynamic satellite-specific thresholds generated according to an inventive process herein for different satellite signals.

In FIG. 13B, a detail of Scenario 2 of FIG. 13A shows a hypothetical example of different dynamic satellite-specific thresholds T1, T3, T4 respectively generated for different low power satellite signals Sv1, SV3, SV4. Because each of the different low power satellite signals like Sv1 have different code phases and Doppler shifts, software in FIG. 11 calls module 400, in general, for cross correlation computation based on a respective distinct code phase difference and Doppler difference of each such low power satellite signal compared to a high power satellite signal Sv2. In this way, the processes herein are dynamic both over time and over satellites. In FIG. 13B, each of the peaks Sv1 and SV3 exceeds its respective cross correlation threshold in this particular illustration. In general, one or more peaks may be rejected, such as SV4 in FIG. 13B. A stronger peak might be rejected and a weaker peak might be passed. The procedure here is remarkably diverse in operation, and intelligently selective and dynamic.

Figure 14:
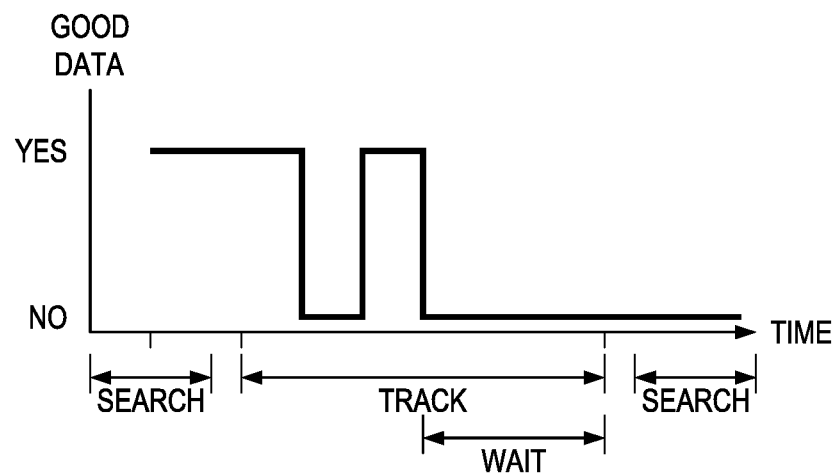
FIG. 14 is a graph of Good Data status versus time for a given satellite.

In FIG. 14, the case of prior arrival of the high-power satellite signal Sv2 is described. After Sv2 has become visible and acquired by receiver 100, suppose a low-power satellite signal Sv1 is acquired by search, and module 400 qualifies it as valid, and the Sv1 signal status is Good Data—Yes. Good Data status can change during tracking, for instance, to Good Data—No for the low-power satellite signal Sv1 due to motion of satellites Sv2 and Sv1 in the sky whereby changes occur in the code phase difference and Doppler difference presented to module 400 of FIGS. 5, 11 and 20. Also, urban canyon or other reception conditions can change the relative amplitudes of Sv2 and Sv1 and thus also change the dynamic threshold for qualifying Sv1 as valid and change the status to Good Data—No. Before long, further changes in cross correlation computations by the module 400 intelligently qualify the Sv1 peak as Good Data—Yes status again in FIG. 14 as cross-correlation conditions improve vis a vis Sv2. However, cross-correlation conditions may fail to improve or may again deteriorate so that the status is becomes and/or remains Good Data—No for a time duration beyond a programmable waiting period WAIT. Then process operations also negate the acquired status of Sv1 and again include Sv1 in the Search process at right in FIG. 14.

Figure 15:
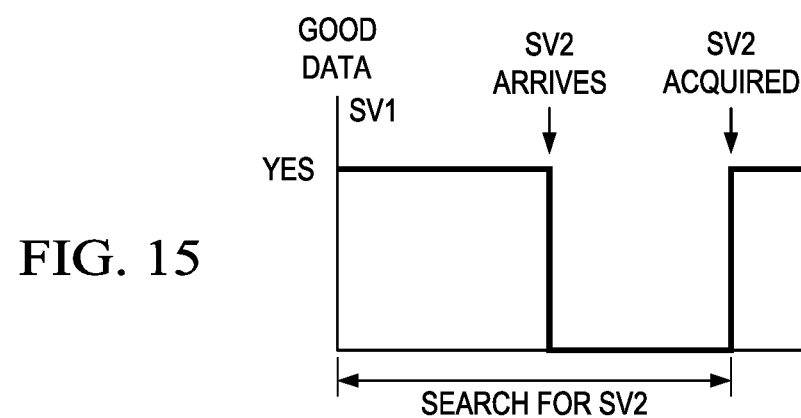
FIG. 15 is a graph of Good Data status versus time for a low-power satellite signal before and after arrival of a high-power satellite signal.

In FIG. 15, a case of subsequent arrival of the high-power satellite signal Sv2 is described. Before Sv2 becomes visible, suppose a low-power satellite signal Sv1 has been acquired and is being tracked. The Sv1 signal status is Good Data—Yes. Good Data status can change for the low-power satellite signal Sv1 before or after arrival of a high-power satellite signal Sv2. Cross correlation may interfere with the information from signal Sv1 after the SV2 becomes visible but before the signal Sv2 is acquired by the receiver as an additional SV. Any such interfering information is likely to show up as a sudden departure in the positioning information for Sv1 and can be temporarily filtered out and signaled as Good Data—No status by the positioning engine 2270 in FIG. 38. Before long, signal Sv2 is acquired. Then cross correlation computations by the module 400 according to the processes of FIG. 11A, 12 or 16 intelligently qualify the Sv1 peak or not. Before long, the Sv1 peak is qualified (Good Data—Yes status) as cross-correlation conditions improve vis a vis Sv2 due to motion of satellites Sv2 and Sv1 in the sky.

In FIG. 16, another process example of this first solution embodiment called Mechanism-1 operates as follows. For example, microprocessor 370 software supports the process steps as appropriate and calls for computation of estimated cross correlation coefficients from hardware module 400.

0) Beforehand, operations commence in a step 601, and a step 605 initializes and updates SVi valid/invalid status, code-phase $c_i$ and Doppler frequency $f_i$ and peak height (db) for each already-acquired SVi peak determined from search and updated by tracking.

1) In a step 610, the process selects from satellite IDs SVi not already searched and issues the Gold code for a satellite Sv1 among them. A step 615 hypothesizes or issues a latest position or pair of values of postulated code-phase c1 and Doppler frequency f1 for Sv1 (FIG. 6) in the Search loop or Tracking loop. Step 615 is repeatedly executed for peak-finding correlation and detection on received signals from Front End 110 according to any suitable process employed by the particular receiver architecture to be improved. The position ($c_1$, f1) of a peak height (top) of a peak is detected (observed) in two dimensional code lag-Doppler space (c, f). (That code lag value $c_1$ in general is any value, integer or not. Also, the Doppler is any value in the Doppler range, integer or not.) Then operations proceed to step 2.

Figure 17:
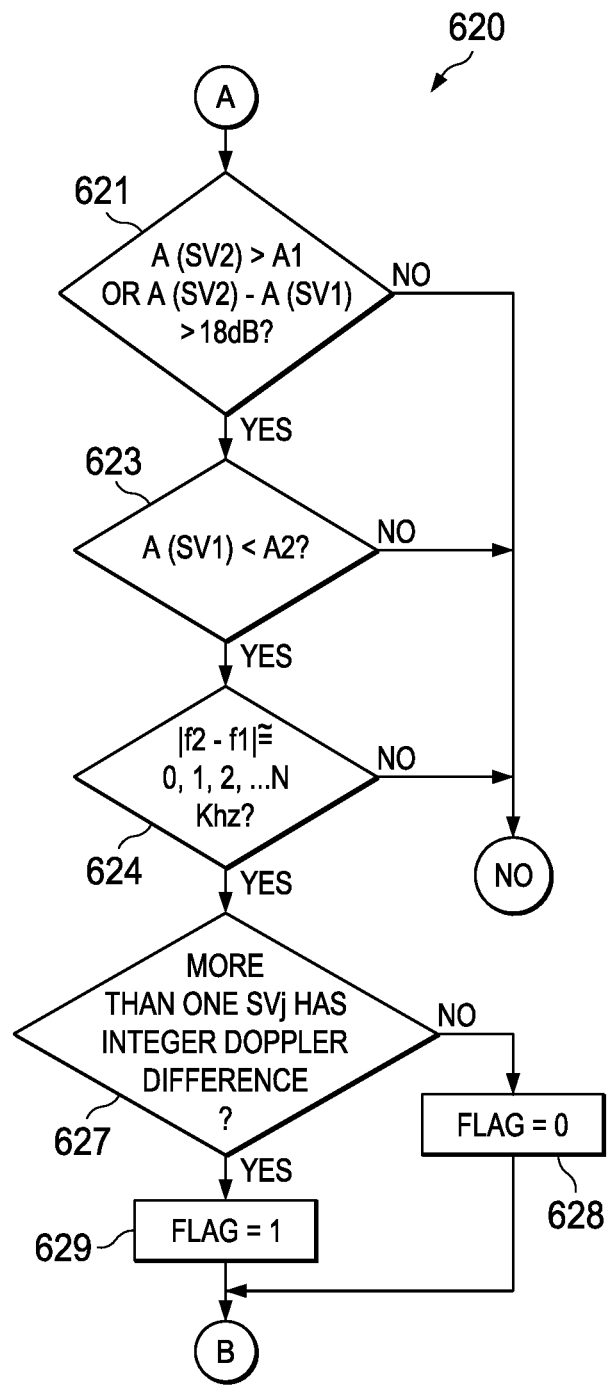
FIG. 17 is a detail of a portion of the process flow of FIG. 16 to execute an inventive power management process using preliminary checks or pre-qualification processing for possibly significant cross correlation.

2) The process performs some checking steps 620, 625 of FIG. 16 and shown as detailed substeps 621-629 in FIG. 17 for pre-qualification and power management. These substeps, or other suitable substeps, check to determine if a higher power Sv2 peak is insufficiently higher in power than the lower power peak in question and whether integer kilohertz relative Doppler exists to possibly cause cross correlation interference. If not, consumption of power and energy of operating cross-correlation mitigation hardware Xcorr 400 is prevented in part or entirely.

2A) A first checking substep 621 determines whether the process step 0 detected beforehand at least one Sv2 (Doppler f2 at code-phase c2) having an amplitude at least as strong as a predetermined value A1, such as −143 db, i.e. more than about 20 db above the −163 dBm bottom of the dynamic range of the receiver. An additional check in substep 621 determines if A(Sv2)−A(Sv1) (or signal power difference) exceeds some value, say 18 dB, in case of possible cross correlation with respect to Sv2. If No at step 621, go to step 6 in this list (step 650 in FIG. 16).

2B) A second checking substep 623 determines whether the observed peak height from step 1 is weaker (Yes) than a predetermined value A2 such as −144 dBm, i.e. the −125 dBm top of the dynamic range of the receiver plus some margin, minus about 20 db. (The 20 db is a little less than the 21 db maximum cross correlation in FIG. 9.) Some embodiments instead compare the peak in question with a dynamic check value (FIG. 13A) based on the amplitude of the highest powered Sv2 from step 0 plus some margin and minus the, e.g., 20 dBm. If No (not weaker), go to step 6 (650).

2C) A third checking substep 624 determines whether Doppler difference f2−f1 magnitude is within a band of percentage (e.g., +/−2%) of being any of zero (0), +/−1 kHz or multiple of +/−1 kHz. Percentage will be decided by the coherent integration period used for detecting the low power SV and SNR of the low power SV at the end of the dwell. This is an integer kilohertz test. If Yes so far, and exactly one such Sv2 satisfies the condition of this checking step, the peak height of that Sv2 is regarded as the reference peak height of Sv2. If Yes, and step 627 determines that any other such SV with a high-power signal like Sv2 satisfies the conditions of checking steps 621, 623 and 624, set a FLAG=1 in step 629 (else 0 in step 628) and use a function of peak heights of Sv2 and each such condition-satisfying SV as described later hereinbelow. In either such Yes case, then go via point (B) to step 3 (630 of FIG. 16). Otherwise, if No in any of steps 621, 623, 624, then pass through point NO and go to step 6 (650 in FIG. 16).

3) Next, in step 630 of FIG. 16, the process electronically computes and produces a representation of the estimated cross correlation coefficient between the Gold code for Sv2 and the Gold code for Sv1 at code-phase difference 0=c1−c2 and Doppler frequency difference f1−f2 by calling and using dedicated cross-correlation mitigation hardware Xcorr 400 (or firmware or software) of FIGS. 5, 11 and 20. Hardware 400 computes Equation (9) or the like and gives a cross correlation result V corresponding to the height of a cross correlation value or point from the profile of FIG. 10, and may apply a decibel representation 20*log 10(V/1023). If more than one high-power signal SV is present, then hardware computes all such correlations and software combines them with the high-power peak heights as described later hereinbelow. Operations electronically generate a variable comparison value for threshold T in a step 635 as discussed elsewhere herein.

4) The process in a step 640 further checks whether the observed peak height from step 1 (615) is sufficiently higher than the threshold T of step 635 that is based on estimated cross correlation of step 3 from hardware 400 to be a credible valid peak for Sv1. In this way, a dynamic threshold T or variable comparison value is applied that depends on the code phase difference ϕ=c1−c2 and the Doppler frequency difference f1−f2. The threshold is a dynamic threshold instead of being based on some constant invariant amount like 18 db Hz in Approach 1. The dynamic threshold is computed in step 635 for use in step 640 as the reference Sv2 peak height db minus the magnitude db of the estimated cross correlation coefficient, plus some margin M (e.g., 5 db).

5) Based on step 4 (640), i.e. an instance wherein the dynamic threshold T is exceeded or not by the observed peak height from step 1, the process validates or determines whether a given observed peak is an actual valid Sv1 peak or not. If a valid peak (Yes), a step 650 electronically records the position ($c_1$, f1) of the peak as that of actual satellite Sv1 and operations proceed at point (D) to step 7. If not a valid peak (No at rejection point (E)), operations proceed to step 6 (645).

6) The process of steps 1-5 is repeated systematically using a loop through steps 645 and 648 back to point (G) to step 615 across the two dimensional position space (c, f1) with another hypothesized value of Doppler frequency f1 and code-phase c1 for Sv1 until a peak is found (if no Sv2) or a peak is found for Sv1 that passes the test of step 5 (if at least one Sv2). If no Sv1 peak if found, decision step 648 determines that the search for Sv1 is exhausted (Yes point (H)) and then a step 660 makes an electronic record that Sv1 is currently in not-found status. Operations go to step 7.

7) In FIG. 16, operations reach decision step 655 and if another SV is to be searched (Yes), then operations loop back to step 610. The process of steps 1-6 is repeated with the Gold code for another SV to search for such other SV or track it. In this way, the receiver searches for and finds and tracks each valid peak across all the visible (receivable) SVs. If No at step 655, operations reach a RETURN 695. The receiver need not search one SV at a time. It can search multiple SV's in parallel.

Receiver will also do multiple searches in parallel. The above FIG. 16 illustrates one particular mechanism for search.

Note in steps 4) and 5) that the particulars of these computations can be optimized in various alternatives using other units besides db and using products of quantities, instead of logarithms and additions of db. The word "strength" is used to comprehend and encompass numerous expressions representing a signal such as power, amplitude, height, RMS, amplitude-squared, etc. For example, if $A_2$ is the high power Sv2 signal amplitude, the threshold T in step 635 can be computed as the multiplicative product $$T = A_2 * [V(\phi, f2-f1)/1023] * m \quad (12)$$

Here, $V(\phi, f2-f1)/1023$ is a value returned by the cross-correlation mitigation hardware Xcorr 400 which represents the magnitude of the complex-valued cross correlation summation computed with or based on Equation (9) with parameters including a given code phase difference $\phi = c1-c2$ and relative Doppler f2-f1, and divided by a perfect correlation of 1023. Magnitude here refers to the square root of sum of squares of the real and imaginary parts of the complex-valued sum. Some embodiments are optimized to do thresholding that obviates the square root, as follows:

$$Th2 = Th^2 = A_2^2 * [V(\phi, f2-f1)/1023]^2 * m^2 \quad (13)$$

A margin factor m, selected from some range such as 1.1 to 2 or so, is provided such that Margin M is related to margin factor m by:

$$M \text{ (db)} = 20 \log_{10}(m) = 10 \log_{10}(m^2) \quad (14)$$

Margin factor m is reverse-related to Margin M by:

$$m = 10\hat{\ }(M/20) \text{ or } m^2 = 10\hat{\ }(M/10). \quad (15)$$

Margin M for C/No estimation error on the strength of the higher-powered SV (sometimes designated Sv2 or SVj herein) is kept or included in the threshold value. Margin should also take into account estimation errors in the low powered SV. Notice that the threshold computation in step 635 depends on the receiver measuring the higher-powered signal power, or its amplitude $A_2$, as well as the computation of the cross-correlation db or ratio down from that higher-power signal. Because estimation error exists in that receiver measuring process, the margin M is provided to take account of that estimation error. Also, margin M can include some margin to reject an otherwise valid peak that is accompanied by enough cross correlation or crosstalk to corrupt its information for certain system purposes. Some embodiments use one margin value M to qualify a peak for search purposes and introduce and use a second margin M' value to qualify the peak for passable bit error rate. Then the receiver validly finds and tracks the peak for valid code lag purposes using first margin value M and independently uses the second margin value M' to qualify the peak for bit error rate purposes before it utilizes FIG. 3A data bits A, B, etc. therefrom. The second margin M' is suitably used to decide whether to pass this measurement to positioning or not.

Also, in general, the code phase difference $\phi = c1-c2$ is not an exact multiple of chips, and some embodiments the cross-correlation mitigation hardware Xcorr 400 electronically computes the estimated cross correlation coefficient at the two neighbouring chips and appropriately interpolates based on the code phase difference. The description here uses round-down RD($\phi$) and round-up RU($\phi$), which have values one chip apart. An interpolated value for V($\phi$, f2-f1) is used in the electronic threshold Th computations by using correlation coefficient values V at the two neighbouring chips RD($\phi$) and RU($\phi$) as expressed by Equation (16). In general, multiple cross correlation coefficients are involved as in FIG. 26 instead of using only two coefficients.

$$V(\phi, f2-f1) = V(RD(\phi), f2-f1) + [V(RU(\phi), f2-f1) - V(RD(\phi), f2-f1)] \times [\phi - RD(\phi)] \quad (16)$$

Note further that certain time instants $t_{m1}$ and $t_{m2}$, at which respective measurements of code lags $c_1(t_{m1})$ and $c_2(t_{m2})$ for Sv1 and Sv2 are respectively effective, might differ in some receiver architectures. In that case, some embodiments take the time difference $t_{m1}-t_{m2}$ between the measurements into account and adjust or align the measured code lags $c_1(t_{m1})$ and $c_2(t_{m2})$ so that they instead refer to one same instant for applicable code phase $c_1-c_2$ purposes according to Equation (17).

$$c_1 - c_2 = c_1(t_{m1}) - C_2(t_{m2}) + \Delta c_2 \quad (17)$$

Figure 22:
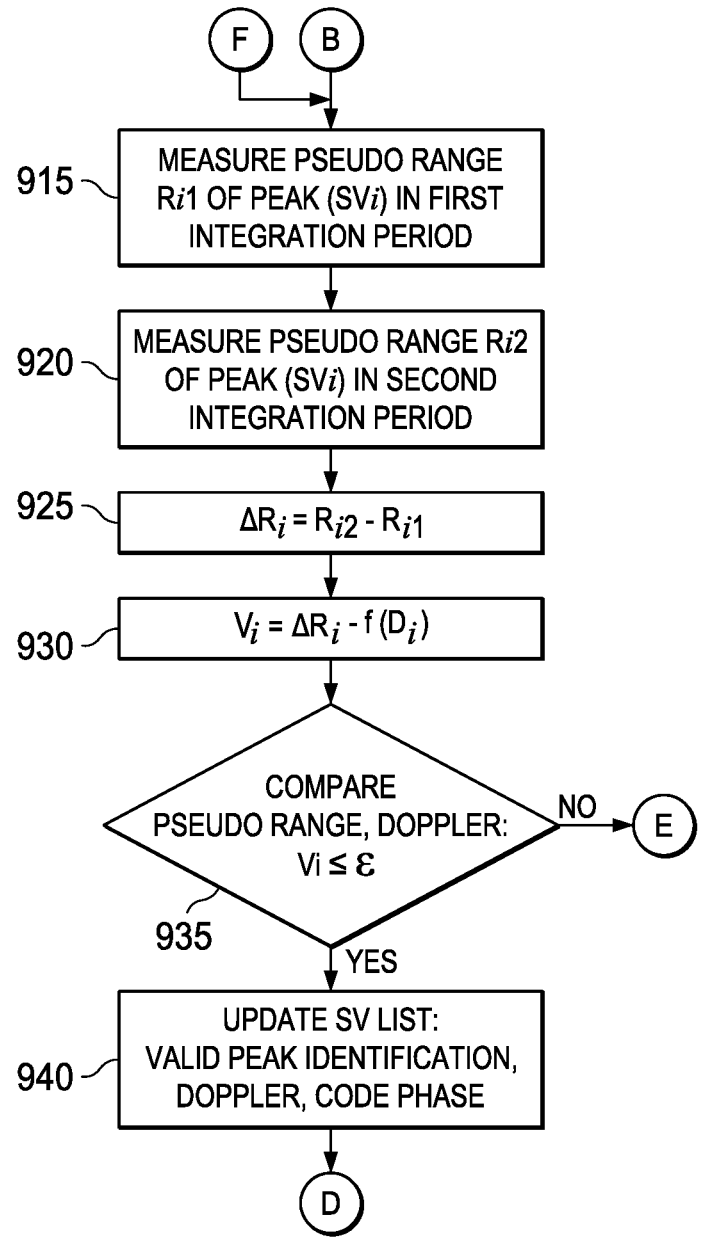
FIG. 22 is a flow diagram of another inventive process (Mechanism 2, Way 1) for qualifying a peak as a true peak using a comparison of pseudo range and Doppler, with the process shown as either an alternative or supplement to a portion of FIG. 16 and suitably performed in the structures and flows of FIGS. 5 and 11 and other Figures will.
Figure 24:
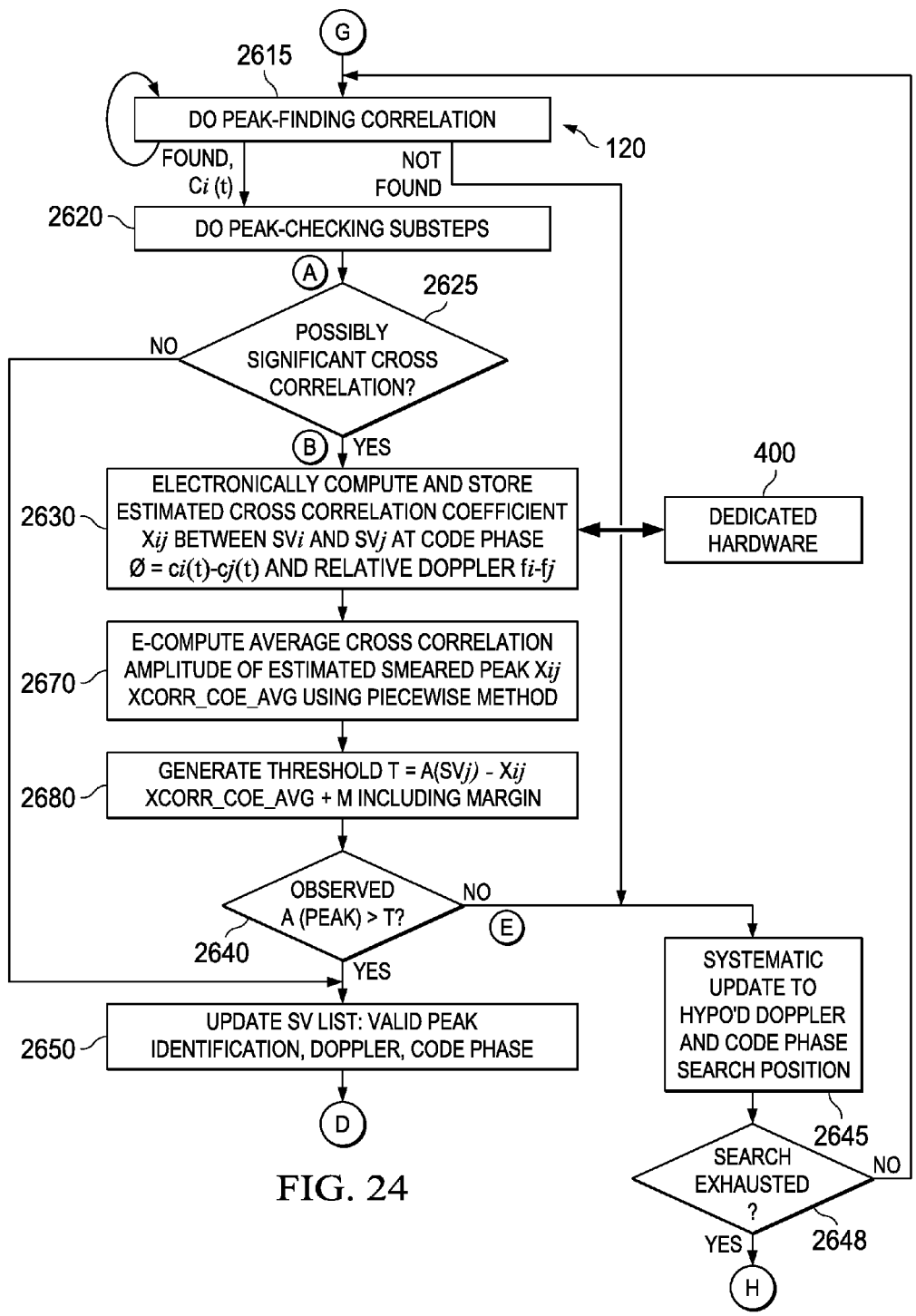
FIG. 24 is a flow diagram of another inventive process (Mechanism 2, Way 2) for qualifying a peak as a true peak or not, by averaging several different cross correlation coefficients from FIG. 20 as if the peak were a smeared peak, with the process shown as either an alternative or supplement to a portion of FIG. 16 and suitably performed in the structures and flows of FIGS. 5 and 11 and other Figures.

A code Doppler formula (18) is applied here to implement the adjustment $\Delta c_2$, and the background of code Doppler is discussed more in connection with FIGS. 22-24:

$$\Delta c_2 = (t_{m1} - t_{m2})(f2/c_L) \quad (18)$$

Note also that the dynamic threshold of Mechanism 1 will be quite low and will accept any valid but quite low power SV if the Doppler frequency difference is a non-integer multiple of 1 KHz, and indeed also at an integer multiple of 1 KHz given any one of many possible code phase differences $\phi$ for which the cross correlation is low. But if the predicted cross correlation value turns out to be one of the worse-case large values depicted in FIG. 10, then the dynamic threshold is set high and a cross correlation peak is correctly rejected as invalid. Because the relative Doppler and code phase receive conditions are likely to soon change away from such a worse case value, the dynamic threshold soon becomes lower again and Mechanism 1 finds and acquires or accepts valid lower power SVs. Over time, the receiver thus endowed with the special dynamic threshold of Mechanism 1 effectively provides positioning information based on code lag $c_j$ not only on the higher power SVs but also on the available lower power SVs and intelligently takes fuller advantage of the wide dynamic range of the receiver. In this way, operating time and overall energy to deliver a valid received peak are saved.

Figure 18:
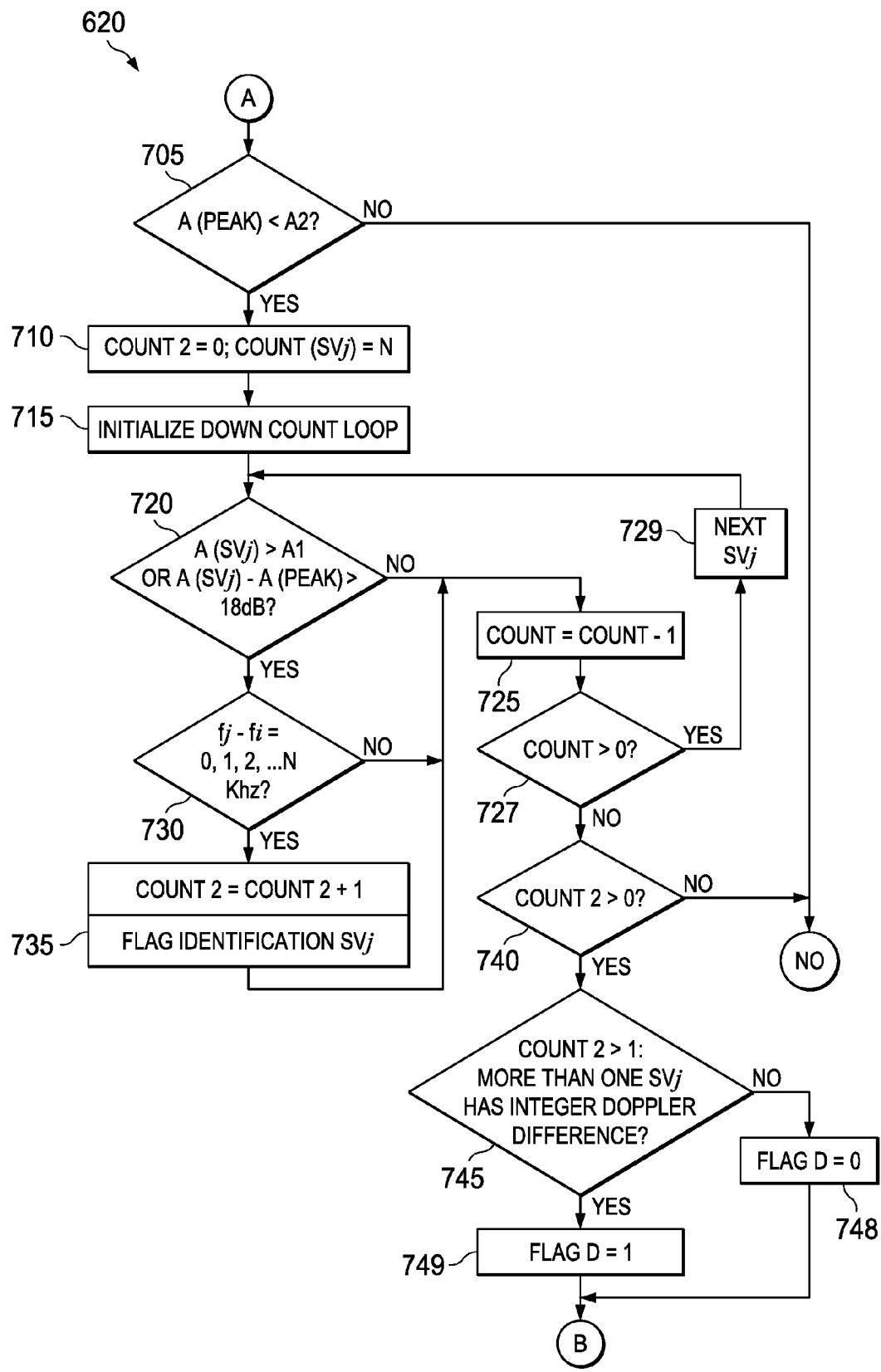
FIG. 18 is a detail of an alternative to that of FIG. 17 for an inventive power management process using preliminary checks for cross correlation and where more than one high powered satellite signal may have integer KHz Doppler difference relative to a low-power satellite signal subject to search.

FIG. 18 details a portion of the process flow of FIG. 16 as an alternative to that of FIG. 17 and provides intelligent operations, and power and energy management and reduces the time burden of operations. FIG. 18 includes a preliminary check for cross correlation that checks multiple high powered satellite signals for integer KHz Doppler difference relative to the low-power satellite signal Sv1 subject to search.

A substep 705 determines whether the observed peak height A(Peak) from step 615 of FIG. 16 is weaker (Yes) than a predetermined value A2 such as −144 dBm, i.e. the −125 dBm top of the dynamic range of the receiver plus some margin, minus about 20 db. If No (not weaker), go through NO in FIG. 18 to step 650 of FIG. 16. If Yes (weaker) in step 705, operations proceed to a step 710 to initialize a high-power satellite signal count value COUNT2 to zero and initialize a COUNT of all the acquired satellites SVj to number N. A succeeding step 715 initializes a down count loop by setting an index j to point to the first entry of a table or list of the already-acquired satellites SVj and their Dopplers fj and amplitudes A(SVj).

Another checking substep 720 determines whether the signal SVj has an amplitude A(SVj) at least as strong as a predetermined value A1, such as −143 dBm, i.e. more than about 20 db above the −163 dBm bottom of the dynamic range of the receiver. An additional check in substep 720 determines if A(SVj)−A(Peak) (or signal power difference) exceeds some value, say 18 dB, in case of possible cross correlation with respect to SVj. If No at step 720, operations go to a step 725 to decrement COUNT by one. A decision step 727 tests whether COUNT is greater than zero and if so (Yes) operations loop back to step 720 via a step 729 that specifies the next satellite SVj for decision step 720.

If Yes in step 720 instead, a further checking step 730 determines whether Doppler difference fj−f1 magnitude is integer kHz, i.e. zero (0), +/−1 kHz or multiple of +/−1 kHz. More generally, this step 730 tests whether that Doppler difference is or is not within a few percent of being close to an integer multiple (0, +/−1, +/−2, . . . ) of the reciprocal of the PN code period used by the system architecture. If Yes in step 730, operations proceed to a step 735 to flag-identify in a table of SVs the high-power satellite signal SVj as having integer Doppler difference relative SV1 and to increment COUNT2 as a running count of how many of these SVj have been identified so far. After step 735, or if No in step 730, operations proceed to steps 725 and 727 already described. In this way, the acquired satellites are checked one by one until all of them have been checked and COUNT=0 in step 727 (No). Then operations proceed from step 727 (No) to another decision step 740 to examine the number COUNT2 of high power satellites that were found to have integer Doppler difference. If none (No) in step 740, operations go through the point NO in FIG. 18 to step 650 of FIG. 16. If COUNT2 exceeds zero (>0) (Yes in step 740), this means that at least one high power satellite does have integer Doppler difference (Yes), and operations proceed from step 740 to a decision step 745. Decision step 745 sets another Doppler flag FLAGD to zero in a step 748 if COUNT2=1 and sets that Doppler flag FLAGD to one (1) in a step 749 if COUNT2 is two or more, whence operations pass through a point B and return to FIG. 16.

Thus, Mechanism-1 desirably also handles situations where more than one higher power SV like Sv2 is present and at least two of the higher power SVs have a Doppler difference relative to lower power Sv1 that are close to one of a) zero, b) 1 KHz or c) multiple of 1 KHz. For example, if one higher power Sv2 has a Doppler difference f2−f1 relative to lower power Sv1 that is zero and another higher power SVi has a Doppler difference fj−f1 relative to lower power SV1 that is 1 KHz or multiple of 1 KHz, then this coincidental situation has occurred. Or if one higher power Sv2 has a Doppler difference f2−f1 relative to lower power Sv1 that is 2 KHz and another higher power SVi has a Doppler difference fi−f1 relative to lower power Sv1 that is 3 KHz, then another example of this coincidental situation has occurred, and so forth.

Let P1 represent the receiver-issued Gold code, and S2 and S3 represent high powered signals from Sv2 and an SV3 (after Doppler wipeoff to have their respective relative Dopplers with respect to Sv1). Then the cross correlation is P1*(S2+S3)=P1*S2+P1*S3. In words, the cross correlation of the Gold code P1 for Sv1 with the combination of signals from Sv2 and SV3 is equal to the sum of the cross correlations of that Gold code P1 with the signals from Sv2 and SV3 individually. Where at least two higher power SVs are present (FLAGD=1) that are within a predetermined amount, say 6 db, of each other, or in general such that the sum of their cross-correlations with Sv1 might not be negligible, then the threshold for the low power peak is suitably established by calling cross-correlation mitigation hardware Xcorr 400 to compute the (complex-valued) cross-correlation coefficient X21 using relative code phase $c_2-c_1$ and Doppler difference f2−f1, and each cross-correlation coefficient Xj1 in general for high power SVj using relative code phase $c_j-c_1$ and Doppler difference fj−f1, etc. Some embodiments use parallel hardware blocks 400.1, 400.2, etc. to perform this and a block to combine the results, while other embodiments do fast calculations using one block 400 and use either MPU 370 software or a circuit block to combine the results. Cross-correlation mitigation hardware Xcorr 400 is suitably powered on and off when used or not, or clocked or not clocked, or otherwise power managed in a dynamic way as taught herein.

Since the phases of the satellites SV signals are independent of one another, the total cross-correlation uses the magnitudes $\|X_{j1}\|$ of the complex-valued cross-correlation coefficients multiplied by the higher power SVj amplitudes $A_j$. Relative to a highest power signal level $A_{max}$, the total or combined cross correlation X to which a low power satellite Sv1 signal is subjected is given by Equation (19):

$$A_{max}X = A_{max} * \sum_j (A_j/A_{max})\|X_{j1}\| \qquad (19)$$

The threshold is set up to include some margin M expressed as the margin factor m:

$$T2 = A_{max} * X * m \qquad (20)$$

Equation (20) is used by the hardware and/or software in place of Equation (12) in some embodiments when more than one high powered SV signal is present and can be expected to each contribute significant cross-correlation to be accounted for in the threshold T or T2.

Figure 19:
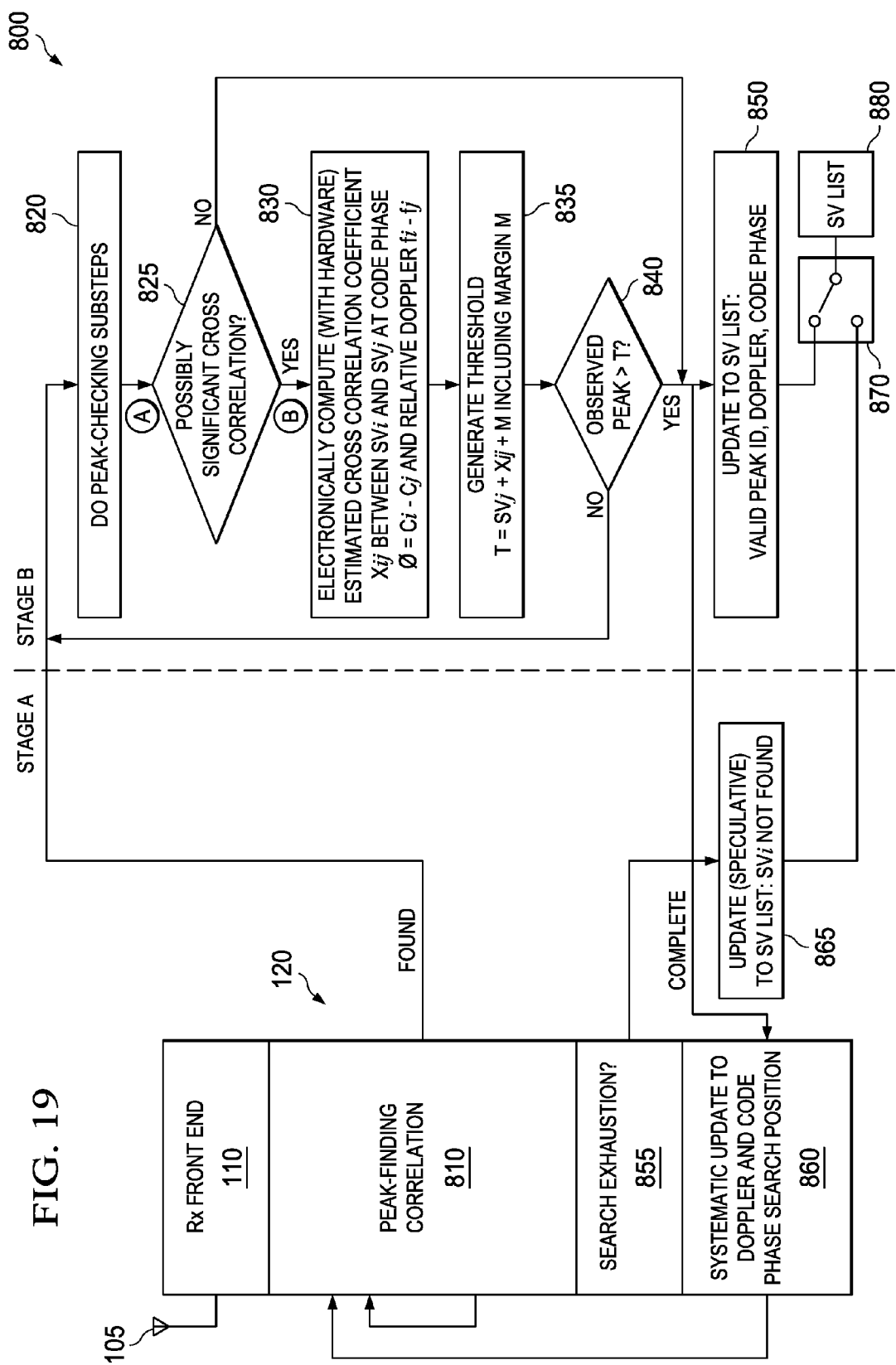
FIG. 19 is a flow diagram of an alternative inventive process for qualifying a peak as a true peak, with the process suitably performed in the structures of FIGS. 5, 11 and 20.

In FIG. 19, Mechanism 1 in some embodiments is pipelined. Electronic operations of peak-finding correlation 810 in the correlators 120 act as a pipeline STAGE A to find a next peak. These STAGE A operations are approximately concurrent with, and therefore hide, STAGE B electronic operations by microprocessor 370 and cross-correlation mitigation hardware Xcorr 400 to generate a cross-correlation value for thresholding a current peak. STAGE B has operations 820, 825, 830, 835, 850 that are respectively like their counterparts 620, 625, 630, 635, 650 in FIG. 16. STAGE A has a section 860 in FIG. 19 analogous to step 645 in FIG. 16, except that section 860 speculatively and automatically updates the search position for the peak-finding correlation 810 as if the currently-found peak were due to significant cross correlation. When, as in FIG. 10, dozens of cross correlation peaks surround only one valid peak, such speculative activity by STAGE A can be useful. Section 860 is disabled and re-initialized for finding another SV if it receives a search COMPLETE signal from STAGE B indicating that a valid peak is found. In case a valid peak is found, step 850 provides update information for a list of SVs identifying the SV for which the valid peak is found, and its Doppler and code phase. A switch 870 is operated to properly pass information from STAGE B or STAGE A to update an SV List 880. An update from step 850 is passed through a switch 870 to update the actual SV List 880. Otherwise, if section 855 has determined that search exhaustion has occurred and no update from step 850 is present, then a step 865 delivers information through switch 870 to SV List 880 indicating that the current SVi subject to search is Not Found.

In FIG. 20, a cross correlation interference estimation circuit 400 has a bus 360 and a first register circuit 410 coupled to bus 360 with register fields for entering values, parameters, or controls representing relative Doppler shift f1-f2 and relative code lag $c_1$-$c_2$ from the bus 360. Circuitry 400 computes cross correlation Xcorr_coeff_Real/Imag and second register circuit 415 responsively delivers cross correlation value(s) to bus 360. For power management, register circuit 410 has an initiation bit Gen_corr_coeff coupled to enable clock switching circuitry to pass clock to the circuit 400 and thereby control dynamic power dissipation. Initiation bit Gen_corr_coeff in some embodiments is also coupled to activate power switch circuitry that connects a supply voltage Vcc to power on the circuit 400 itself and thereby control static power dissipation as well.

In FIG. 20, circuit 400 includes a pseudo random noise (PN) code issuing circuit (430, 440, 450, 460) that responds to first register circuit 410 to issue a selected pair of different PN codes having the relative code lag $c_1$-$c_2$ and continually rotated relative to each other according to the relative Doppler shift f1-f2. A control circuit such as a state machine 420 operates in response to an initiation signal Gen_Corr_Coeff from register 410 to establish a control sequence of operation of the PN code issuing circuit and to deliver a completion signal output Read_xcorr_coeffs indicating the cross correlation values Xcorr_coeff_Real/Imag are ready in register circuit 415. For power management, the completion signal is coupled to the clock switch circuitry to decouple the clock 365. The completion signal can also be coupled to the power switch circuitry to decouple the supply voltage Vcc from cross-correlation mitigation hardware Xcorr 400 and values in second register circuit 415 remain accessible by microprocessor 370.

The PN code issuing circuit has a complex value rotation look up table (LUT) 460 and a multiplier circuit 450 that rotates at least one of the selected PN codes in response to LUT 460. A counter 425 and PN code generators 430 and 440 issue the different PN codes in response to respective Seed0 and Seed1 from first register circuit 410 to seed their pseudorandom number generation processes. The LUT 460 and the PN code generators 430, 440 are all coupled for drive by clock 365 and/or counter 425 running on clock 365.

PN code generators 440 and 430 generate the PN codes of Sv1 and Sv2 with the relative indices p1(s+k+7) and p2(s) where index s ranges from 0 to 1022. Index value s=0 corresponds to the first chip in time. Note that indices of PN codes p1 and p2 are modulo 1023 in nature. Let freq_relative 'f' from register 410 be the relative Doppler f1-f2 in Hz.

Register 410 code0_shift 'k' be the first relative code-phase or relative code lag $c_1$-$c_2$ of interest between the two PN codes p1(n) and p2(n). The manner of generating the rounded integer value k based on measured code phase difference value φ is discussed further in connection FIGS. 24 and 26 and Equation (34) later hereinbelow.

Multiplier circuit 450 rotates PN code p2(s) by LUT 460 sine-cosine output representing exp(j2πf*s*Tchip). For example, the LUT 460 circuitry suitably has two outputs (either parallel or consecutive) for real and imaginary parts respectively. Notice that the multiplier 450 and the multipliers in the MAC 470 simply flip signs or not in response to −/+1 values in the PN code sequences. Tchip is the chipping period of GPS, which is 1 us/1.023. LUT 460 holds and outputs pre-stored values (e.g. any of 256 values, one for every four chips) representing trigonometric sine and cosine around one full circle in the complex plane as a function of the angle argument θ. In this way, LUT 460 holds values representing and implementing the exponential function exp(j θ)=cos(θ)+j sin(θ) where θ is 2πf*s*Tchip. Notice that an unspecified phase constant $θ_0$ could be regarded as a term to be added to or included in angle θ. However, because the cross correlation amplitude for establishing a dynamic cross correlation threshold is sought, the value of unspecified phase constant $θ_0$ is irrelevant. It is irrelevant and can be ignored because the amplitude of exp(j$θ_0$) is unity and thus contributes an amplitude multiplier of unity (1.0).

LUT 460 is pre-loaded in one example by off-line computations that generate 256 values of the trigonometric function sin(θ) over incremental values of θ=2π*(s/4)* 4chips/1023 radians and using a rounded index s/4. LSB is 64000/2^16 Hz. The cosine values cos(θ) are just the sine values offset by a quarter of the addresses (e.g. 64 addresses) in the LUT 460. Some embodiments save LUT space by using address generator 485 to access the LUT 460 not only at a first address to obtain the imaginary part sin(θ) but also at a second address offset by 64 addresses from the first address to obtain the real part cos(θ).

In FIG. 20, LUT 460 is driven by an address generator 485 representing angle argument θ. The angle θ addresses are sequentially output from an accumulator 480 represented by a summer ACC and $z^{-1}$ feedback register element of one clock delay to feed the running total back to a first input of the summer. A second input of the summer ACC is fed with a value freq_relative from first register 410 representing the integer multiple of 1 KHz of relative Doppler, i.e. Doppler difference. In this way if the integer multiple is unity (1), then the accumulator outputs values in 1, 2, 3, . . . order, but if the integer multiple is two, the output values are 2, 4, 6, . . . and so forth for a multiple M to produce output values M, 2M, 3M, . . . . Negative integer multiples −M produce output values −M, −2M, −3M, . . . . If no Doppler difference is involved, M=0, and the output of LUT 460 is 1.0 (unity real part, zero imaginary part). In some embodiments, the values and the accumulator 480 are delivered directly as integer addresses to access the LUT 460. Some other embodiments have further circuitry in address generator 485 to convert the accumulator values to suitable addresses. The Phase accumulator in general will have a lot more precision (e.g., 18 bits) than an address for the LUT. The LUT can take the 8 MSB's from the phase accumulator as the LUT address. For the example mentioned above for 1 KHz relative Doppler, phase changes from 0 to 360 degrees in 1 ms and hence the LUT address changes from 0 to 255. Since the address changes once every four chips (1 ms is broken into 256 blocks), the LUT address effectively increments by 1 as in the example above.

In the high level micro architecture diagram of FIG. 20 for the cross correlation computation module 400, MAC stands for Multiply and Accumulate circuit. Eight stages of individual MAC units MAC7-0 have lag offsets established by one-chip time interval registers $z^{-1}$ between them. MAC7-0 supply outputs to deliver real and imaginary parts of cross correlation coefficients Xcorr(k), (k+1), . . . (k+7) to second register circuit 415 for use in Mechanism 2 as in FIG. 24 and FIG. 26, and in Mechanism 6 in FIG. 33, as described later hereinbelow.

The multiply accumulate circuit (MAC) 470 cross correlates the selected pair of PN codes having the relative code lag and continually rotated. The second register circuit 415 is coupled to MAC 470 to enter at least one value representing cross correlation output from MAC 470. The number of cross correlation values xcorr provided by MAC 470 is designated N, and here N=8 (for eight adjacent chips running from 7 to 0) The computed cross correlation coefficients xcorr are:

$$x\text{corr}(k) = \sum_{s=0}^{1022} (p_1(s+k) * p_2(s) * \exp(j2\pi f * s * Tchip)) \quad (21.0)$$

$$x\text{corr}(k+1) = \sum_{s=0}^{1022} (p_1(s+k+1) * p_2(s) * \exp(j2\pi f * s * Tchip)) \quad (21.1)$$

.

$$x\text{corr}(k+7) = \sum_{s=0}^{1022} (p_1(s+k+7) * p_2(s) * \exp(j2\pi f * s * Tchip)) \quad (21.7)$$

Each MAC i, for i=0-7 respectively provides the operation $$\sum_{s=0}^{1022} p_1(s+k+i) * <\text{rotated } p2(s)> \quad (22)$$

in the above Equations. In some embodiments, additional hardware in block 400 generates magnitudes $\|X\|$ or squared magnitudes $\|X\|^2$ directly and outputs them via second registers 415 instead of providing Real/Imaginary parts as output. Still further hardware can be provided in block 400 to compute the thresholds T or T2 as described earlier hereinabove using margin parameter and amplitude inputs in first registers 410. Space for these inputs is shown as blank spaces in FIG. 20. A hardware comparator is further provided in some embodiments and compares the low-power peak amplitude with the threshold. The output of the comparison is passed to second registers 415.

Figure 20A:
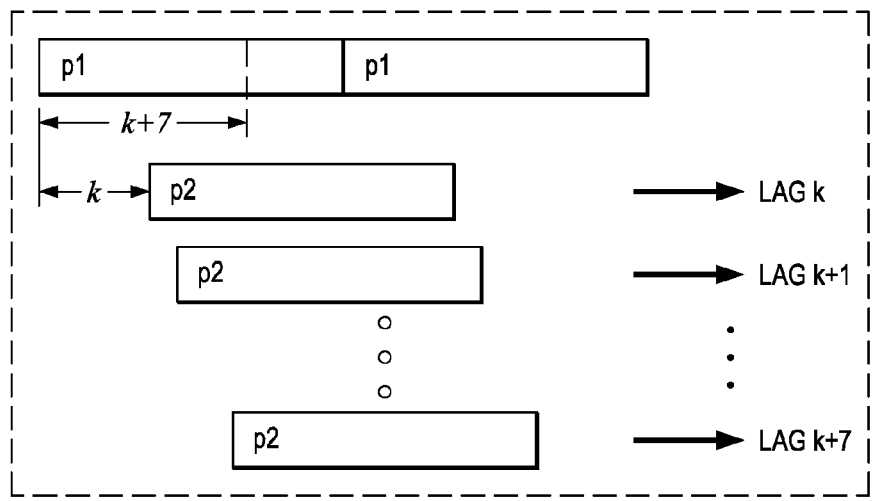
FIG. 20A is a timing diagram depicting programmable code lags of PN codes for generating cross correlation coefficients in the structure of FIG. 20.

FIG. 20A shows pictorially the PN codes alignment definition. PN code generator 430 is run k+7 times to establish initialized values $p_1(s+k+7)$ across the $z^{-1}$ stages and with all eight (8) MAC7-0 real/imaginary Re/Im outputs held at zero. Then PN code generators 430, 440 commence to output 1023 more bits and MAC 470 stages perform their multiply-accumulations.

As discussed in connection with FIG. 24, the sign of the Doppler difference f1–f2 determines whether offsets like 7 from a code phase k should provide preceding or succeeding cross correlation coefficients Xcorr_coeff. In both the positive and negative sign cases, the $z^{-1}$ stages are all previously reset or zeroed and so the logic is set up to shift values to load them with an initial set of plus/minus ones from PN code sequence P1. For example, when the sign of the Doppler difference f1–f2 is positive, PN code generator 430 is run so that PN code generator 430 is run a number of cycles equal to the greater of the two numbers represented by modulo arithmetic operations $(k+7)_{mod\ 1023}$ and $(k_{mod\ 1023}+7)$ to electronically establish a set of initialized values of PN code from $p_i(k+7)$ back to $p_1(k)$ across the $z^{-1}$ stages. When the sign of the Doppler difference f1–f2 is negative, PN code generator 430 is run a number of cycles equal to the greater of the two numbers represented by modulo arithmetic operations $k_{mod\ 1023}$ or $((k-7)_{mod\ 1023}+7)$ to electronically establish a set of initialized values of PN code from the value $p_1(k)$ back to $p_1(k-7)$ across the $z^{-1}$ stages. (The subscript mod signifies modulo arithmetic.) For such embodiment, the hardware of PN generator 430 in FIG. 20 is suitably provided with modulo arithmetic, comparison and control logic that has an input coupled to the sign bit of the Freq_Relative bit field in register 410, and an input coupled counter 425, as well as input from Code0_Shift.

Cooperating with cross-correlation mitigation hardware Xcorr 400 of FIG. 20, the programmable microprocessor 370 (FIGS. 5 and 11) communicates with first register circuit 410 in FIG. 20 and subsequently obtains and utilizes values from second register circuit 415 to reject various peaks and pass a valid peak for each visible SV. Memory RAM and ROM are coupled to microprocessor 370 and such memory includes instructions representing operations for microprocessor 370 to accomplish its described functions. As shown in FIG. 11 high level interaction, Software commands the hardware module in FIG. 20 by supplying the values, parameters or controls to compute the relevant cross correlation coefficients Xcorr_coeff so that, in general, this module 400 is commanded multiple times asynchronously one after the other. Software polls the register 410 to determine when the cross-correlation mitigation hardware Xcorr 400 is finished with a given computation. Or interrupt methodology is alternatively used in some embodiments for hardware 400 to signal microprocessor 370 that a given cross correlation computation is completed.

In FIG. 20 cross correlation coefficient computation module 400 acts as a stand-alone module used by software executing on microprocessor 370 to off-load cross correlation and related computations. Instead of the static threshold (e.g., 18 db) of pessimistic Approach 1, the cross-correlation mitigation hardware Xcorr 400 computes the actual cross correlation coefficient of the high power Sv2 for comparison with the detected low power peak in question at the particular code-phase lag. This computed coefficient is used for establishing the threshold T of Equation (12) or T2 of Equation (20).

Figure 20B:
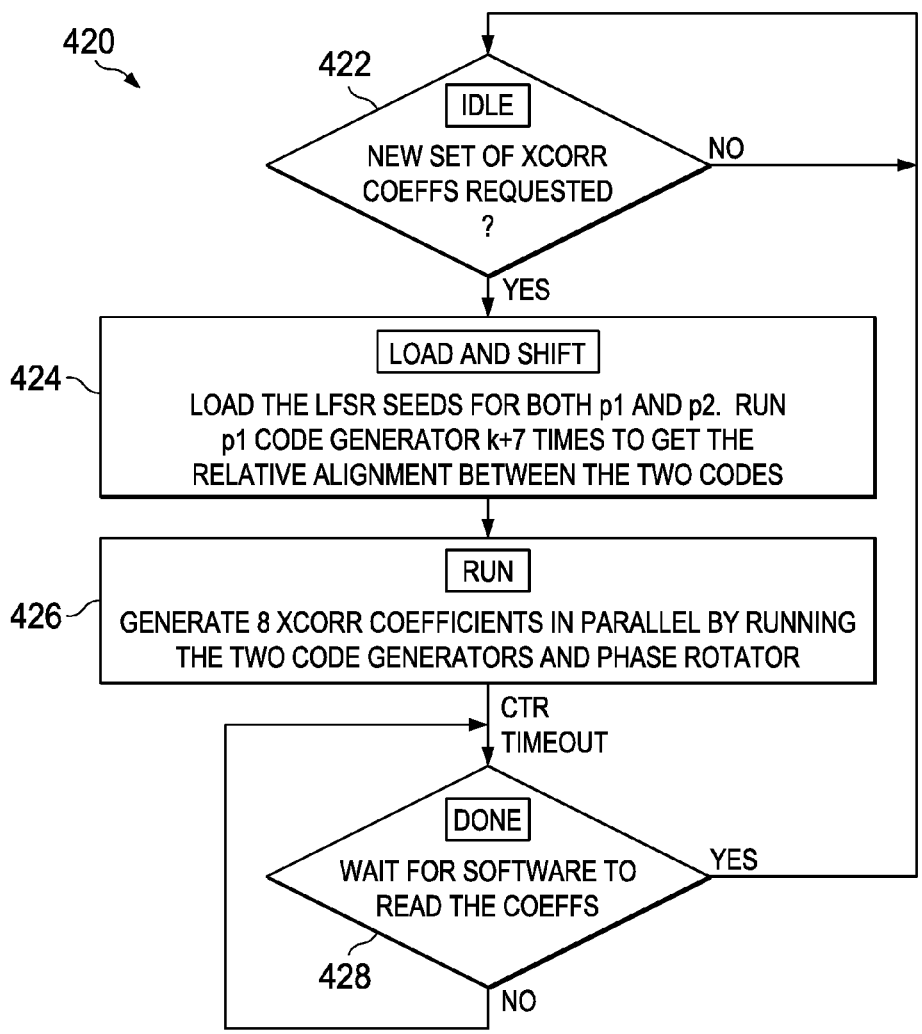
FIG. 20B is a state transition diagram of an inventive process for an inventive state machine to control operations in the hardware module of FIG. 20.

FIG. 20B details state machine 420 of FIG. 20. Software of microprocessor 370 starts the process by configuring or programming the set of registers 410. When programming is complete, software sets a bit designated Gen_Xcorr_Coeffs to request that a new set of cross correlation coefficients be computed by module 400. Once this Gen_Xcorr_Coeffs bit is set, hardware state machine 420 changes from IDLE state 422 to the next state 424 LOAD AND SHIFT. Along with this, the state machine 420 hardware acknowledges software by resetting the Gen_Xcorr_Coeffs bit and/or setting an ACK bit so to complete an initiation handshake. This ensures that software gets acknowledged and further ensures that the state machine 420 does not do multiple loops.

The state machine in LOAD AND SHIFT state 424 loads the LFSR seeds for both PN generators 430 and 440 for PN codes p1 and p2. The p1 code generator 430 is run (k+7) modulo 1023 times as discussed hereinabove to establish the relative alignment between the two PN codes p1 and p2 consistent with the software-specified relative code lag Code0_Shift. State 424 holds the MAC 470 outputs at zero and likewise holds the second register 415 Xcorr_coeff_Real/Imag contents at zero. When the relative alignment is established, as determined by counting clocks and comparing the count for equality with (k+7) modulo 1023, state machine 420 transitions from state 424 to RUN state 426.

In FIGS. 20, 20A and 20B, RUN state 426 runs P1 code generator 430 starting from P1 code bit $(k+7)_{mod\ 1023}$ to code bit $(k+7+1022)_{mod\ 1023}$. RUN state 426 concurrently runs P2 code generator 440 starting from P2 code bit 0 to code bit 1022. During this RUN time, MAC 470 performs the actual computations represented by Equations (21.0)-(21.7) by MAC 470. In FIGS. 20, 20A and 20B, RUN state 426 controls the generation of values representing the real and imaginary parts of eight (8) cross correlation coefficients in parallel by running the two PN code generators 430 and 440, running the phase rotator 480, 485, 460, 450 and releasing the MAC 470 to compute with its eight units MAC7-0. At this point the counter 425 times out at 1022 and state machine 420 responds by transitioning from RUN state 426 to DONE state 428.

Note that once module 400 is commanded, the circuitry example of FIG. 20 could take 2046 clocks in states 424 and 426 for computation of these coefficients xcorr_coeff. State 424 could uses anywhere from zero to about a first 1023 clocks for running the PN code generator 430 until the correct starting phase (k+7)mod 1023 is reached. Then RUN state 426 uses 1023 clocks for performing the actual computations represented by Equations (21.0)-(21.7) by MAC 470.

The clock rate of clock 365 or 375 of FIG. 5 to module 400 is established, for example, at 64 MHz or 128 MHz or other suitable clock rate to perform the functions such as clocking the accumulator ACC, the counter 425 and the PN code generators 430, 440 and the MAC 470. That way, in the RUN state, 1023 MAC operations can be executed by cross-correlation mitigation hardware Xcorr 400 at e.g., 64 MHz (64M clocks/sec) in 1023/64e6 or about 16 microseconds. This hardware operation amounts to an embedded hardware simulation of cross correlation in correlator 120 sped up enormously compared to the real-time rate of arrival of the PN codes from the satellites SVs. Software in microprocessor 370 remains idle or waits (meaning operation by that segment or function of software to utilize the particular xcorr_coeff output) until the computation by module 400 is done. To make this software segment waiting time smaller, module 400 is run at the highest frequency clock available. When numerous FIG. 5 channels in the Search section and Tracking section are being controlled and are to be supported by respective electronic computations of cross correlation values from module 400, then fast clock and computations from module 400 are desirable. Accordingly, the software is arranged, if desired, to work on other channels or tasks while an Xcorr_coeff computation for a given channel is pending.

State machine 420 performs a completion handshake similar or analogous to the initiation handshake described hereinabove. See TABLE 1 for a summary of this field and other fields in the registers 410 and 415. Upon completion of RUN state 426, register 410 bit Read_Xcorr_Coeffs in FIG. 20 is reset. Software polls Read_Xcorr_Coeffs and upon such reset, reads the Xcorr_Coeffs from second register circuit 415 and handshakes with circuit 415. Once software is done reading the Xcorr_Coeffs and with state machine 420 in the DONE state 428, the state machine hardware sets the bit Read_Xcorr_Coeffs. Upon this event, the state machine 420 transitions from DONE 428 back to IDLE 422 and hardware resets this Read_Xcorr_Coeffs bit automatically.

TABLE 1

REGISTER DESCRIPTION

| Register field/port | Description |
|---|---|
| gen_xcorr_coeffs | Set this bit to start computation of xcorr coeffs. This bit is set after all the required programmation is done. Bit is cleared by hardware. Default 0. |
| Seed0 | Seed for the LFSR1 of code generator p1. LFSR0 is seeded with all ones. |
| Seed1 | Seed for the LFSR1 of code generator p2. LFSR0 is seeded with all ones. |
| code0_Shift | Code-Phase Lag between the two codes. 10 bits. Amount of shift to be given to p1 before multiplying with p2 to generate the first xcorr coeff. Default value 0. |
| freq_relative | Signed integer for any of 0, +/−1, +/−2, . . . values. Phase can be assumed to be constant over 4 chips, so phase accumulator 480 can run each accumulate operation in ACC once in 4 chips similar to the correlator. Default value 0. |
| read_xcorr_coeffs | Set this bit to indicate to hardware that the xcorr coeffs have been read. This transitions the state back to IDLE. Default value 0. Hardware resets this bit along with state transition. |
| xcorr_coeff_real_0-7 | Read Only. 16 bits per signed real part Re value of xcorr coeff 0-7. 8 fractional bits. 1.7.8 format. Note that the largest xcorr coeff is around 90. Hence 7 magnitude bits should be sufficient. Range is [−128 127). |
| xcorr_coeff_imag_0 | Read Only. 16 bits per signed Im value for Imag imaginary part of xcorr coeff 0-7. 8 fractional bits. 1.7.8 format. |

In FIG. 21, Results of a test of Approach 1 and an embodiment herein are depicted. In FIG. 21, the y-axis shows number of available SVs in a 3GPP Dynamic Range Test, and x-axis shows time in seconds. The 3GPP Dynamic Range Test provides one High Power SV at −129 dBm, one at −135 dBm, one at −141 dBm and three (3) low power SVs at −147 dBm. In FIG. 21, the plot shows how many SVs are detected second by second. Using Mechanism-1 and -2 combined, detection of all six (6) visible SVs was repeatedly obtained, as shown by a bold level line at 6.0 on the graph. By contrast, Approach 1 conservatively and unnecessarily rejects one or two SV's (that have Doppler difference close to 1 Khz multiple) as cross correlation peaks. This rejection is shown by rectangular notches dipping for a substantial length of time to 5.0 and even 4.0 SV's in the graph.

Another solution embodiment is designated Mechanism-2, and some forms analyze peak behaviour involving differing motion of the location of a peak by whether it is a valid peak from a real satellite SV or is an invalid cross correlation peak. For Mechanism 2, code-doppler is defined here as the rate at which a cross correlation peak location moves in each millisecond. The code-doppler of a cross correlation peak will depend on the Sv2 Doppler f2 in Doppler difference f2−f1. The code-Doppler will thus not solely depend on low power Sv1 Doppler f1 resulting from an hypothesis search in the receiver.

In FIG. 22, a Mechanism-2 First Way embodiment, structure or process measures the change ΔR in pseudorange of the low powered peak between two integration periods. FIG. 16 shows surrounding steps that are implicit in FIG. 22 and join to FIG. 22 flow points (B), (D), (E). Operations come in via either point B of FIG. 16 or point F of FIG. 23 and proceed to steps 915 and 920 that measure in a first and second integration period respective pseudorange values $R_{i1}$ and $R_{i2}$ of a low power peak in question that may be for satellite signal SVi. Comparing change in pseudo range to carrier Doppler can be done regardless of whether the Doppler difference is zero or non-zero integer between satellites, if any. It can be done even if the higher power SV is not even detected.

The Mechanism-2 First Way then checks, by using an electronic computation represented by an Inequality (23).

$$\text{ABS}(\Delta R - \text{function of Doppler } f1) \leq \text{threshold} \qquad (23)$$

Inequality (23) determines whether a change ΔR in pseudorange R of the low-power peak in question determined from a subtraction step 925 in FIG. 22 matches the Sv1 carrier Doppler shift f1 as determined by evaluating a metric Vi in a step 930. A step 935 checks to see if the metric lies within configured bounds or a threshold (e.g., set conservative). A match (Yes in step 935) indicates that the change ΔR in pseudorange of the low-power peak in question that has been detected in the correlator solely depends on low power Sv1 Doppler f1 according to an expected relationship of proportionality. In case a valid peak is thus found, a step 940 provides update information for a list of SVs identifying the SV for which the valid peak is found, and its Doppler and code phase and point D is reached (FIG. 16). If no match (No in step 935), the low powered peak is probably an artifact of cross correlation and point E is reached instead.

In FIG. 22, the Mechanism-2 Way 1 for comparing Pseudo Range Difference vs Doppler is further detailed in regard to step 930 as follows. Let the pseudo ranges (code lags) of a received signal be c1 and c2 at time instants t1 and t2 respectively. c1, c2, t1, t2 are in the same units (e.g., of seconds). Let the carrier Doppler of the received signal be f1 with units in Hertz (Hz). Pseudo Range Difference=ΔR= (c2−c1). Let $p_I$=(t2−t1) be a suitable time interval such as the integration period (dwell time). The GPS carrier frequency is 1.575e9 Hz. Define a Timing Ratio (code Doppler) that represents the rate of change of pseudorange, or rate of motion of the code lag c across chips in FIG. 10:

$$\text{Timing\_Ratio}=(c2-c1)/(t2-t1) \qquad (24)$$

Define a Carrier Ratio of the Doppler f1 to the carrier frequency by Equation (25).

By the physics of Doppler shift, the Carrier Ratio is also the same as the component v of the velocity of the SV in the direction of the receiver divided by the speed of light $c_L$=3e8 m/sec.

$$\text{Carrier\_Ratio}=f1/1.575e9=v/c_L \qquad (25)$$

The carrier_ppm for Carrier_Ratio and the code_ppm for Timing_Ratio are the same for an actual signal whereas they can be different for a cross correlation peak. The reason for this is seen by differencing navigation equations (1). The result, by inspection, is that the velocity component v of a real satellite SV changes the distance of the satellite from the receiver at a rate related to the rate of change in code lag times the speed of light. So the Carrier Ratio and the Timing Ratio for a real satellite are equal. Accordingly, in Mechanism-2 Way 1, the absolute value of their difference is tested to determine if it less than some small value, or not:

$$\text{ABS}(\text{Timing\_Ratio}-\text{Carrier\_Ratio})*c_L < \varepsilon \qquad (26A)$$

$$\text{ABS}(\text{Timing\_Ratio}-\text{Carrier\_Ratio}) < \varepsilon/c_L \qquad (26B)$$

A suitably-conservative threshold ε is about 160 meters/sec. and $\varepsilon/c_L$ is about 0.5 ppm.

It should be clear that any of a number of related tests, of proportionality between the delta-pseudorange and the Doppler, can be used. Cross-multiplying denominators in Equations (24) and (25) amounts to multiplying through Equation (26A) by unitless product (t2−t1)*1.575e9 Hz, which yields an equivalent unitless test (27):

$$\text{ABS}[(c2-c1)*1.575e9-f1*(t2-t1)] < \varepsilon*(t2-t1)*1.575e9/c_L (\text{unitless}) \qquad (27)$$

Another equivalent test multiplies Equation (26B) through by $p_I$=(t2−t1) to directly compare Pseudo Range Difference ΔR with an expression that involves Doppler f1:

$$\text{ABS}(\Delta R - (f1/1.575e9)*p_I) \leq \varepsilon*p_I/c_L \qquad (28)$$

The symbols for Inequality (28) are:
ΔR: change in pseudorange R of low-power correlator peak in question
$c_L$: speed of light
*: multiplication sign
f1: carrier Doppler of low-power Sv1 carrier
$p_I$: integration period (dwell time) or other applicable time difference t2−t1 over which ΔR is measured.

By itself, comparing code Doppler and carrier Doppler and determining that it is not a valid peak may be known. However, combining this Mechanism/Way with other Mechanisms as taught herein provides further remarkable embodiments. A disadvantage is that it involves two integration periods and also it does not work for zero Doppler difference. An advantage with it is that the high power SV need not be detected for it to operate.

In some embodiments microprocessor 370 software supports the FIG. 22 process steps as appropriate. In some other embodiments, a hardware module 400 is included and provides a subtractor and comparator to support the process. In FIG. 22, in a stepwise process form, one form of Mechanism-2 First Way process measures the change ΔR in pseudorange of the low powered peak between two integration periods.

Checks if ABS(ΔR−function of Doppler f1)≤threshold.

If No to step 2), then rejects the low power peak as invalid.

If Yes to step 2), then the low power peak is either valid or a result of cross-correlation with zero Doppler difference, and the process is suitably supplemented with a Mechanism that checks for cross-correlation with zero Doppler difference.

The Mechanism-2 First Way process waits for two integrations, e.g., two 1-second dwells and thus latency, and can be used as one more check on top of the described ones for Mechanism 1, and does not depend on the prior detection of high powered peak nor measurement of amplitude of either a high power peak or lo power peak. Accordingly, this Mechanism is useful not only by itself but also when combined with other Mechanisms in combination embodiments like that shown in FIG. 35. The latency is largely hidden in some embodiments by suitable pipelining analogous to that shown in FIG. 19. This Mechanism-2 First Way is applicable to instances involving non-zero Doppler difference f2−f1, i.e., instances where receiver locks onto a cross correlation peak at non-zero multiple of Khz doppler difference, which is distinguished by Mechanism-2 First Way from an actual low power peak. Also, it is contemplated that some Mechanism-2 First Way versions alternatively do any of various equivalent comparisons such as described hereinabove in connection with Inequalities (23)-(28).

Before discussing a Mechanism 2 Way 2 embodiment of FIG. 24, description turns to a Zero Doppler-difference embodiment (Mechanism 3) in FIG. 23, that provides complementing operations to the Non-Zero Doppler-difference operations of FIG. 22. FIG. 16 shows surrounding steps that are implicit in FIG. 23 and join to flow points (B), (D), (E). In FIG. 23, operations come in via point B of FIG. 16 and proceed to a decision step 950. Step 950 determines whether zero Doppler-difference is present in the sense that the Doppler difference is close to zero, e.g., within a predetermined number of Hertz of being zero. If not, a branch is made to a Non-Zero Doppler-difference Mechanism such as by going to point (F) in FIG. 22. If Zero Doppler-difference (Yes) in step 950, operations proceed to steps that respectively measure or retrieve for a same integration period, or for a same effective time, a step 955 pseudorange value $R_i$ and its error for the possible-SVi peak in question, as well as a step 960 pseudorange $R_j$ of a high power peak for SVj. Adjustment in pseudorange is suitably made in case the times of measurements of $R_i$ and $R_j$ differ, so as to make the values $R_i$ and $R_j$ refer instead to the same instant.

In FIG. 23, the case of Zero Doppler difference is handled by a solution embodiment designated Mechanism-3. Zero-Doppler difference is a special case that is handled by the Mechanism-3 embodiment to determine whether a low powered peak is a cross correlation peak from a high powered satellite Sv2 with same Doppler shift as the lower powered satellite Sv1, or whether the low powered peak constitutes a valid peak instead. In the zero-Doppler case, no smearing of the cross correlation peak is involved.

A pseudorange obtained from a cross correlation peak with a high powered satellite Sv2 will always be integer chips away from the actual pseudorange of the high powered SV2 because a cross correlation peak can be an artifact of cross correlation between Gold codes themselves when the Gold code generated by the receiver based on the received Sv1 satellite ID is cross correlated with the different Gold code arriving in the high-power signal from Sv2. The correlator in effect slides the Gold codes at its inputs relative in time to one another, and some of these relative times (measured in chips equal to 1 ms/1023) are associated with correlator output peaks as in FIG. 26. For example, a high powered SV at −126 dBm might have cross correlation peaks at −150 dBm that will be falsely detected with a 1-sec integration.

Refer back to FIG. 8 for purposes of describing Mechanism-3, let 't2' be the peak location (expressed in time t or code lag c) for a high-power signal from Sv2; and let 't3', 't7' and 't4' be cross correlation peaks of Sv1 and Sv2 at zero Doppler-difference. Then the differences or displacements t3−t2, t7−t2 and t4−t2 are multiples of GPS Chipping rate. This is because both the high powered peak for Sv2 and the cross correlation peaks are coming from the same pulse shape, i.e. the Gold code carried by or riding on the Sv2 signal is included in one input to the correlator in both instances. Accordingly, the peak location $t_2$ of Sv2 relative to the receiver timebase when the receiver correlated the Sv2 Gold code with received signal has to be integer chips away from a cross correlation peak location arising when the receiver instead injects the Sv1-ID Gold code into a correlator in the presence of all the satellite signals including the received Sv2 signal with its Sv2-specific Gold code. By contrast, for valid Sv1 peak at time t1, the difference t1−t2 will most likely be a non-integer chips value or soon will be non-integer due to independent motion of satellites Sv1 and Sv2. If the two peaks are not integer chips away, then the low power peak passes FIG. 23 step 965 (Yes) and is not a cross correlation peak. But if they are integer chips away then the peak in question branches from step 965 (No) and either might be an actual peak or might be a cross correlation peak. It is possible for an actual peak to be integer chips away from a high power peak location, it still need not be cross correlation.

If the peaks are integer chips away, some embodiments use one or more other different Mechanisms such as in FIGS. 16 and 20 to do further checking to resolve the validity of the peak.

Some other embodiments simply invalidate the peak by presumption for the time being during tracking of Sv1, or may continue assessing peaks and exhaust a search on Sv1; and then steps 950-970 of Mechanism 3 are re-executed to do the further checking for this satellite SV1 after a period of time when the difference t1−t2 soon will be non-integer due to independent motion of the satellites Sv1 and Sv2. Such period of time can be a statically-configured waiting time or dynamically set equal to the error in the pseudorange divided by the relative code Doppler for the satellites (difference of their Equation (24) expected or measured timing ratios). If and when the chips-away difference becomes non-integer, then the peak is validated on search or reinstated as a valid peak during tracking.

In FIG. 23, Mechanism 3 has the accuracy or error ε1 of the cross correlation peak location estimate configured, accounted, estimated, or determined in step 955. Step 965 determines whether a computed pseudorange plus or minus the error ε1, encompasses or fails to encompass an integer chip value of distance away from the pseudorange of a high power SVj already computed or retrieved in step 960. Put another way, the test of step 965 determines whether the actual difference $R_i-R_j$ departs from the integer-rounded value of that difference by more than the error ε1 in the pseudorange $R_i$ of step 955. If NO in step 965, the peak may be a valid peak or an invalid peak and operations either invalidate the peak by presumption or go to further checking based on a decision step 975 to resolve the peak. If invalid, operations then go through point (E) and back through steps thereafter in FIG. 16. If further checking is configured, step 975 (Yes) goes to step 630 of FIG. 16 as an example of further checking. If YES (non-integer chips away), Mechanism 3 declares the peak to be a valid peak (or not-invalid peak) and records information for it in a step 970 and reaches point (D). It should be understood that any of a variety of substantially equivalent ways of performing this test can be provided. Also, if the SVj pseudorange also has a not-insignificant error, then the error for use in the test is based on both the error of the peak in question and the SVj error.

For a numerical example of the test of step 965, suppose a measured peak is −150 dBm and is obtained from 1-sec integration. Then this integration leads to a certain peak location estimation error in meters (m.) of position error. Suppose further for the example that it may lead to +/−30 m error whereas one-chip error corresponds to 300 m (1 usec/1.023×3e8 m/sec). If the pseudorange is 50 m away from the nearest one-chip position relative to the pseudo range of a higher power peak around the same Doppler, then the +/−30 m error does not encompass that nearest one-chip position and the peak is declared valid. This is because a peak that is not integer chips away from a high powered peak is not acting like a cross correlation peak.

In FIG. 23 Mechanism 3, the time of code lag measurement on the higher power peak may differ from and be earlier than the time of the current code lag hypothesis pertaining to the lower power peak in question. In that case, the value of code lag of the higher power peak established at the earlier time is adjusted to the time of the current code lag hypothesis by multiplying the time difference times the code Doppler (rate of change of code lag) of the higher-power peak and adding the result to the value of code lag of the higher power peak established at the earlier time. In this way, the code Doppler is taken into consideration and accounted for prior to determining whether the relative code lag is integer chips away or not, i.e. prior to determining whether the computed pseudorange encompasses an integer chip value away. Relative code lag here means the difference between the code lags for the higher and lower power peaks at one same instant. In other words, a timing offset can exist between different times of measurement of the produced peak and the high power peak respectively, and the cross correlation detector is operable to make the integer chips away (or not) determination considering the timing offset as well.

In FIG. 24, a Mechanism-2 Second Way embodiment, structure or process recognizes that since the Doppler used for searching the low power Sv1 is f1, but interference by high power Sv2 has a different Doppler f2, the cross correlation peak automatically gets smeared out. Before describing the illustrated steps in FIG. 24, some discussion about the smearing phenomenon is provided. The amount of smearing is higher if the Doppler difference magnitude ABS(f2−f1) is higher or if the integration time period is higher. The direction of the smearing over time depends on the sign of the difference f2−f1. The cross correlation peak is smeared over a period P, as the peak sweeps across code lags defining period P. Period P is also designated smearing time $t_{sm}$, expressed by Equation (29) in chips:

$$P = t_{sm} = [(f2-f1)/(1.575e9 \text{ Hz})]*(\text{dwell\_time (sec)})* \\ 1.023e6 \text{ chips/sec} \quad (29)$$

For instance, a dwell_time for integration can be on the order of one (1) second e.g., established anywhere in a range of one coherent integration period (20 ms) to several tens of seconds or more. For a numerical instance, the smearing time is about 2 chips when the Doppler difference f2−f1 is 3 KHz and the integration period (dwell_time) is 1 sec.

This smearing phenomenon expressed by Equation (29) for cross correlation peaks is heuristically understood by recognizing from Doppler physics that the velocity $v_2$ of a satellite vehicle Sv2 in the direction of the receiver 100 is related to its Doppler shift f2 by $$v_2/c_L = f2/(1.575e9 \text{ Hz})] \quad (30)$$

Depending on whether or the satellite vehicle Sv2 is moving closer or farther away from the receiver, the PN code from Sv2 is advanced (plus, +) or retarded (minus, −) in chips as received by the receiver. Satellite vehicle Sv2 moves a distance ($v_2$*dwell_time) relative to the receiver, and that distance is proportional to the dwell time. Accordingly the PN Gold code from Sv2 is advanced or retarded in seconds by the amount of the distance moved relative to the receiver divided by the speed of light $c_L$. Equation (31) then converts the amount of advancement or retardation time to chip units recognizing that there are 1.023e6 chips in each second.

$$(v_2*\text{dwell\_time})/c_L*1.023e6 \text{ chips/sec} \quad (31)$$

Of course, the satellite vehicle Sv1 that is being searched or tracked also has a Doppler shift f1 that could analogously cause an advancement or retardation of its PN Gold code relative to the Sv1-specific PN Gold code issued by the receiver to the correlator for correlation therewith, and intended to detect a valid peak for Sv1. However, as shown in FIG. 25, Doppler adjustment blocks 2730.1, 0.2, . . . .n slightly adjust each of the 20 ms coherent integration outputs 2722.1, 0.2, .n by a code lag time-correction based on the hypothesized Doppler shift f1:

$$0.1, 0.2, .n*(-f1)/(1.575e9 \text{ Hz})]*(20 \text{ ms}) \quad (32)$$

FIG. 25 depicts coherent and non-coherent processing in one channel i for one satellite SVi signal i, see 310.*i* and 320.*i* in Measurement Engine 2260 of FIGS. 5 and 38. In the channels, autocorrelation peaks are obtained that relate to receiver local time $t_{Rj}$ for each acquired satellite j on which processing is performed. Note that the receiver is intended therefore to respond to autocorrelation peaks, and not cross-correlation peaks that may also be present. Accordingly, dramatically enhanced cross correlation mitigation is provided as described herein. The autocorrelation process includes summation, accumulation or integration. Some embodiments use the Precision P code for the PN sequence for high accuracy, or use both the P and C/A codes likewise. Some embodiments track phase of the carrier itself to determine user kinematics or other precise measurements. Some embodiments use a longer noncoherent summation interval, such as 10 seconds, to deliver enhanced SNR in by operating the receiver as a (20, 500) receiver for receiver position and bias error operations, and operate the receiver instead as a (20, 50) receiver at somewhat lower SNR for data reception operations such as ephemeris, satellite identification, and almanac.

Integrator block 2712 sums all the Doppler-adjusted integration outputs. When a valid Sv1 peak is found, its Doppler-adjusted components will strongly accumulate and peak at one code lag. But for an Sv2 cross correlation peak, the successive advancement or retardation over the coherent integrations 2722.1, 0.2, . . . n for Sv2 in Equation (31) is combined with the Doppler adjustments 2730.1, 0.2, . . . n over the dwell time for Sv1 in Equation (32). For non-zero Doppler difference, this combining results in a series of small cross correlation contributions for Sv2 that have their code lags smeared out in FIG. 28A or 29A. Equations (30), (31), (32) combine to yield Equation (29). Accordingly, the smearing time is as given in Equation (29). It should be clear that the individual signs (plus or minus) of the Doppler shifts f2 and f1 are important in establishing the difference f1–f2 in Equation (29).

Because of the smearing the smeared cross correlation peak is attenuated. This attenuation represents an advantage in applying Mechanism 2, Second Way as a detection process. Where higher Doppler differences are involved, they automatically have higher amount of smearing and more attenuation of the cross correlation peak. Accordingly, a lower, less pessimistic threshold can be used to pass true peaks as valid.

In FIG. 24, this Second Way, process or embodiment for Mechanism-2 recognizes that the smearing will flatten the peak, if the smearing happens as a result of Doppler frequency difference $f_1-f_2$ over many chips (e.g., at least 4 (or 8) chips). Thresholding is used to reject such cross-correlation peaks according to steps in FIG. 24 detailed next.

In FIG. 24, this embodiment is described by comparison with FIG. 16. FIG. 16 shows surrounding steps that are implicit in FIG. 24 and join to flow points (G), (D), (H). Operations pass through point G and perform peak-finding correlation 2615. A peak that is found has an hypothesized Doppler f1 and code lag $c_i(t)$. Peak checking substeps 2620 and testing for possibly-significant cross correlation 2625 parallel the process steps in already-described FIG. 17 or FIG. 18. If no cross correlation issue (No at step 2625), operations branch to step 2650 to update the SV List with valid peak ID, Doppler, and code phase. The description at this point focuses on a possibly-significant cross correlation issue (Yes) that proceeds to step 2630. Steps 2630, 2670, 2680, 2640 robustly handle smeared peaks intelligently and without pessimism.

Step 2630 calls the cross-correlation mitigation hardware Xcorr 400 of FIGS. 5, 11 and 20. Hardware 400 of FIG. 20 is called by step 2630 at the end of the integration interval (dwell) when the low power peak is visible, and values for register 410 fields Code0_shift and Freq_relative are provided. Hardware 400 generates values for the cross-correlation coefficients illustrated in FIG. 26 by C(1), C(2), . . . C(6) in a code lag range. Hardware 400 automatically provides PN code lagged to or offset by a series of code phases for MAC 470. MAC 470 electronically generates particular complex values Ci of the cross correlation coefficients Xcorr-coeff of FIGS. 26 and 20 for the numerous thus-offset code lags k+7, k+6, . . . k that arise in smearing. In other words, when a low power peak is found, the circuitry in step 2630 of FIG. 24 back calculates all the relative code lags with respect to the high power peak location which would have affected this low power peak during the completed dwell. The cross correlation coefficients Xij at all those relative code lags are computed to estimate the average value in a succeeding step 2670.

In FIG. 24, that succeeding step 2670 then electronically combines some or all of these Xcorr_coeff values from FIG. 20. Step 2670 thereby finds the average estimated amplitude for thresholding purposes of the cross-correlation after smearing according to electronic processing in cross-correlation mitigation hardware Xcorr 400 or elsewhere represented (FIG. 26) by piecewise area-under-curve Equation (33) divided by the applicable time interval $t_{sm}=(t\_2-t\_1)$ or code lag interval (e.g., in chips), $$Xcorr\_coe\_avg=[A1+(C2+C3)/2+(C3+C4)/2+(C4+C5)/2+A2]/(t\_2-t\_1) \quad (33)$$

where $$A1=(C2-(C2-C1)(2-t\_1)/2)(2-t\_1) \quad (33.1)$$

$$A2=(C5+(C6-C5)(t\_2-5)/2)(t2-5) \quad (33.2)$$

A combining function is thus applied, such as in Equation (33), or is alternatively applied by some weighted or unweighted summation or averaging function or some other suitable combining function. Depending on the length of the code lag interval $(t\_2-t\_1)$, fewer than all eight Ci values of Xcorr_coeff in FIG. 20 or more than those eight are generated and selected for use in the averaging computation. In other words, the complex values Ci of Xcorr_coeff_Real/Imag that pertain to the smearing interval $t_{sm}=(t\_2-t\_1)$ are the ones illustrated in FIG. 26 and that get selected by software for averaging according to Equation (33). To keep the nomenclature clear, note that the value t_1 refers to exact measured codephase $\phi=c_1-c_2$ discussed earlier hereinabove. Value t_2 is obtained by software as the sum of t_1 plus the value of smearing time $t_{sm}$ from Equation (29).

Note that the value of $t_{sm}$ from Equation (29) can be positive or negative. Time t_1 is the time or code lag signified by code lag k in FIG. 20. Correspondingly, and depending on the sign of the Doppler difference f1–f2, the FIG. 26 Ci values of Xcorr_coeff are generated in FIG. 20 to either succeed or precede the value of Xcorr_coeff at code phase k. The reason for this is seen by considering the relative motion of the superimposed graphs of FIG. 10. Visualize the graph of the Sv1 peak moving at a rate proportional to the Doppler shift f1, rightward if f1 is positive and leftward if f1 is negative. Further visualize the graph of the entire cross correlation profile of FIG. 10 moving at a rate proportional to the Sv2 Doppler shift f2, rightward if f2 is positive and leftward if f2 is negative. Relative to the position of a valid received Sv1 peak, the motion of the graph of the entire cross correlation profile of FIG. 10 moves at a rate proportional to the Doppler difference f1–f2, rightward if f1–f2 is positive and leftward if f1–f2 is negative. Heuristically, this visualization of the relative motion underlies the lack of smearing analyzed in FIG. 23 when the Doppler difference is zero because the superimposed graphs are moving in the same direction at the same rate (code Doppler) and one given cross correlation value in the profile remains at the position of the Sv1 peak as both move in tandem. And when the Doppler difference is nonzero, this visualization underlies the smearing and its possible directions as discussed here in connection with FIGS. 24, 26, and 20. When the Doppler difference is nonzero, the complex-valued cross correlation profile kaleidoscopically sweeps across the Sv1 peak. The cross correlation profile sweeps across the hypothesized code lags for Sv1. The Sv1 signal may or may not be present at the hypothesized lags and Doppler. If the Sv1 peak is moving rightward faster (or leftward slower) than the cross correlation profile, then the Doppler difference f1–f2 is positive and cross correlation profile kaleidoscopically sweeps relatively leftward across the Sv1 peak. If the SV1 peak is moving leftward faster (or rightward slower) than the cross correlation profile, then the Doppler difference f1–f2 is negative and the cross correlation profile kaleidoscopically sweeps relatively rightward across the Sv1 peak. This is why, depending on the sign of the Doppler difference f2–f2, the FIG. 26 Ci values of Xcorr_coeff are generated in FIG. 20 to either succeed or precede the value of Xcorr_coeff at code phase k and used in FIG. 24. The extent of this sweep or smearing is specified by smearing time $t_{sm}$ of Equation (29), so the pertinent Ci values of Xcorr_coeff are those that lie within the code-lag-based smearing time $t_{sm}$ and that have arisen by virtue of the Sv1 and Sv2 satellite physical motions during the integration dwell_time.

Let it be emphasized that Sv1 need not be present at all at the searched Doppler f1 and the code lags. If the receiver searches for Sv1 at Doppler f1, it will automatically see these smeared cross correlation peaks from Sv2 at a Doppler f2. The presence of the smeared cross correlation peaks are irrespective of the presence of the Sv1 signal.

In FIG. 24, Peak Checking substeps 2620 are suitably executed after the complete integration is done. Another form of the process embodiment like FIG. 24 is instead the same as FIG. 16 except that step 630 of FIG. 16 is replaced by this more generalized process that computes average cross correlation coefficient. This average cross correlation coefficient as described is a function of cross correlation coefficients at multiple lags.

Also, FIG. 24 step 2615 has an integration dwell time, e.g. 1-sec, for the lower power peak, just as an example and in general the integration time could be any value, e.g., values for integration duration for low power SV's in a range 200 ms to 64 secs.

In general, and as noted in connection with Equation (16) and FIG. 20 hereinabove, the code phase difference $\phi=c1-c2$ is not an exact multiple of chips. In some embodiments, microprocessor 370 enters the exact measured code phase difference value $\phi=c1-c2$ into register field Code0_Shift. Depending on whether the sign of the Doppler difference f1–f2 is positive or negative, cross-correlation mitigation hardware Xcorr 400 electronically rounds down RD or rounds up RU the code phase difference value $\phi$ as expressed by equation (34).

$$k = \begin{cases} RD(\phi) & \text{if } f1-f2 >= 0 \\ RU(\phi) & \text{if } f1-f2 < 0 \end{cases} \quad (34)$$

Note also that when smearing $t_{sm}=0$ then Equations (33)-(33.2) reduce to and use only the two computed cross correlation values $C1=c(1)=Xcorr(k)$ and $C2=c(2)=Xcorr(k+1)$. Also, the cross correlation result in that case is equivalent to that obtained from Equation (16).

Selected values for piecewise computation of FIG. 24 step 2670 are obtained from register 415 and are designated here as Xcorr(k) through Xcorr(k1) inclusive. Xcorr(k) in FIG. 20 is the value labeled c(1) of FIG. 26, and which is the value designated as C1 of Equations (33)-(33.2). Xcorr(k1) here is the value labeled as if k1 were equal to six (6) in c(6) of FIG. 26, and which is the value designated as C6 of Equations (33)-(33.2). In general, however, the integer value k1 is the number given by Equation (35), where smearing time $t_{sm}$ is electronically computed positive or negative from Equation (29) discussed earlier hereinabove.

$$k1 = RU(\phi + t_{sm}) \text{ if } f1-f2 >= 0 \quad (35A)$$

$$k1 = RD(\phi + t_{sm}) \text{ if } f1-f2 < 0 \quad (35B)$$

Further in FIG. 24, next, a step 2680 then electronically subtracts the estimated average value xcorr_coe_avg (db) for the cross correlation from the measured value A(SVj) of amplitude (db) of high powered interfering signal SVj. That high power amplitude is approximately constant during the integration interval and is thus taken into account. In FIG. 24, the legending indicates the analogy or parallelism of notation between step 635 that involves a computed cross correlation Xij in FIG. 16 and the step 2680 of FIG. 24 that involves the computed average cross correlation Xcorr_coe_avg, wherein Xij is replaced by Xcorr_coe_avg.

In FIG. 24, a decision step 2640 then electronically compares the difference obtained by electronic subtraction in step 2680 with a threshold quantity of db (e.g., 5 to 6 dB, representing some suitable power margin M). If the difference exceeds the threshold quantity (Yes) in step 2640, then the step 2650 declares and records the observed peak as a valid peak in any suitable manner such as by entering the Doppler shift in code lag corresponding to the lower powered satellite vehicle SVi for which the search is made. Otherwise, if No in step 2640, then operations pass through point E and go to a step 2645 that does a systematic update to the search position and loops back through search exhaustion test 2648 to find another peak.

Figure 26:
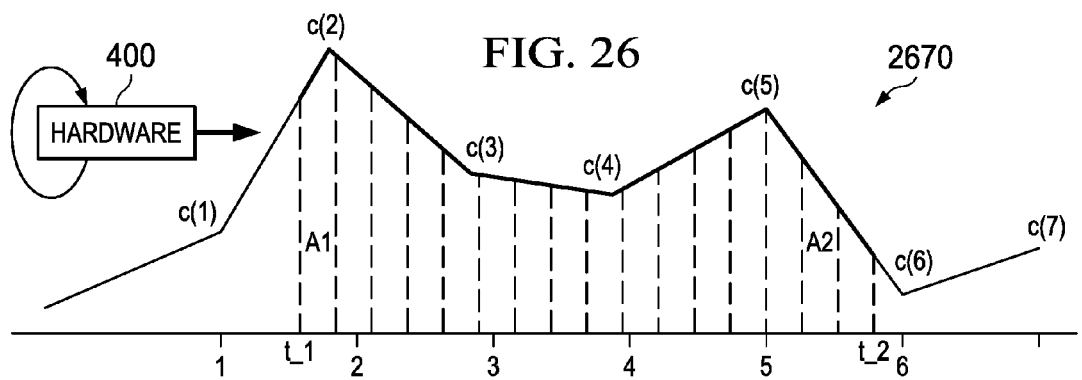
FIG. 26 is a graph of estimated cross correlation coefficients from the circuit of FIG. 20 and useful in some forms of the processes of FIGS. 24 and 33-35.

The C(n) values shown in FIG. 26 are illustrated as if they were the magnitude of cross correlation coefficients, but in reality the Cn are complex-valued coefficients due to the exponential factor $\exp(j2\pi(f2-f1)t)$ in cross-correlation Equation (9). These complex-valued coefficients have the real and imaginary parts provided, for instance, as in FIG. 20 xcorr_coeff_Real/Imag. When interpolating adjacent coefficients, the electronic computation according to Equation (33) is operable to electronically add up destructively to yield smaller amplitudes in the sum than some amplitude of a given summand Cn. That means the resulting average from Equation (33) is lower and less pessimistic and more desirable as a threshold. Taking magnitude of Cn in some embodiments can simplify the implementation but leads to a more pessimistic estimation of cross correlation energy. Note also that exponential factor $\exp(j2\pi(f2-f1)t)$ becomes more important to determining the sum when the Doppler difference is very large and/or the smearing time is very long.

Some embodiments pattern this smeared peak embodiment after any of Equations (12), (13) or (20) without using db, such that the threshold is computed for instance as the product of the Sv2 high power signal amplitude times the average smeared cross correlation coefficient times the margin factor:

$$Th = A_2 * \|Xcorr\_coe\_avg/1023\| * m \quad (36)$$

A theoretical discussion of a model of smearing is provided next using FIGS. 27-29B. This discussion facilitates understanding of the concept of smearing and some of its qualitative properties by considering a special case of one cross correlation peak being smeared across the smearing time. It is emphasized, however, that the structures and operation described in FIGS. 24-26 execute an even more intricate estimation of the varying complex cross-correlation coefficients involved in smearing.

Figure 27:
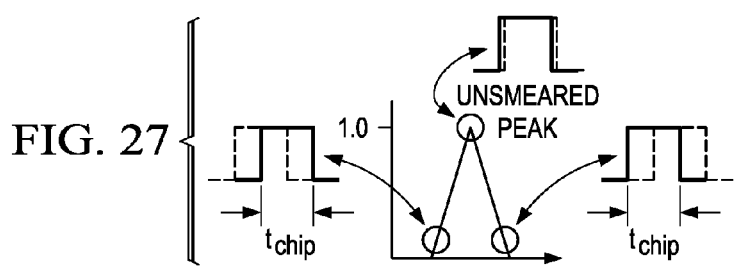
FIG. 27 is a graph of amplitude versus code lag of a PN code correlated with itself to produce a triangular unsmeared peak.

With smearing absent, FIG. 27 shows how the area of overlap of a chip with itself goes from maximum at full overlap to zero by displacement right/left by $+/-1.0\,t_{chip}$. Put another way, the autocorrelation of a PN code with itself goes from a maximum at full overlap to zero at $+/-1.0\,t_{chip}$. The graph of overlap is therefore triangular as shown at left and right in FIG. 27. The width W of the sharp peak is $2t_{chip}$.

Figure 28A:
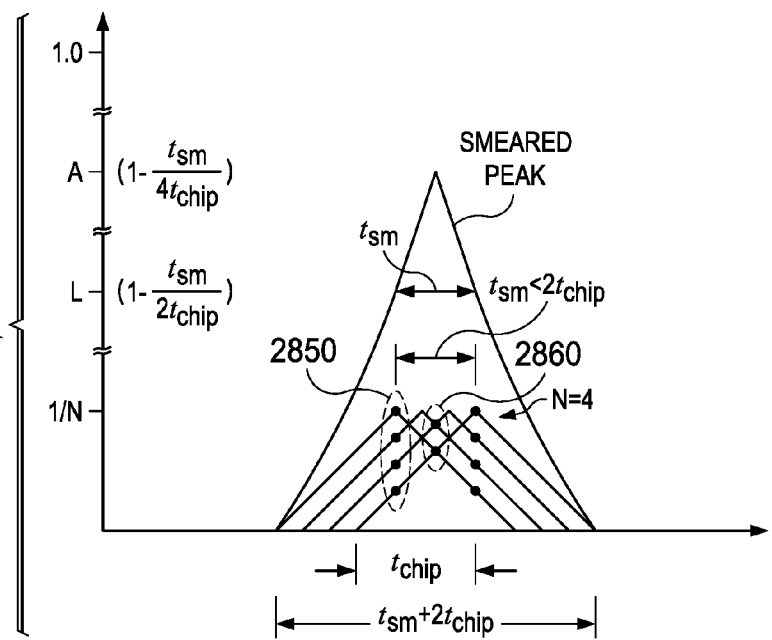
FIG. 28A is a graph of amplitude versus code lag of successive triangles representing cross correlation of a PN code with another PN code and accumulated in FIG. 25 over a dwell time to produce a smeared peak with an attenuation A and a smearing time relative to an unsmeared peak.
Figure 29A:
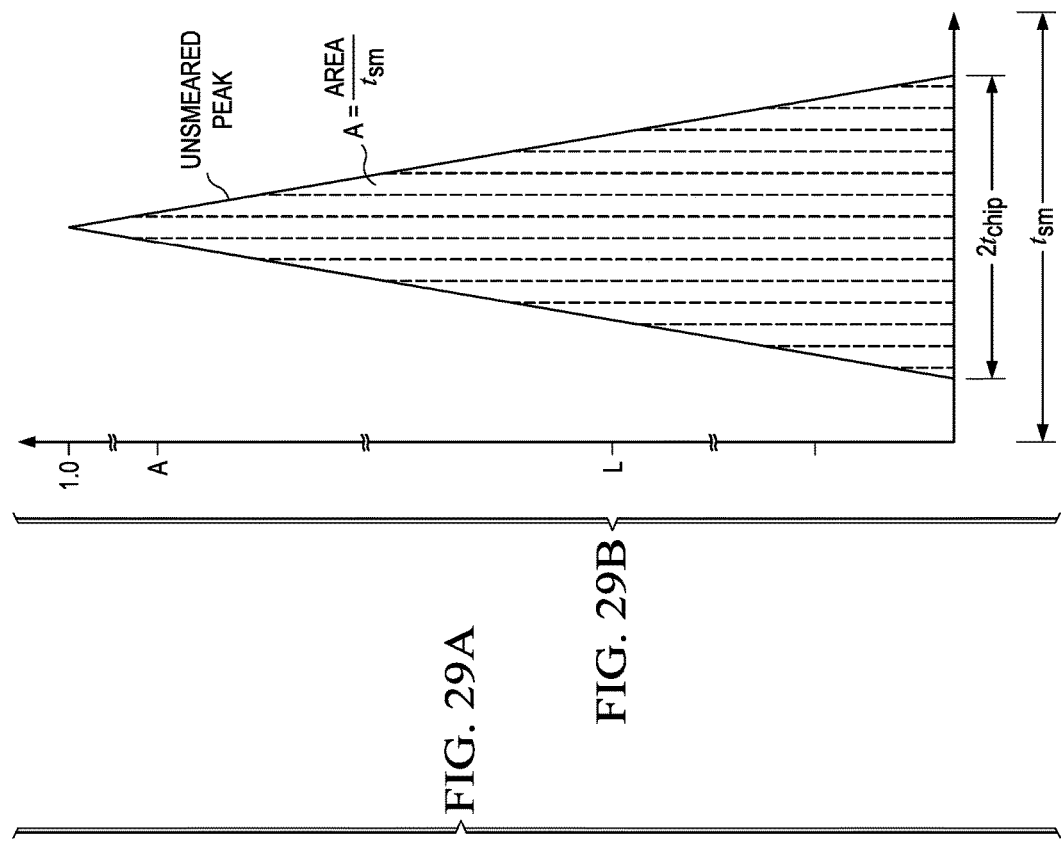
FIG. 29A is a graph analogous to FIG. 28A but wherein the smearing time is substantially greater than in FIG. 28A.

The smearing model described in the next few paragraphs concludes with Equation (39) and expresses as its result an attenuation A caused by smearing of FIG. 28A or 29A to the cross correlation peak.

By way of introduction to the model, a given sharp cross correlation peak of a given intensity represented as unity (1.0) height can be heuristically pictured as the sum of a large number N of small peaks having the same width W but 1/N the height of the sharp peak, superimposed on one another and adding up to constitute and equal the height of that sharp peak of unity height.

Smearing spreads the small peaks across a wider range of chips. Accordingly, at any one chips value, the N small peaks sum up (by integration in the receiver) to a peak, but of less height or intensity. That peak of less height is thus attenuated by a factor A relative to the height of the original sharp peak.

In FIGS. 28A and 29A, the width of a peak is also the dimension from the peak middle value of chips to a tail at one side of the sharp peak. In FIG. 28A, the smearing time $t_{sm}$ is less than $2t_{chip}$. In the middle-left point set 2850 of the smeared peak, the N small peaks extend a proportion of the slant of a small peak down from its middle and the proportion x is given by $t_{sm}/t_{chip}$. However, in the very middle set of points 2860 of the smeared peak for which the sum is the most, N/2 pairs of crossovers of the small peaks extend a proportion x/2 of the slant of a small peak down from its middle. The attenuation A is the sum of the heights of N points at the N/2 crossovers, i.e. two (2) points at each of the N/2 crossovers to account for N peaks each having a height 1/N. Some embodiments recognize that this sum is a complex sum due to the exponential factor $\exp(j2\pi(f2-f1)t)$ in cross-correlation Equation (9). In some other embodiments, that exponential factor is ignored. For the introductory example next, the exponential factor is ignored for purposes of the sum, and Attenuation A is therefore given by Equation (37 and 37A) in the limit for large N. It will not really be a complex sum since it can be visualized as though these peaks are added non coherently. As an example if we take a (20,50) dwells, it can be visualized as though 50 small peaks are added non coherently, but since they are not aligned the peak is smeared and attenuated.

$$A = \lim_{N \to \infty} (2/N) \sum_{i=1}^{N/2} [1 - (x/2)(i/(N/2))] \quad (37)$$

$$A = \lim_{N \to \infty} [(N/2)/(N/2)) - (2/N)[(N/2)((N/2)+1)/2](x/2)/(N/2)$$

$$A = 1 - x/4 = 1 - t_{sm}/4t_{chip} \text{ when } t_{sm} < 2t_{chip} \quad (37A)$$

On the other hand, in FIG. 29A, the smearing $t_{sm}$ is greater than or equal to $2t_{chip}$. Heuristically speaking, in the middle of the smeared peak, the contributions from crossover points 2960 of small peaks extend all the way down the slant of a small peak. But this time the number of crossover points 2960, the ones which contribute to the overall smeared peak height sum in its middle, is only a fraction r of the N small peaks. That fraction r is the same as the ratio $2*t_{chip}/t_{sm}$. The factor of 2 gets cancelled by one more factor of 2 which comes because all the peaks do not contribute equally. Hence the final attenuation becomes tchip/tsm. The attenuation A is the sum of the heights of two (2) points in each of the Nr crossovers in set 540, and attenuation A is therefore given by Equation (38 and 38A) in the limit for large N.

$$A = \lim_{N \to \infty} (2/N) \sum_{i=1}^{Nr} [1 - i/(Nr)] \quad (38)$$

$$A = \lim_{N \to \infty} 2[(Nr/N) - Nr(Nr+1)/(2N^2 r)] = \quad (38A)$$

$$r = t_{chip}/t_{sm} \text{ when } t_{sm} >= 2t_{chip}$$

The smeared peak attenuation A is summarized by Equation (39):

$1-x/4=1-1/(4r)=(1-t_{sm}/4t_{chip})$ when $t_{sm} \leq 2t_{chip}, r \geq 0.5$, $0 \leq x \leq 2$ $A=$ $r=1/x=t_{chip}/t_{sm}$ when $t_{sm} \geq 2t_{chip}, 0 \leq r \leq 0.5, x \geq 2$ (39)

Figure 30A:
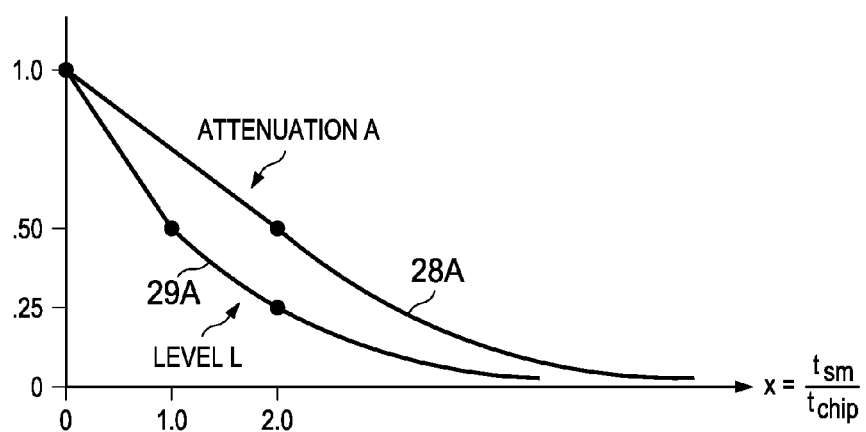
FIGS. 30A and 30B are respective graphs each showing both attenuation A and Level L of the smeared peaks of both FIGS. 28A and 29A versus a ratio in FIG. 30A of smearing time relative to chip time or versus a reciprocal ratio in FIG. 30B.
Figure 30B:
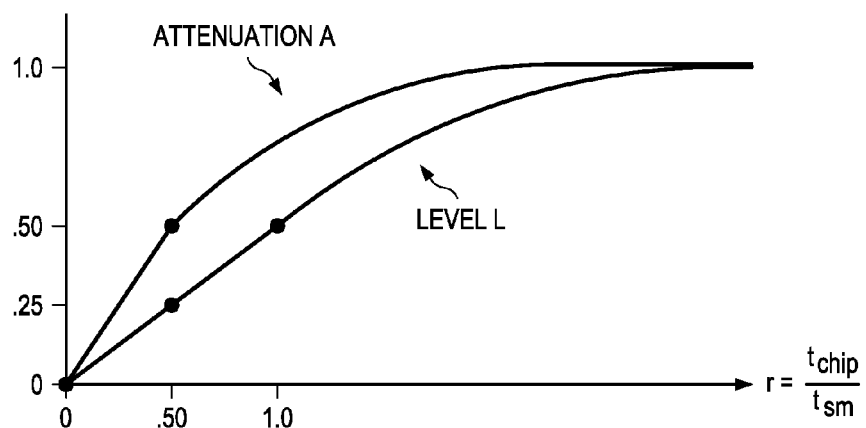

FIGS. 30A and 30B show a curve of the model Equation (39) attenuation A versus ratio r and fraction x respectively. In Equations (37)-(39), smearing time is $t_{sm}$ from above Equation (29) and chip period is designated by $t_{chip}$ (e.g., 1 sec/(1.023e6)).

Figure 28B:
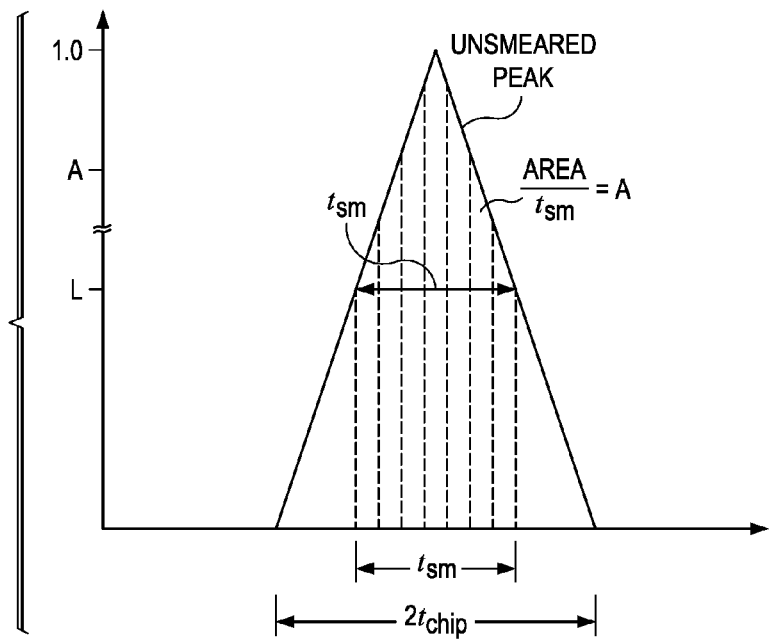
FIG. 28B is a magnified graph of amplitude versus code lag analogous to FIG. 27 and showing a relationship of average area under part of the unsmeared peak to the attenuation A and a lower Level L of the smeared peak of FIG. 28A.
Figure 29B:
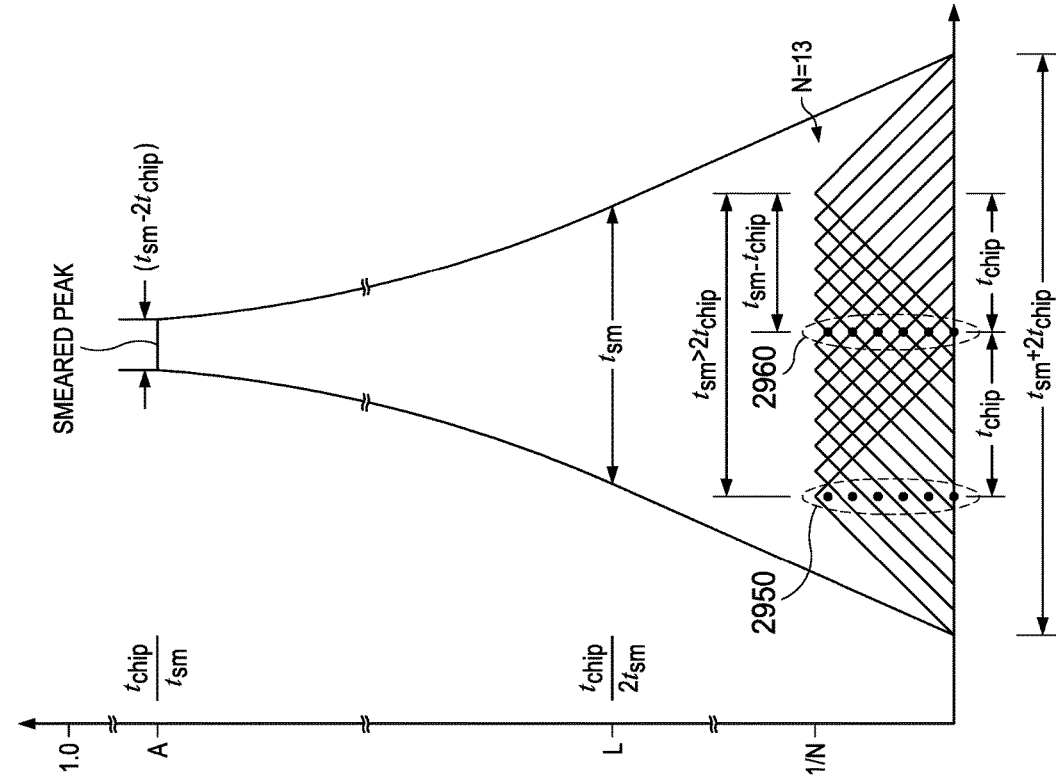
FIG. 29B is a magnified graph of amplitude versus code lag analogous to FIG. 27 and showing a relationship of average area under all of the unsmeared peak to attenuation A of the smeared peak of FIG. 29A.

Because $t_{sm}/N$ can also be thought of as a small incremental time across the horizontal width of an unsmeared peak, a sum of points on the unsmeared triangular curve of a peak times $t_{sm}/N$ can also be interpreted in the limit as an area under part or all of that triangular curve as shown in FIGS. 28B and 29B. This Area interpretation is expressed in algebra by a change of variable compared to attenuation A in Equation (37) and in Equation (38). In both cases, the result is that attenuation A is interpreted as an average height over the Area swept out over an interval of time t equal to the smearing time $t_{sm}$. A factor two (2) is interpreted as referring to symmetric pairs of points on the triangular shape on either side of its peak.

Corresponding to the Area under a portion of the triangle in FIG. 28B is the equation (37B):

$$\text{Area} = \lim_{N \to \infty} 2 * \sum_{t=tsm/N}^{tsm/2} [1 - (x/2)(Nt/t_{sm})/(N/2))](t_{sm}/N) = \quad (37B)$$

$$A * t_{sm} \text{ when } t_{sm} \leq 2t_{chip}$$

Equation (38B) relates the Area under the entire unsmeared triangle in FIG. 29B to the attenuation A:

$$\lim_{N \to \infty} 2 * \sum_{t=tchip/Nr}^{tchip} [1 - t/t_{chip})](t_{chip}/Nr) = \quad (38B)$$

$$\text{Area} = A * (t_{chip}/r) = A * t_{sm} \text{ when } t_{sm} \geq 2t_{chip}$$

Discussion now turns to a tabulation of the attenuation A. For convenience, the attenuation A is expressed in decibels (db) so that $$A \text{ (db)} = 20 \log_{10}(A) \quad (40)$$

For example, if a 1-sec integration by Mechanism-2 is performed as shown below, the attenuations A(db) are computed from the Equations (40 and 39) and yield the various attenuation values in TABLE 2. In words, the faster a single cross-correlation peak sweeps by a valid low power Sv1 peak, the less interference is made by the cross-correlation peak. The Doppler difference is related to the rate at which the cross-correlation peak moves.

TABLE 2

ATTENUATION OF CROSS-CORRELATION PEAK

| Doppler difference | Attenuation (db) (1 sec integration) |
|---|---|
| 1 Khz | 1.54 |
| 2 Khz | 3.41 |
| 3 Khz | 5.80 |
| 4 khz | 8.2931 |
| 5 khz | 10.2313 |
| 6 khz | 11.8149 |
| 7 khz | 13.1539 |

Note that TABLE 2 assumes that the cross correlation peak goes to zero after one-chip whereas in reality the cross correlation peak can be somewhat flat if the cross correlation is high at two consecutive code-phases. The most general case is that of multiple cross correlation coefficients of different values each.

Figure 30C:
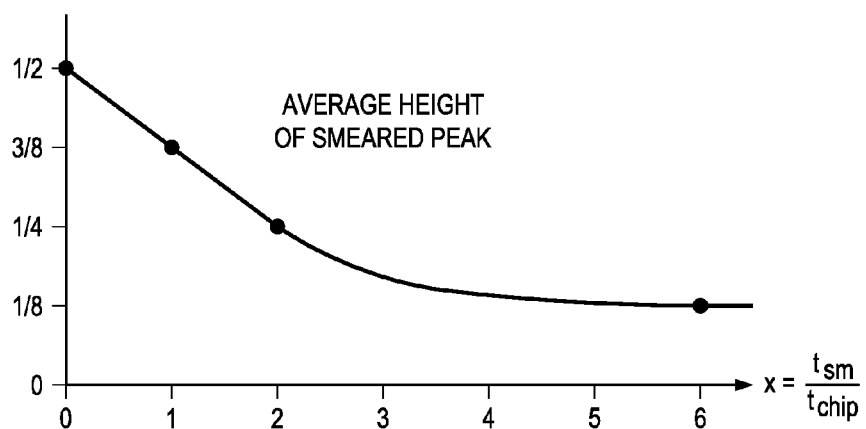
FIG. 30C is a graph of average height of a smeared peak versus the ratio of smearing time to chip time.

FIG. 30C illustrates how the predicted average height ~a of a smeared peak diminishes as a function of smearing x. Since the smearing x can be measured for a given peak, the predicted average height can be electronically computed. The average height of smeared peak is its average over its width. The average height in FIG. 30C starts from ½ when there is no smearing since the peak is triangular in FIG. 29B and the area of a triangle is ½ base times height, Also, the relationship of smearing $x=t_{sm}/t_{chip}$ to the measured width $t_W$ of a peak is found from:

$$t_W = 2t_{chip} + t_{sm} \quad (40)$$

Then the smearing x is given by $$x = (t_W/t_{chip}) - 2 \quad (41)$$

Figure 31:
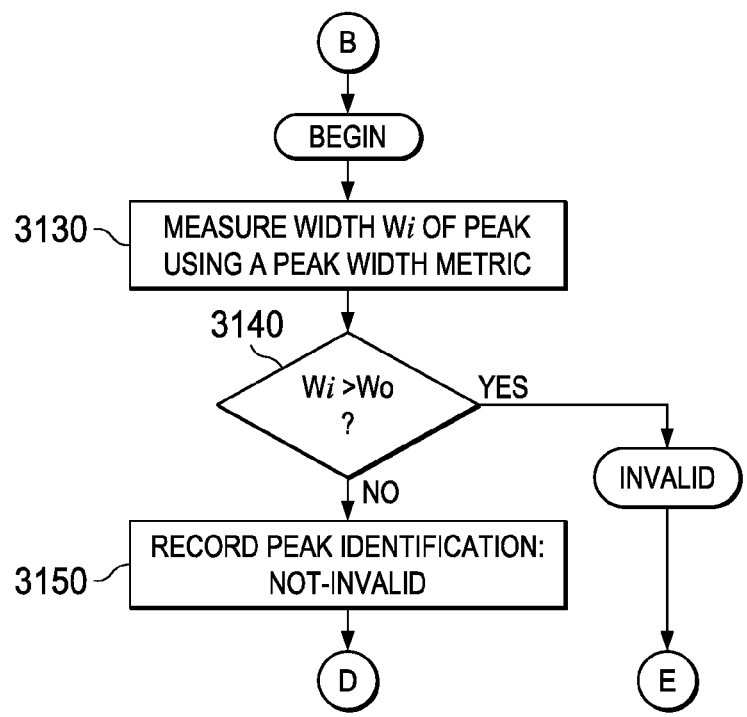
FIG. 31 is a flow diagram of another inventive process (Mechanism 4) for qualifying a peak as a true peak using a peak width metric, with the process shown as either an alternative or supplemental portion to a portion of FIG. 16 and suitably performed in the structures of FIGS. 5 and 11.

FIG. 31 is positioned on a drawing page below FIG. 12. In FIG. 31, note also that, as shown at location t5 of FIG. 8, the cross correlation coefficient can be similar at adjacent chip phases and hence will look like a flat (smeared) peak there. If a peak is smeared, it is regarded as invalid for at least some purposes here. However, not every invalid peak is smeared much, such as cross-correlation peaks at zero or 1 KHz Doppler difference, or peaks resulting from a correlator architecture using a relatively short dwell time. Smeared peaks can be rejected by an embodiment designated Mechanism 4 here using a peak width metric with a threshold (e.g., set conservative).

In FIG. 31, Mechanism 4 includes process steps that are concisely shown. Surrounding steps of FIG. 16 join FIG. 31 at points (B), (D), (E). Also, the steps of FIG. 31 are suitably included in a more elaborate process like that of FIG. 35. Microprocessor 370 software controls or supports the FIG. 31 process steps as respectively appropriate. In some other embodiments, a hardware module associated with the correlators automatically implements peak width measurement and has a comparator to repeatedly qualify various peaks as valid or invalid. The process steps operate as follows to:

1) measure the width $W_i$ of a given peak using a peak width metric in a step 3130.
2) compare by step 3140 the measured width $W_i$ with a threshold $W_0$, (e.g., in some cases a very conservative threshold), or a threshold such as a value selected from the range three (3) to ten (10) chips or more, and
3) if the threshold $W_0$ is exceeded at step 3140, reject the peak as an invalid smeared cross correlation peak and reach point (E).
4) Otherwise, execute a step 3150 to record the peak ID with code-lag, Doppler difference, and Not-Invalid status, whence point (D) is reached. If step 3140 is "No" (Wi<=Wo), the step 3150 status Not-Invalid signifies the process does not assure that the peak is a valid peak. If Wi>Wo, (Yes in step 3140), the process does assure that the peak is Invalid—not a valid peak.

In step 1 (3130) above, any suitable peak width metric is used. One type of peak width metric expresses a peak width as a range of code lags for which the received amplitudes are all above a specified threshold called a width floor herein. The width floor is set, for instance, at an appropriately low-enough Level L as in FIGS. 28A and 29A so that scanning across code lags in FIG. 28A or FIG. 29A will detect any existent substantial width but not such a low level as to be affected by noise. Level L is different from an electronic filter 3 db point in that Level L is heuristically established to be such that the width of the part of the peak that is above Level L is equal to the smearing time $t_{sm}$.

The smeared peak attenuation A is summarized by Equation (39):

$$A = \begin{cases} 1 - t_{sm}/4t_{chip} & \text{when } t_{sm} \le 2t_{chip}, \\ t_{chip}/t_{sm} & \text{when } t_{sm} \ge 2t_{chip}. \end{cases} \quad (39)$$

$$t_{sm}/t_{chip} = [(f2-f1)/(1.575e9 \text{ Hz})]^*(\text{dwell\_time})^* 1.023e6 \quad (29)$$

Implementation of the peak width metric for Step 1 of Mechanism 4 then establishes the width-floor as if the peak were a cross correlation peak. The electronic computation of the peak width metric uses the measured high power signal from Sv2 cross correlated with the Gold code for Sv1 being searched or tracked, and then discounted down to the Attenuation A by a computation substantially along the lines of below Equation (43) using Equations (39) and (29). An experience adjustment value such as a margin m with expected adder value varied from zero (or a factor k varied from 1.0 as a multiplier) is included in case experimental testing provides any useful empirical adjustment.

$$\text{Width Floor} = \text{Power}(Sv2) + 20^* \log 10(V/1023) + 20^* \log 10(A) - 3 \text{ db} + m \quad (43)$$

Another version of Mechanism 4 uses Level L from FIGS. 28A and 29A. The quantitative derivation of Level L is based on point sets 2850 and 2950 and is analogous to and differently supplements the derivation given for Attenuation. (Note that Attenuation derivation was based on point sets 2860 and 2960 instead.) Level L is heuristically expressed by analogy with Equation (39), and is combined with smearing time equation (29), as follows:

$$L = \begin{cases} (1 - t_{sm}/2t_{chip}) & \text{when } t_{sm}/t_{chip} \le 1, \\ t_{chip}/2t_{sm} & \text{when } t_{sm}/t_{chip} \ge 1. \end{cases} \quad (44)$$

Implementation of the peak width metric for Step 1 of Mechanism 4 then establishes the width-floor as if the peak were a cross correlation peak. The electronic computation of the peak width metric uses the measured high power signal from Sv2 cross correlated with the Gold code for Sv1 being searched or tracked, and then discounted down to the Level L by a computation substantially along the lines of below Equation (45A) or (45B) using smearing time Equation (29). An experience adjustment value such as a margin m with expected adder value varied from zero (or a factor k varied from 1.0 as a multiplier) is included in case experimental testing provides any useful empirical adjustment.

$$\text{Width Floor} = \text{Power}(Sv2) + 20^* \log 10(V/1023) + 20^* \log 10(L) + m \quad (45A)$$

In multiplicative product form, and by analogy with Equation (12), Equation (45B) is given as:

$$\text{Width Floor} = A_2 * [V(\varphi, f2-f1)/1023] * L * k \quad (45B)$$

The Mechanism 4 then scans across the correlator output as a function of code lag and rejects any widened peaks that have a width that is sufficiently wide as determined by step 2 of Mechanism 4 to justify rejecting the peak as a smeared cross-correlation peak.

Another embodiment is called a Long Coherent Integration Mechanism herein. Before describing FIG. 32 process steps, some discussion of principles is provided. The null-null bandwidth of a correlation peak resulting from coherent integration becomes successively smaller from 100 Hz (+/− 50 Hz in 20 ms coherent integration) to 50 Hz (+/−25 Hz in 40 ms integration) to 25 Hz (+/−12.5 Hz in 80 ms integration). Accordingly, Long Coherent Integration provides further protection against detection of cross correlation peaks because the Doppler difference has to be even closer to a multiple of 1 Khz to cause cross correlation peaks. Unless the Doppler difference is within the null-null bandwidth to a multiple of 1 kHz, the height of the cross correlation peak is negligible for present purposes. Accordingly, this Long Coherent Integration Mechanism is included in some forms of step 615 of FIG. 16 and step 2615 of FIG. 24, for instance.

To summarize, long coherent integration can also be used for close to zero Doppler difference. For example with 80 ms long coherent integration, the Dopplers have to be even closer by 12.5 Hz for the higher power SV to affect the low power SV's tracking Note that FIG. 32 describes Long Integration whereas the above paragraph describes Long Coherent integration. These two are different.

Due to different propagation delays for different SVs, bit edge location of SVs are random in nature relative to the clock edge of the receiver and relative to each other. Recall that each bit is +1 or −1 multiplied by and impressed on each 1 ms long 1023 chip PN code. As in FIG. 3A, a first bit A is repeatedly impressed on twenty consecutive 1 ms long instances of the PN code, followed by a second bit B that is also repeatedly impressed on twenty consecutive 1 ms long instances of the PN code. A "bit edge" refers to the end of the 20th PN code impressed with bit A or to the beginning of the first succeeding PN code impressed with bit B. Because of the varying positions of the SVs in the sky the time of arrival of each signal varies, and so bit edge location or a time of different SVs is random relative to one another.

A low-power SV signal, if present, will have a random 1-ms bit edge offset relative to a high power SV signal. The Long Coherent Integration Mechanism recognizes that each SV will have a random 1 ms bit edge and SVs will have random data bits or bit edges in FIG. 3A relative to other as well as each SV having its SV-specific pseudorandom PN Gold code. This offers some additional protection inherently in tracking. Since the data bits A, B, etc. could be either +1 or −1, coherently integrating a Gold code for more than 20 milliseconds after a bit edge would not necessarily increase signal to noise ratio. However, data bits may be known for a low power Sv1, or a 20 ms coherent integration may be able to be demodulated to a determine a given bit A, B, etc. Then the receiver is operated to appropriately multiply +/−1 times the modulated PN code for Sv1, whereby a longer length exceeding 20 ms of Sv1 PN code is available for coherent integration. This is called bit-removal, and coherent integration over the longer length is called Long Coherent Integration With Bit-removal.

Note also that coherently integrating a Gold code for 20 milliseconds or more that is unsynchronized with a bit edge does not increase signal to noise ratio or if it does, then not as fast as coherently integrating synchronized with a bit edge. Doing Long coherent integration (40 ms or 80 ms) with bit-removal offers better cross correlation rejection since the high powered SV will have random bits. In other words, the Long coherent integration (40 ms or 80 ms) using the SV1 PN code with bit-removal enhances the Sv1 peak because it is long and synchronized with the bit edge for each Sv1 bit. But the cross correlation of the Sv1 PN code with a high power Sv2 PN code over the Long coherent integration fails to correspondingly accumulate the cross correlation peaks very much because the Sv2 Gold code riding on the Sv2 signal is unsynchronized with the Sv1 bit edges. This lack of synchronization is called random bit edge here and it interferes with the accumulation that could otherwise occur to produce substantial cross correlation peaks. Accordingly, the valid peak is enhanced as a result of the Long Coherent Integration With Bit-Removal relative to the cross correlation peaks, and this means enhanced cross correlation rejection. Random bit edge is an in-built scheme in, or property of, the satellite system itself that is useful, used and leveraged here for constructing Mechanisms for better cross correlation rejection. Indeed, random bit edge is helpful here even for coherent integration having a duration over one repeated bit (e.g., 20 ms integration) as already discussed herein in connection with FIGS. 3A-3C.

When long coherent integration is used, of say 80 ms for Sv1, then irrespective of the relative bit edge of Sv2 there will still be a good rejection of cross correlation from Sv2 since the Sv2 data bits itself will not be same as Sv1 data bits. Hence the cross correlation peaks will destructively add. So random bit edge is different from random bits.

Figure 32:
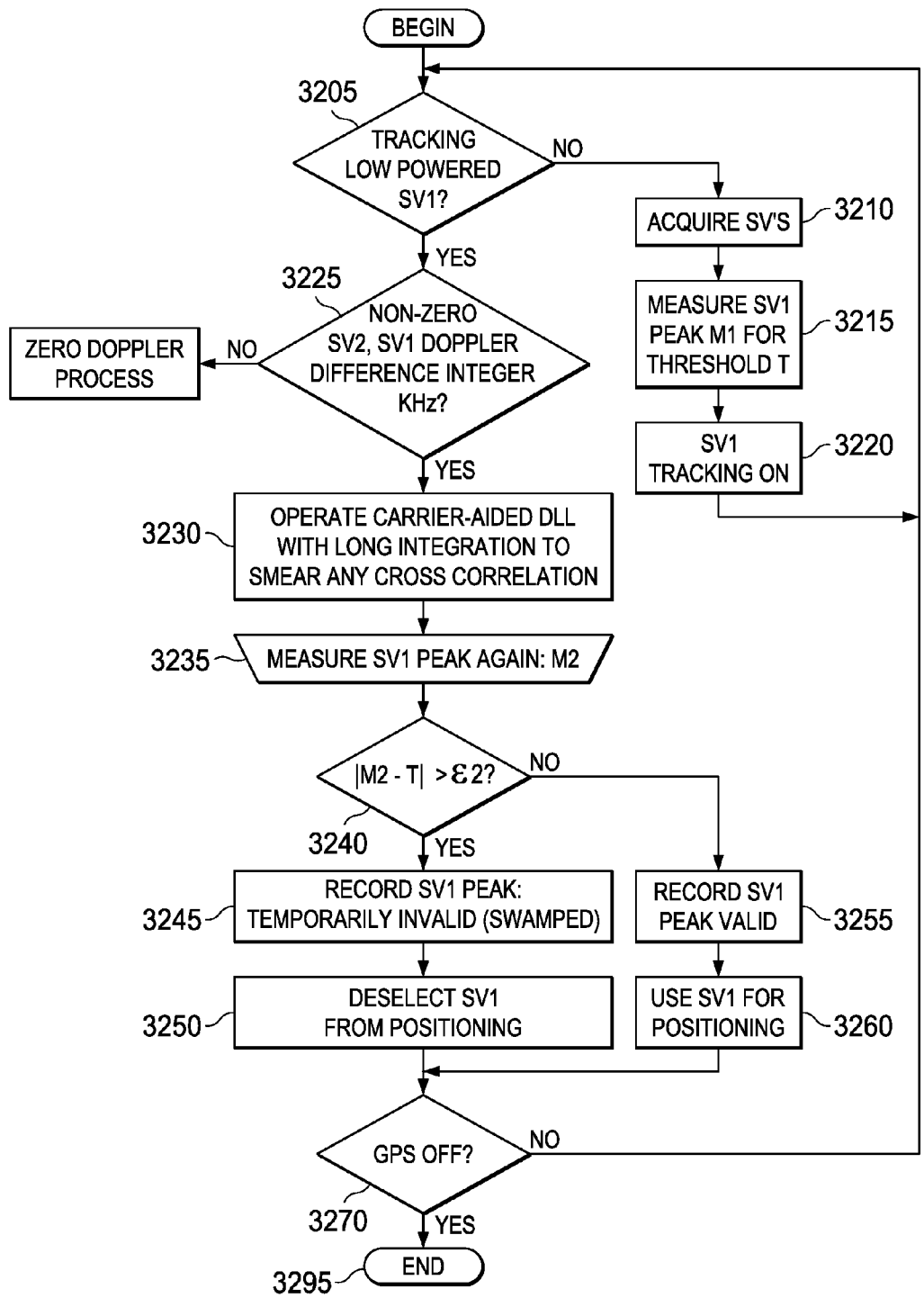
FIG. 32 is a flow diagram of an inventive process (Mechanism 5) of cross correlation protection for tracking for qualifying a peak as a true peak or not using long integration to test for cross correlation smearing of the peak, where long integration can be used to more reliably track the low power peak in the presence of cross correlation peaks from the higher power SV's, and long integration is equivalent to smaller tracking bandwidth.

In FIG. 32, one form of Mechanism 5 Cross Correlation Protection for Tracking operates as follows. While tracking a low powered peak in the presence of high powered SVs with non-zero Doppler difference, potential cross correlation peaks can come from either the left or right of the valid low powered peak and move near and swamp the valid low powered peak. The low powered peak, of course, is desirable to acquire and identify as valid. At such "swamped" times, a Mechanism 5 embodiment deselects a correlator output signal representing the low powered peak so that swamped peak is not used for positioning. This swamped condition is likely to be temporary and Mechanism 5 resumes or begins positioning operations using the lower powered Sv1 peak when that peak is no longer swamped.

Periodically in the Tracking section of FIG. 5, e.g., every second, Mechanism 5 computes the cross correlation coefficients around the currently-hypothesized low power peak as in FIG. 24 from the one or more existing high powered SV's. It uses the dedicated cross-correlation mitigation hardware Xcorr 400 such as in FIG. 20 for computing several cross correlation coefficients. The DLL (Delay Lock Loop) bandwidth is reduced appropriately to smear out the cross correlation peaks. Reducing DLL bandwidth is equivalent to increasing integration time. A Carrier Aided DLL can be used here since the DLL bandwidth can be reduced without sacrificing tracking of user dynamics.

The peak location information from the DLL is then temporarily not used by the Position Engine if cross correlation peaks are of high enough level, since that is equivalent to increasing the uncertainty of the measurement. Once the cross correlation peaks move away from the main peak for a given low power SVi, the measurements from that SVi can be used for positioning, i.e., their use can resume. In general, the computed cross correlation coefficients can be used to calculate the uncertainty (measurement noise) of any measurement.

In FIG. 32 another form of Mechanism 5 Cross Correlation Protection embodiment has electronic operations as follows. Operations commence with a BEGIN that follows pre-qualification for integer KHz Doppler difference such as in FIG. 17 or 18. Then a step 3205 determines whether a low powered SVi is being tracked. If not, other operations acquire one or more SV's in a step 3210. Then a step 3215 measures a lower power found-peak amplitude M1 (db) for subsequent comparison at step 3240. A step 3220 continues to track the peak for SVi. Operations loop back to step 3205 and since SVi is being tracked (Yes), operations proceed to a step 3225 to verify that a non-zero integer-KHz Doppler difference is involved. If not, operations go to a Zero Doppler-difference process (e.g., see FIG. 23). If non-zero integer-KHz Doppler difference (Yes) in step 3225, operations proceed to a following series of steps.

In step 3230 a DLL (Delay Lock Loop) in FIG. 5 is operated with its bandwidth reduced appropriately to smear out the cross correlation peaks due to satellite pairs such as SV1 and Sv2. Long integration can be used to more reliably track the low power peak in the presence of cross correlation peaks from the higher power SV's. Long integration is equivalent to smaller tracking bandwidth. Reducing DLL bandwidth is equivalent to increasing integration time, i.e., the dwell time in Equation (6B), so smearing time $t_{sm}$ is increased. A Carrier Aided DLL is suitably used here since the DLL bandwidth can be reduced without sacrificing tracking of user dynamics.

A succeeding step 3235 again measures the satellite Sv1 signal being tracked and measured value of the signal is designated M2. A threshold value T is generated based on the earlier measured Sv1 peak M1 adjusted for difference between the integration dwell time in acquisition step 3210 and the integration dwell time used in tracking in step 3230. The adjustment increases a first strength value M1 for the peak from the first integration period Dwell1 relative to a second strength value M2 for the peak in the second integration period Dwell2 by increasing the first strength value M1 or decreasing the second strength value M2 or adjusting some function such as the ratio M2/M1 of the first and second strength values. The adjustment is suitably such as to equalize the strengths for a valid peak in the two different length integration periods such by applying an adjustment amount in db of approximately $10*\log_{10}(\text{Dwell2}/\text{Dwell1})$. Remarkably, if little cross correlation is present, the intensity values are more nearly equalized, but if significant cross correlation interferes, the values are made more disparate, which improves the comparison process.

In general, signal powers can vary with time. This may be an issue with comparing signal strengths from two different integration periods. Accordingly, step 3235 and a step 3240 in some embodiments are refined to cooperate for measurement, adjustment and comparison, such as to also check another pair of integration periods and/or combine operations with Xcorr 400 of FIG. 20 or otherwise recognize and detect or compensate the role of varying signal powers.

In FIG. 32, a decision step 3240 compares the magnitude of difference ABS(M2−T) to determine whether that magnitude is greater than a comparison value ε2. If so (Yes in step 3240), then a step 3245 records an entry for the Sv1 peak specifying that it is Temporarily Invalid (Swamped), and a step 3250 deselects Sv1 positioning information or otherwise rejects the peak and temporarily prevents its use by Positioning Engine 2270 (FIG. 38). This step is determining whether the strength of the peak effectively differs substantially in the different integration periods.

If No in step 3240 instead, then a step 3255 records an entry for the Sv1 peak specifying that it is Valid, and a step 3260 contributes Sv1 positioning information for use, or resumes its use, by Positioning Engine 2270. After either of steps 3250 and 3260 operations loop back to execute step 3205 and the subsequent steps to continually or repeatedly provide cross correlation protection for tracking of each of the low power satellites like Sv1. If GPS is turned off in a step 3270, a branch is taken from the loop to END 3295.

In general, the operations of FIG. 32 compare the Sv1 peak with itself using different integration periods for cross correlation protection for tracking. In the absence of significant cross correlation, the Sv1 peak should be about the same either way provided that some db of Sv1 signal adjustment is taken into account due to the different integration times. However, if the tracking DLL accumulates the Sv1 peak plus significant overlapping cross correlation into the result M2, then M2 exceeds the expected amount T due to Sv1 alone and breaks the expected substantial equality in step 3240. Or if the tracking DLL locks onto some low power cross correlation lobe and loses the Sv1 peak itself, then accumulated result M2 is substantially less than the amount T expected from Sv1. Either way, operations at step 3240 (Yes) go to step 3245 because of the invalid condition.

Figure 33:
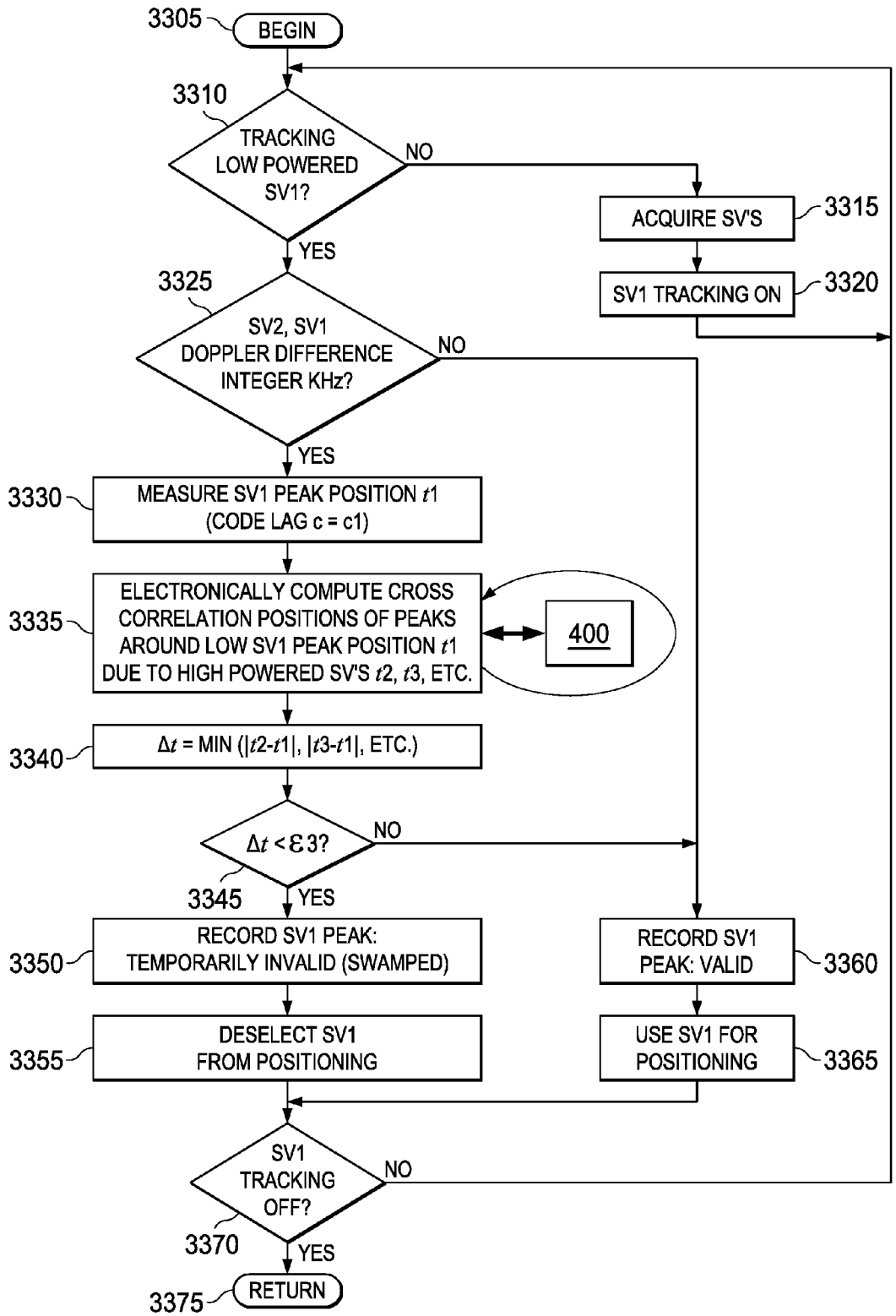
FIG. 33 is a flow diagram of another inventive process (Mechanism 6) of cross correlation protection for tracking for qualifying a peak as a true peak or not by testing how close the positions of nearby cross correlation peaks are.

In FIG. 33, some embodiments according to a Mechanism 6 herein omit the DLL and compute the displacement or closeness value of the position of the nearest cross correlation peak to the possible-Sv1 peak in question. Suppose the position of the nearest strong cross correlation peak is less than a threshold equal to a predetermined time displacement from the hypothesized peak for satellite Sv1. Then relative motion of high power Sv2 and lower power Sv1 relative to each other and the receiver 100 could cause smearing migration of the strong cross correlation peak across a valid lower power Sv1 peak during the dwell time and corrupt such a valid lower power Sv1 peak. In FIG. 33, an embodiment prevents the use of the position of the possible-Sv1 peak for positioning purposes if the closeness of the position of the nearest cross correlation peak is less than a threshold equal to a predetermined time displacement from Sv1. The threshold with some forms is statically predetermined and configured, and other forms is dynamically estimated from already-acquired information about the Sv2 signal such as by applying smearing time Equation (29) that relates $t_{sm}$ to Doppler difference f2−f1.

In FIG. 33, operations commence with BEGIN 3305 and proceed to a decision step 3310 and determines whether a low powered satellite Sv1 signal is being tracked. If not, operations at steps 3315 and 3320 perform acquisition and loop back to step 3310 whence a low powered satellite Sv1 signal is tracked, and go to a Doppler difference decision step 3325. Notice that zero or non-zero integer KHz Doppler difference can have the cross-correlation problem and be beneficially checked by Mechanism 6 of FIG. 33. As an example, let initial Doppler difference be 500 Hz and with time the Doppler difference comes close to 0 Hz. Then immediately cross correlation peaks will start or become more likely to start swamping the low power peak. So it is good to do these checks even for zero Doppler. And the checks are desirably done for every high power SV with integer (0, 1, 2, etc.) Khz Doppler difference. If the Doppler-difference is non-integer KHz, operations bypass the test of FIG. 33 and regard the peak as ready for further testing (not-invalid) or simply accept the peak as valid and record it at a step 3360. If the Doppler difference is integer KHz (Yes) operations pass from step 3325 to a step 3330 that provides or measures the hypothesized peak code lag $c_1$, see FIGS. 6 and 8.

After step 3330, software step 3335 calls cross-correlation mitigation hardware Xcorr 400, which electronically computes cross correlation positions of peaks t3, t4, t7 etc. of FIG. 8 or FIG. 26 around the hypothesized peak position due to one or more high-powered SVs. These peaks are ones that are determined to exceed a strength threshold at which they can interfere with the hypothesized peak, or are otherwise identified as significant. Then a step 3340 finds the position difference $\Delta t$ of the highest cross correlation peak among the electronically computed values t3, t4, t7 etc. etc. compared to hypothesized peak position t1, or the position difference of the cross correlation peak that exceeds a predetermined level and is nearest (has minimum displacement MIN) to the hypothesized peak position t1, or otherwise performs a calculation that supports this Mechanism. A succeeding decision step 3345 determines whether the cross correlation peak is close enough to interfere with the hypothesized peak during the dwell time, such as by comparing a closeness value of position difference $\Delta t$ with a position difference threshold parameter $\varepsilon 3$. If position difference $\Delta t$ is less than the position difference threshold parameter $\varepsilon 3$ (Yes at step 3345), then a step 3350 records that the hypothesized search peak or tracked Sv1 peak is invalid or swamped, and a step 3355 ignores the hypothesized search peak for positioning purposes or prevents or deselects a tracked Sv1 peak from positioning use.

On the other hand, if step 3345 determines (No) that the position difference $\Delta t$ is not less than the position difference threshold parameter $\varepsilon 3$, then a step 3360 maintains a record that the hypothesized peak is valid or not-invalid, or that the Sv1 peak is currently valid for tracking purposes. After either of steps 3355 and 3365, operations loop back through decision step 3370 to step 3310 unless tracking is turned off whence operations reach RETURN 3375.

Figure 34:
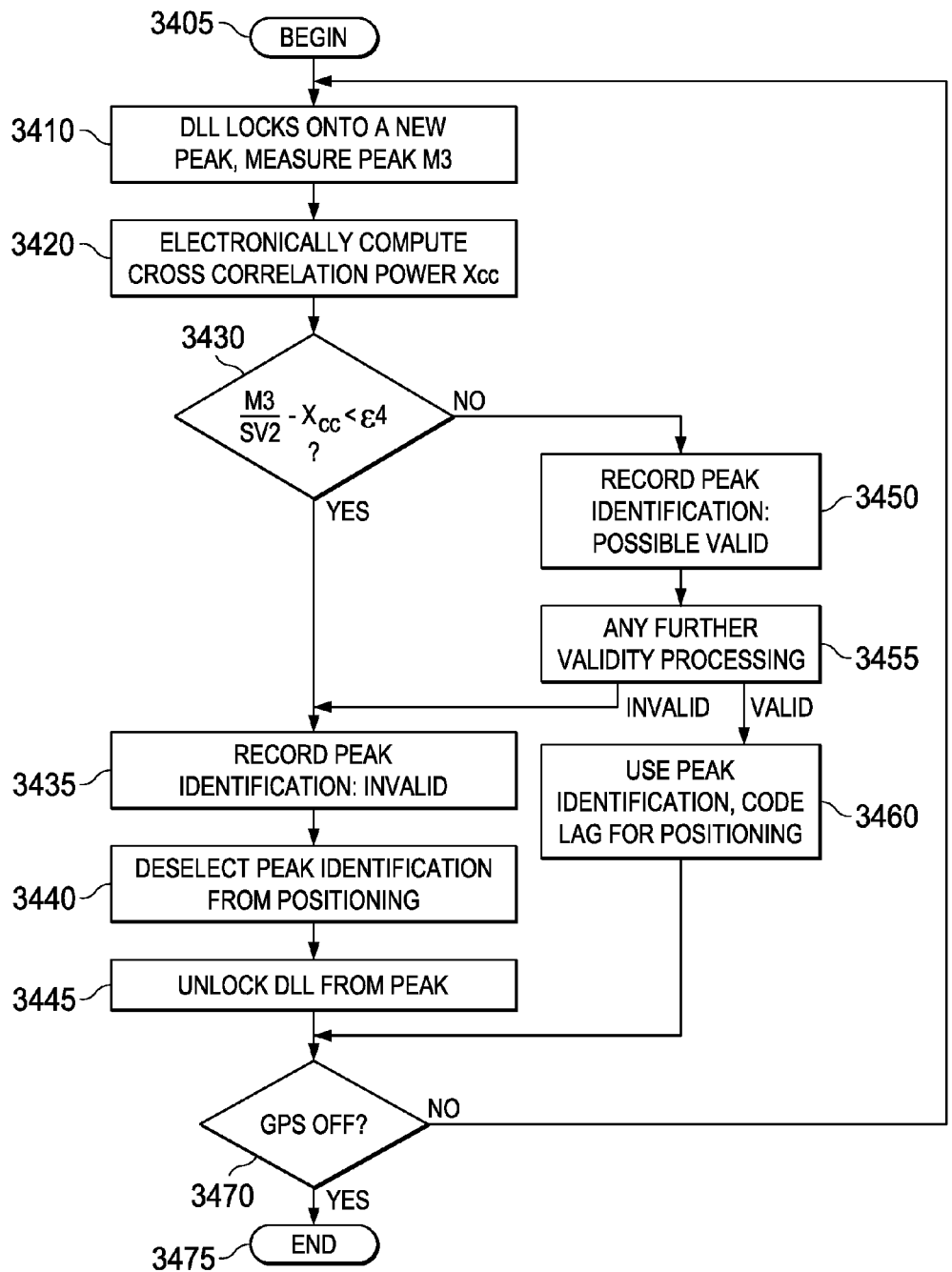
FIG. 34 is a flow diagram of another inventive process (Mechanism 7) for tracking performance for qualifying a peak as a true peak or not by testing for substantial difference by subtracting an estimated cross correlation value from FIG. 20 (or 26) from a ratio of observed low-power peak amplitude relative to a high power signal.

In FIG. 34, a Tracking Performance embodiment designated Mechanism 7 recognizes that an undesirable condition can occur that involves DLL locking onto cross correlation peaks. Mechanism 7 solves the problem of such locking by computing the actual cross correlation power with respect to high power Sv2 and cross checking it against its DLL peak. The cross checking ensures that the cross correlation peaks are not used in positioning. A process version of this Mechanism 7 embodiment commences with a BEGIN 3405 and proceeds to the following:

Monitor in a step 3410 for DLL locking onto a low power peak, and if such DLL locking occurs go to Step (2) next.

Electronically compute the cross correlation Xcc using cross-correlation mitigation hardware Xcorr 400, by a step 3420.

Cross check against the DLL peak by taking the ratio (or magnitude of dB difference) of DLL peak power M3 to high power Sv2 peak power and compare to computed Xcc using a threshold determination, in a decision step 3430.

If the threshold is not exceeded (Yes) in step 3430, indicating the DLL peak is about as strong as expected of cross-correlation power or less than that, then a step 3435 issues a Not-Valid signal.

Operate the Position Engine in a step 3440 in response to the Not-Valid signal active, so that such a cross-correlation peak is not used by the Position Engine 2270 (FIG. 38) in positioning. A step 3445 unlocks the DLL from the peak and loops back to step 3410 unless a decision step 3470 intervenes and goes to END 3475. FIG. 34 can be regarded and implemented as a H/W or S/W state machine. If the state machine decides that it is a cross correlation peak, then the state machine should go back to acquisition for this SV and lock onto a new peak at step 3410.

If the threshold in step 3430 is exceeded (Not less=No), then operations branch to a step 3450 to record the peak identification as Possible-Valid, along with its Doppler and code lag. A step 3455 performs any further validity checking (compare FIG. 35). If the peak turns out to be invalid, operations proceed to step 3435 in FIG. 34 and perform step (5) above. If the further validity checking instead also finds the signal is not-invalid, operations go to step 3460 and employ the peak identification and code lag information in Position Engine 2270 for computing the position of the receiver 100 and performing various position-based applications.

The decision criterion of step 3430 can be expressed as follows in Equation (46), wherein cross correlation Xcc is V(k, f2−f1)/1023 from a version of cross-correlation mitigation hardware Xcorr 400 described earlier above. Equation (46) is in linear scale and is subtracting in linear scale. If Equation (46) is expressed in dB, then Xcc in dB is given by Xcc=20*log 10(V(k, f2−f1)/1023). See subsequent equations.

$$M3/SV2-Xcc<\varepsilon 4 \tag{46}$$

The decision criterion can have variants that also accomplish the cross check by multiplying through by the amplitude of Sv2. (For economy of symbolism and recognizing the abuse of notation, "A(Sv2)" for amplitude of Sv2 is represented merely by "Sv2" in FIG. 34 step 3430 and where "Sv2" is used in some of the Equations (46)-(52B).) Cross-checking by any software, firmware or hardware implementation of algebraic cross-checking, tabular cross-checking, or other cross-checking is contemplated. Various equations are provided next to facilitate preparation of embodiments by the skilled worker based on experimentally determined margin quantities for any of the embodiments.

$$M3-SV2*Xcc<SV2*\varepsilon 4 \tag{47}$$

Recall from earlier hereinabove the decision criterion that low power peak is compared with a threshold from Equation (12) and is expressed by Equation (48) where threshold T is the product of the amplitude of the high power interfering satellite Sv2 times the cross correlation times a margin factor.

$$T=SV2*Xcc*m \tag{48}$$

Since the decision criterion for FIG. 16 was used for determining if a peak were not due to cross correlation and the decision criterion here is for determining if a peak is consistent with cross correlation, then the analogous inequality here is:

$$M3<T, \text{ or } M3-T<0 \tag{49A}$$

$$M3-SV2*Xcc*m<0 \tag{49B}$$

$$M3-SV2*Xcc<SV2*Xcc*(m-1) \tag{49C}$$

$$M3/SV2-Xcc<Xcc*(m-1) \tag{49D}$$

Comparing Equations (46) and (49D) shows that multiplicative margin m from earlier hereinabove and the threshold $\varepsilon 4$ are related to each other as in Equations (50A) and (50B).

$$\varepsilon 4=Xcc*(m-1) \tag{50A}$$

$$m=1+\varepsilon 4/Xcc \tag{50B}$$

Another cross-checking form of the decision criterion for step 3430 generates a ratio:

$$((M3/Sv2)/Xcc) < m \tag{51}$$

Still another variant of the decision criterion for step 3430 applies a monotonic function like the logarithm:

$$\text{Log}((M3/Sv2)/Xcc) < \log(1+\varepsilon 4/Xcc) \tag{52A}$$

In terms of db and db of margin M Equation (52A) is expressed as:

$$20(\text{Log}_{10}(M3) - (\text{Log}_{10}(Sv2) + \text{Log}_{10}(Xcc))) < M \tag{52B}$$

where $$M = 20 * \log_{10}(1+\varepsilon 4/Xcc) \tag{52C}$$

To summarize, the checks above are different variants. One variant is same as or related to the check in steps 635, 640 in FIG. 16 or steps 2680, 2640 in FIG. 24.

Even if the cross correlation peaks are smaller than the main peak (they would not swamp) they can smear the main low power Sv1 peak and could contribute cross correlation PN code noise that might affect the location information computable by the Position Engine 2270 (FIG. 38) from the peak. Accordingly, it is desirable to use the main low power Sv1 peak when the expected cross correlation power Log (Sv2*Xcc) is lower than the main peak power M3 by a suitable margin M. Multipath peaks can also smear a main peak, and use of a suitable Mechanism herein to reject smeared peaks due to cross correlation may also be useful to reject smeared peaks due to undesired multipath propagation. Using higher bandwidth of the input signal (using as many side-lobes of GPS frequency spectrum as possible) and using a narrow correlator spacing (high correlator resolution) helps resolve main lower power Sv1 peak location better in the presence of smaller cross correlation peaks. For instance, using many side lobes in reception allows a more precise recovery of the rectangular pulse waveform of the Gold code in the time domain riding on an SV signal, and this leads to narrower, more precisely defined peaks in the correlator output resulting from correlating across the chips of the Gold code.

A category of process embodiments described in connection with FIGS. 14, 15, 16 and/or 32, 33, 34 for some examples, is summarized as a satellite tracking process for a lower power satellite signal in the presence of at least one higher power satellite signal wherein Dopplers of the satellite signals change with time. The tracking process involves tracking a correlation peak having a position for the lower power signal, evaluating a difference between the Dopplers over time; and detecting when the evaluated difference between the Dopplers comes close to an integer KHz amount. If the evaluated difference comes close, then the process estimates cross-correlation between the signals at the position of the peak, compares the peak with the estimated cross-correlation, and validates or invalidates the peak depending on the comparison. The foregoing tracking process is repeatedly performed to update the validating and invalidating over time so that the valid or invalid status changes to suit the situation over time as FIG. 14 and/or FIG. 15.

SV powers change with time, not only just Dopplers. So an SV which is very high power currently will not be affected by cross correlation but with time due to changing scenario, the power could become small and hence susceptible for cross correlation analysis.

Figure 35:
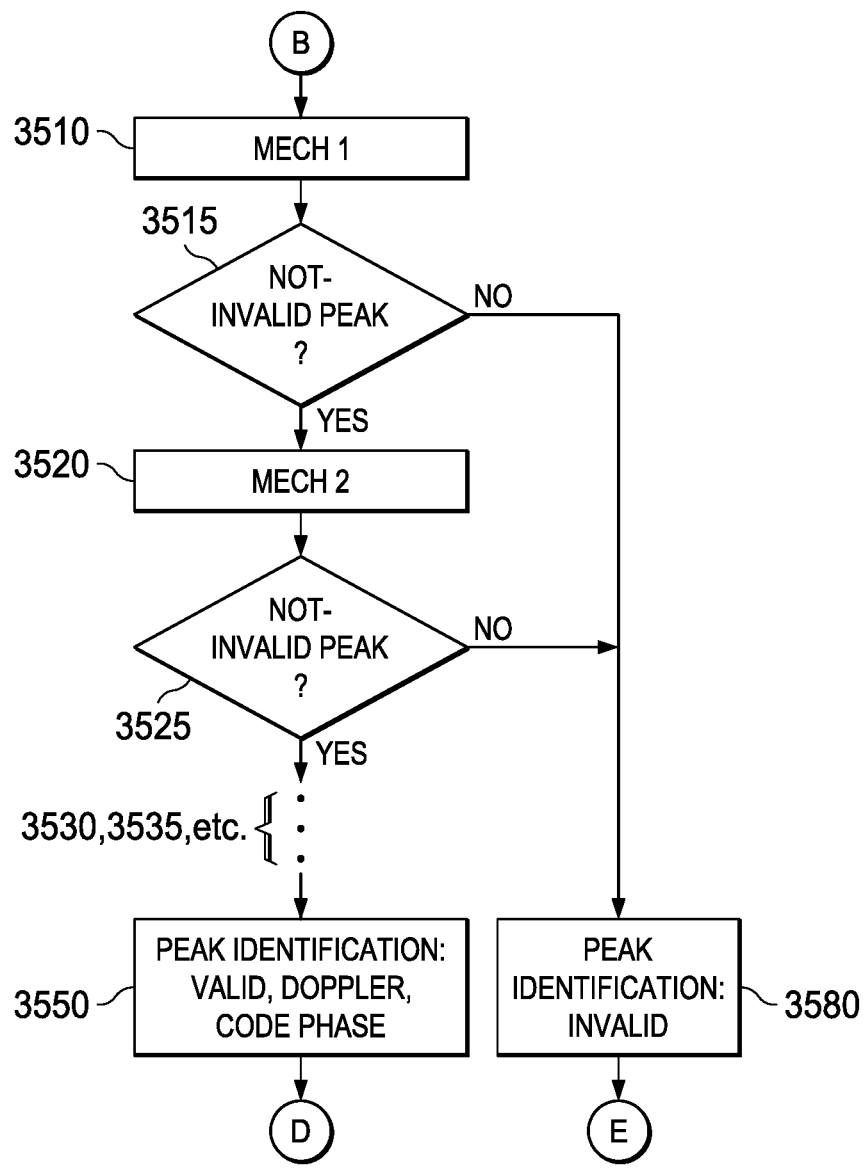
FIG. 35 is a flow diagram of an inventive composite process for combining in series various inventive processes (Mechanisms) depicted in the other Figures herein.

In FIG. 35, plural Mechanisms are applied depending on zero or non-zero Doppler difference to combine cross-correlation mitigation mechanisms. That way, an even more stringent sifting of peaks is provided for increased confidence of detection of a valid peak. Operations enter through a flow point (B) and a step 3510 executes Mechanism 1. Then a decision step 3515 determines whether Mechanism 1 found a not-invalid peak. If so (Yes), double-checking operations proceed to a step 3520 and execute Mechanism 2. A further decision step 3525 determines whether Mechanism 2 found that the peak was not-invalid under its distinct criteria. This amounts to evaluating a logic AND decision function for determining validity of a peak in question. If so (Yes), the embodiment concludes that the peak is valid, and a step 3550 identifies the valid peak by table entry for its satellite SVi and there specifies its Doppler f1 and its code phase $c_1$, whereupon flow point (D) is reached. Other Mechanisms 3530, etc., as described herein are included between steps 3525 and 3550 as desired.

Mechanism 1 is recommended to be done for zero Doppler difference, and indeed for all integer Doppler difference scenarios. Inside a given Mechanism of FIG. 35, special checks and bypassing for zero or non-zero Doppler difference are included where applicable.

On the other hand if any of the decision steps 3515, 3525, 3535, determine that the peak is invalid (No), then operations branch from any of them to a step 3580 and either make a peak identification entry of Invalid, or simply omit to make a Valid Entry, and proceed through flow point (E). FIG. 16 shows surrounding steps that are implicit in FIG. 35 and join to flow points (B), (D), (E).

Various embodiments are provided and their optimizations and which execute the Mechanisms timewise in parallel, and then logically combine their results, such as by ANDing validities and ORing invalidities as decision functions for increased confidence in evaluating peaks. Some embodiments bypass or default an output of a Mechanism if its probability of error is too high. Cross correlations with a given Sv1 low power peak from multiple interfering satellites are suitably combined as taught herein when any multiple instances of integer Doppler difference (0, +/−1, +/−2, . . . ) occur. If one high power Sv2 has zero Doppler difference f2−f1=0 with a Doppler f1 of the low power peak, and another high power SV has non-zero integer KHz Doppler difference, then multiple Mechanisms are suitably activated and combined. Note further that using a decision function provides intelligent implementation of Mechanisms taking account of Type 1 errors (falsely determining that a peak in question is valid when it is invalid) and Type 2 errors (falsely determining that a peak received from an actual satellite is invalid). Type 1 errors are desirably kept rare since they have a larger impact on the position error.

Cross correlation mitigation as taught herein intelligently solves what is here believed to be the most important problem in false locking of a receiver. Other kinds of false locks are frequency side lobe locking and auto-correlation side lobe locking. Frequency side lobe locking is suitably avoided by searching the full Doppler space and ensuring that there is no strong main lobe anywhere else. Auto correlation side lobe locking is suitably prevented by the receiver searching the full code space (1-ms) to detect the stronger main peak.

Testing and detectability of the Mechanisms are quite easy and convenient. The position and satellite measurements reported by a positioning receiver directly reflect the usage of this technique. Any particular receiver scenario is created easily in the lab using standard GPS equipment like Spirent simulator STR6560 or SimGen or otherwise.

Test 1: Create a Scenario using multiple known simulated or actual SV signals where the doppler differences are exact multiples of Khz. The measurement report lists or contains all the SVs used for positioning. Test 1 changes the actual code phase differences between two or more of the SVs and, also by each given code phase difference in FIG. 10, lists any particular SVs that the receiver accepts as valid for positioning purposes. If the particular SVs that the receiver accepts or uses for positioning change based on their actual code-phase difference, usage of Mechanism 1 is inferred and detected. Or, if Mechanism 1 itself it is provided and is being tested, that result indicates that Mechanism 1 is operative and passes Test 1.

Test 1A: Create different scenarios with zero Doppler difference but varying code-phase difference such that in some scenarios the cross correlation peak aligns with the actual peak and in some cases it does not. If a receiver uses that particular SV for positioning based on the actual code-phase difference it implies that it is computing the actual cross correlation coefficient and based on that it decides to either use it for positioning or not.

Test 2: Create different scenarios with zero Doppler difference but various values for code-phase difference, such that in some scenarios the cross correlation peak aligns with the actual peak and in some cases it is away by half a chip. If a receiver uses that particular SV for positioning based on whether separation is integer chips away or not, it implies that Mechanism 3 is present, or that a known-existing Mechanism 3 is operational and passes Test 2.

Detectability and testing these Mechanisms is quite convenient. The position and satellite measurements reported by a receiver will directly reflect operation or usage. Any particular receiver scenario can be created easily in the lab using standard GPS equipment like SimGen. A stepwise testing or detection version of the Test 1 process involves a procedure as follows.

Establish a set of actual or simulated SV signals to create a Scenario in which the Doppler differences are exact multiples of Khz.

Generate a receiver measurement report that contains all the SVs used for positioning.

If SVs used for positioning change based on their actual code-phase difference, successful operation or usage of a Mechanism is inferred. Put another way, if the receiver uses a particular SV for positioning based on the actual code-phase difference, then the test implies that the receiver is computing the actual cross correlation coefficient and based on that actual cross correlation coefficient, the receiver decides to either use the SV for positioning or not.

Repeat the test and establish a set of actual or simulated SV signals to create Scenario(s) with zero Doppler difference but varying code-phase difference such that in some scenarios the cross correlation peak aligns with the actual peak and in some cases it does not.

Electronically evaluate the tests corresponding to the different Scenarios and establish whether any given test is passed or a sufficient number of the tests are passed for purposes of acceptable receiver operation in manufacture. Alternatively, use a specified evaluation criterion pertaining to the test passing on any one Scenario for purposes of determining whether any given Mechanism is operational.

Figure 36:
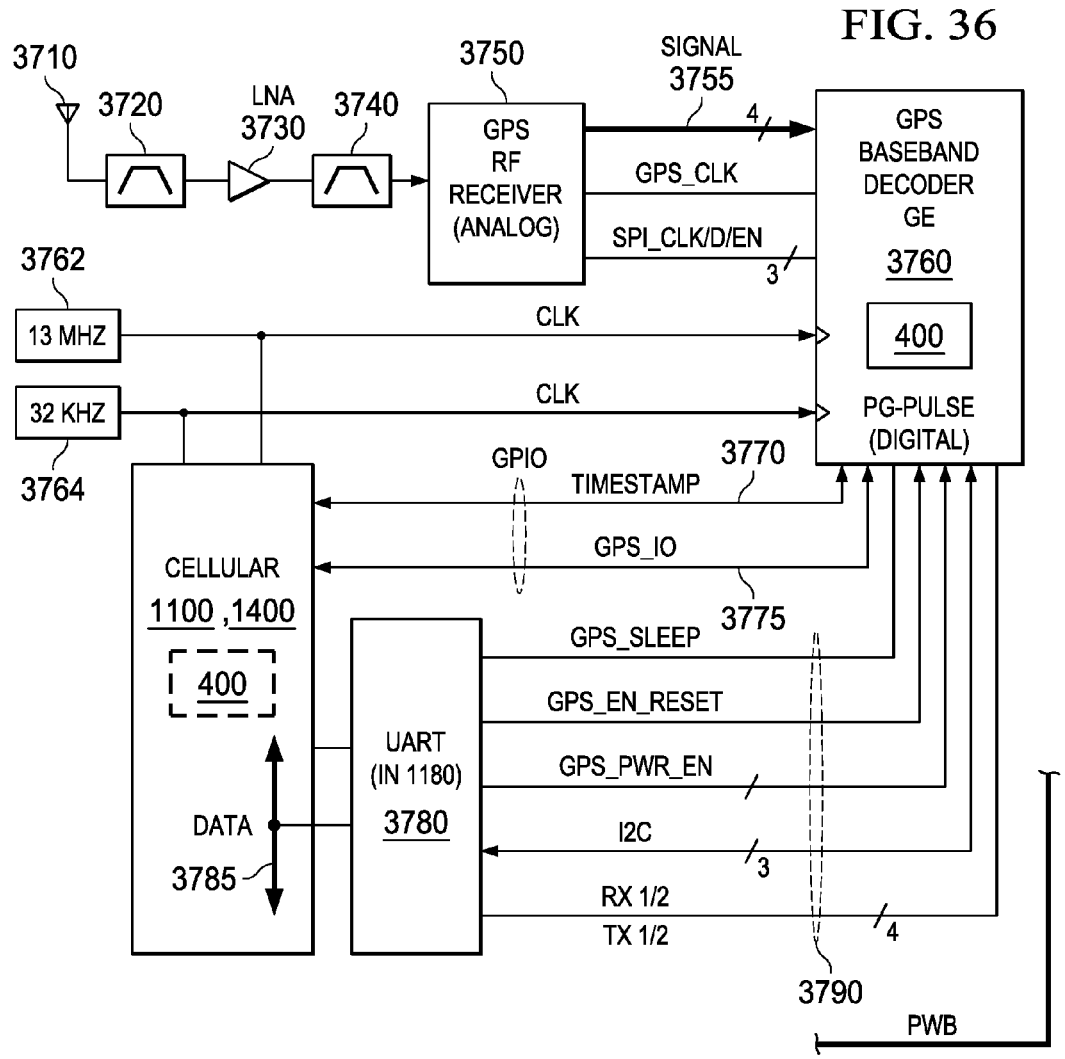
FIG. 36 is a block diagram of an inventive system including a satellite positioning engine such as a GPS AD receiver with inventive hardware of FIG. 20 operating for power managed cross correlation mitigation according to any of the inventive processes herein and further coupled with a processor integrated circuit for cellular communications and for timekeeping when the GPS receiver is asleep.

Turning to FIGS. 36 and 38, some cross correlation-resistant embodiments of the already-described Figures herein include power saving mode control above 0.1 Hertz in FIG. 38 with power save operations that also occur substantially below 0.1 Hertz such as supported in FIG. 36 (sleep/wake either periodically or on-demand or otherwise non-deterministically) wherein the satellite receiver is asleep for substantial periods of time and time keeping is performed by a cellular engine at least when the satellite receiver is asleep. Then the cellular engine provides correct time keyed to a TIMESTAMP strobe as in FIG. 36 when the satellite receiver wakes up, so that the satellite receiver then operates with a shorter time to first position fix (TTFF). For more description of the latter subject, see the published patent application 20090054075, US patent application 11/844,006 "Satellite (GPS) Assisted Clock Apparatus, Circuits, Systems and Processes for Cellular Terminals on Asynchronous Networks," Ser. No. 11/844,006, filed Aug. 3, 2007, which are incorporated by reference herein in their entirety. In FIGS. 36 and 38, an embodiment is improved over, and is combined with, the power-pulsing technology of incorporated U.S. patent application "Power-Saving Receiver Circuits, Systems and Processes" Ser. No. 12/244,060, filed Oct. 2, 2008 and said Ser. No. 11/844,006 incorporated US patent application according to the teachings herein.

In FIG. 36, GPS unit 1190 (1495) of FIGS. 36-39 has an antenna 3710 for reception of satellite positioning signals. Antenna 3710 is coupled to a bandpass filter 3720 followed by a low noise receiver amplifier LNA 3730 followed by another bandpass filter 3740. A GPS RF section 3750 is provided as an analog or mixed-signal integrated circuit fed from bandpass filter 3740. RF section 3750 in turn supplies signals to a digital GPS baseband decoder 3760 integrated circuit in the GPS receiver. Integrated circuit 3760 includes a cross-correlation hardware block 400 as well as power save mode controller like 2130 (2290) as in FIG. 38. RF section 3750 supplies signal output lines 3755 to the GPS baseband decoder 3760. Lines for SPI (serial port interface) clock, data, and enable and a further GPS clock line connect receiver 3750 and GPS baseband decoder 3760 and couple power management controls from decoder 3760 power save mode controller 2130 to RF section 3750 as shown in FIGS. 1 and 2.

GPS baseband decoder 3760 utilizes an accumulate-and-dump AD satellite positioning process for supplying GPS information or other satellite positioning information. GPS baseband decoder 3760 is coupled to integrated circuit 1100 (or 1400) of FIG. 39 by lines TIMESTAMP 3770 and GPS_IO 3775. Processor integrated circuit 1100 (or 1400) as used for timekeeping herein is suitably provided as a processor in hardware, or in hardware combined with software or in hardware combined with firmware associated with, and/or integrated into, a communications modem including digital baseband DBB 1100, analog baseband ABB 1200 and RF transmitter/receiver TX/RX 1300 of FIG. 39. In FIG. 36, cellular communications circuitry acts as a cellular engine CE for processing time information derived from the cellular communications network. Processor 1100 (or 1400) is coupled by a UART 3780 in interfaces 1180 of FIG. 39 to control the integrated circuit having GPS baseband decoder 3760. In some embodiments, part or all of cross-correlation hardware block 400 is situated in processor 1100 (or 1400) as well as, or instead of, situating it in the GPS baseband decoder 3760.

Accordingly, a data bus 3785 in processor 1100 provides controls and data as parallel bits to the UART 3780 and these bits are supplied on particular lines in a set of lines 3790 to control the GPS Engine GE. For example, these lines convey control inputs to GPS baseband decoder 3760 including a GPS_SLEEP input, a soft enable/reset GPS_EN_RESET, and a power up enable GPS_PWR_EN. These control lines pertain to the less-than-0.1 Hz. power-save control in GPS baseband decoder 3760 combined into an energy efficient time-accurate overall system embodiment with high-rate coherent power save mode (e.g., FIG. 4C, 5A of said incorporated patent application TI-65435) introduced into GPS baseband decoder 3760. Further lines to GPS baseband decoder 3760 from UART 3780 include three I2C interface lines for bi-directional serial communication, and two pairs of lines TX1, RX1 and TX2, RX2 for communication directed to GPS baseband decoder 3760 on the RX1, RX2 lines and for communication to UART 3780 on the TX1, TX2 lines. The I2C interface suitably carries power save flags and other power management information from FIG. 38 lines 2295, and carries MPU APP information in FIG. 38, between the CE 1100 (1400) and GE 3760 in FIG. 36 according to the teachings herein.

In FIG. 36, a first clock 3762 has a frequency illustratively between 10 and 100 MHz or higher, that during reception is continually (or selectively) locked to or synchronized with clocks present in cellular base stations or other network base stations. Between receptions the first clock (e.g., 13 MHz) is switched off or is left to run depending on the operating mode. A second clock 3764 has a lower frequency, e.g., below 1 MHz. such as at 32 KHz). The second clock 3764 is on and operative between receptions when the first clock 3762 is turned off for power saving. Relatively-accurate subsequent global time is determined and maintained as a sum of products and ratios of time intervals and counter values representing numbers n of clock beats according to a relation:

$$t_{CT} = t_0 + [n_1 + (n_2/RCP0) + n_3(X_{RTC}/RCP0)]T_{cellular}$$

where $t_0$ is a first GPS global time at a time-of-arrival cellular signal (TIMESTAMP), $t_{CT}$ is the relatively-accurate subsequent global time from time projection, $T_{cellular}$ is the time interval between time of arrival signals from a cellular network, RCP0 is number of first clock 3762 counts in the time interval $T_{cellular}$, $X_{RTC}$ is number of first clock 3762 counts between cycles of second clock 3764, $n_1$ is a number of received instances of the time interval $T_{cellular}$, $n_2$ is the number of first clock counts distinct from periods counted with $n_1$, and $n_3$ is the number of second clock 3764 periods distinct from periods counted with $n_1$ and $n_2$.

Figure 37:
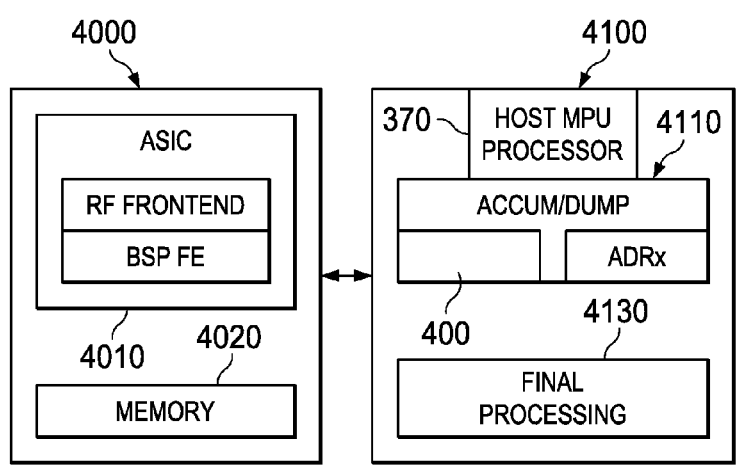
FIG. 37 is a chip layout for inventive integrated circuit chips with different functional blocks of an inventive receiver manufactured on an ASIC chip and coupled to a host processor chip having AD functionality with inventive hardware of FIG. 20.

FIG. 37 illustrates an example of chip partitioning for operations in a system embodiment using the description herein. A first chip 4000 has an ASIC block 4010 that implements an RF Front end and BSP front end for the satellite receiver. A memory area 4020 is situated on-chip and coupled with ASIC block 4010. A host processor chip 4100 includes a microprocessor 370 with functional circuitry 4110 for ADRx accumulate-and-dump ACC/DUMP receiver Rx, as well as a block 4130 for final processing and Position Engine. Chip 4100 includes cross correlation computation hardware module 400 of FIG. 20. The microprocessor MPU 370 in FIG. 37 runs the power save mode control operations of out of firmware or software; and if the MPU is not otherwise needed, then the MPU is put to sleep to save power. The layout of FIG. 37 is applied as shown and/or combined with the circuits and memories for instructions, data and parameters of the other Figures.

FIG. 38 shows a GPS receiver 2200 embodiment including a BSP 2250 having a Measurement Engine 2260 feeding a Position Engine 2270. Position Engine 2270 refers to functions of or operations in the Baseband processor BSP that are run on a host processor and/or on a dedicated microprocessor and Position Engine 2270 supplies GPS output. Measurement Engine 2260 is coupled to and fed by a Digital Frontend 2230. Measurement Engine 2260 includes structures, functions or operations of the GPS chip such as in FIG. 5. A power-save controller 2290 controls a voltage supply 2280 for five main blocks: RF 2210, IF 2220, Digital Frontend 2230, PLL 2240 fed by a clock circuit having a temperature compensated crystal oscillator TCXO as time base via a power controlled clock slicer 2245, and BSP 2250. Voltage supply 2280 supplies and regulates power voltage to the power gating circuitry (e.g., gating FETs in the supply voltage lines to power managed blocks) controlled by Power-Save Controller 2290. The front end and power management circuitry support the other receiver structures and processes detailed in the Figures herein by supplying signals and saving power and energy.

The power-save controller 2290 is connected directly to any of the other individual components to turn them on/off directly as shown by a connection from the power-save controller 2290 to the Measurement Engine 2260, for instance. Power connections and/or power controlling enables are provided as shown in FIGS. 1 and 2 or otherwise to any appropriate block or components in each block of FIGS. 38, 5 whether or not explicitly or completely shown in FIGS. 38, 5. Power-save controller 2290 is coupled by Digital LDO, or otherwise, to the power source in a way that keeps some or all of power-save controller 2290 operable and active to deliver power control duty cycles and power control enable and disable signals to power-controlled blocks of receiver 2200. For conciseness here, the various numerals and description of FIGS. 38-39 parallel the description of corresponding Figures in said incorporated patent application TI-65435 and are used in a communications system as described therein.

Embodiments of applications and system blocks disclosed herein are suitably implemented in fixed, portable, mobile, automotive, seaborne, and airborne, communications, control, set top box, television (receiver or two-way TV), and other apparatus. The personal computer (PC) is suitably implemented in any form factor such as desktop, laptop, palmtop, organizer, mobile phone handset, PDA personal digital assistant, internet appliance, wearable computer, content player, personal area network, or other type and usable with media such as optical disk, flash drive, and other media.

Reception of software intercommunication and updating of information is provided in some embodiments originating sources and the receiver of FIG. 36-39. Such intercommunication and updating also suitably occur via any other processor in the mobile device with receiver 100 itself such as for GPS positioning, cellular modem, WLAN, Bluetooth, a website, or other circuitry for wireless or wireline modem processor, digital television and physical layer (PHY).

FIG. 39 illustrates integrated circuit chips including chips 1100, 1200, 1300, 1400, 1500, and GPS 1190 (1495) for use in any one, some or all of the blocks of a communications system. The skilled worker uses and adapts the integrated circuits to the particular parts of the communications system as appropriate to the functions intended. Circuit blocks of the cellular telephone handset of FIG. 39 cooperate, support, or cooperatively utilize GPS or assisted GPS in positioning and location-based applications and are used with or include the positioning receiver of FIGS. 2, 5, 36-38 and the other Figures herein.

The receiver hardware has Scan In and Scan Out paths for serial scan testability and verification with a Debugger of FIG. 39. A scan path is coupled to a JTAG 1149.1 or 1149.7 test access port (TAP) controller circuit or otherwise in the system embodiment that supports such testability, and the TAP controller is coupled to the Debugger at test time. Other scannable blocks in FIGS. 2, 5, 11, 20, and 36-39 are also included in the scan chain as desired.

A variety of embodiments are provided for spread-spectrum communications systems at base stations, gateways, handsets, and any applicable devices for mobile, portable, and/or fixed use. Such systems suitably support any one or more of global positioning system GPS and other location-determining or positioning systems, cellular voice and data, code division multiple access CDMA, wireless local area network WLAN, industrial, scientific, and medical communications, cordless telephones, and any other spread-spectrum communications systems. A somewhat overlapping category of embodiments are provided for receivers employing coherent signal accumulation in spread-spectrum or other types of communications systems.

Various embodiments are used with one or more microprocessors, each microprocessor having a pipeline is selected from the group consisting of 1) reduced instruction set computing (RISC), 2) digital signal processing (DSP), 3) complex instruction set computing (CISC), 4) superscalar, 5) skewed pipelines, 6) in-order, 7) out-of-order, 8) very long instruction word (VLIW), 9) single instruction multiple data (SIMD), 10) multiple instruction multiple data (MIMD), 11) multiple-core using any one or more of the foregoing, and 12) microcontroller pipelines, control peripherals, and other micro-control blocks using any one or more of the foregoing.

Various embodiments are implemented in any integrated circuit manufacturing process such as different types of CMOS (complementary metal oxide semiconductor), SOI (silicon on insulator), SiGe (silicon germanium), organic transistors, and with various types of transistors such as single-gate and multiple-gate (MUGFET) field effect transistors, and with single-electron transistors, and other nanoelectronics and other structures. Photonic integrated circuit blocks, components, and interconnects are also suitably applied in various embodiments.

Various embodiments of integrated circuit systems and processes as described herein are manufactured according to a suitable process of manufacturing that prepares RTL (register transfer language) and netlist and/or other integrated design information for a desired embodiment such as one including, or respectively including, a hardware module 400 one or more integrated circuits, an accumulate and dump receiver and/or spread spectrum receiver with a power save mode controller as described. Such embodiment is verified in simulation electronically on the RTL and netlist. Place and route operations are performed to establish the physical layout of each integrated circuit, and the layout is verified. In this way, the contents and timing of the memory, of the receivers and processor hardware and of the GPS decoder are verified. The operations are verified pertaining to the desired sequences and parallelism of Mechanisms herein and other operations of the communications unit and the GPS unit as described. Verification evaluation determines whether the verification results are currently satisfactory and the verified design of integrated circuit chips with cross-correlation mitigation hardware Xcorr 400 and such other structures as form an embodiment herein is fabricated in a wafer fab and packaged to produce resulting manufactured integrated circuit(s) First-silicon and production samples are verified such as by using scan chain and tracing methodology on the hardware until the chips are satisfactory. A printed wiring board (PWB) of a system embodiment uses the integrated circuit(s). Software and parameters as described in the various Figures herein are loaded into flash or other nonvolatile memory for the system and verified. The system is powered up and cross correlation mitigation is verified on satellite simulations and with actual satellite reception in the various signal power scenarios.

ASPECTS (See Explanatory Notes at End of this Section)

2A. The cross correlation circuit is operable to compare the variable comparison value with a strength of the peak in question according to a decision threshold, to reject or pass the peak.

1A. The variable comparison value is substantially a value of the cross correlation function itself.

1A1. The cross correlation circuit is operable to compare the variable comparison value with a value of a function of strength of the peak in question relative to the signal carrying the distinct PN code, to determine whether to reject the peak as cross correlation.

1B. The correlator circuit has multiple channels and said cross correlation circuit includes a controller for the correlator circuit and said controller operable to reject and pass peaks for a plurality of the channels based on generating a plurality of such variable comparison values.

1C. A control circuit coupled to said correlator circuit and operable when the peak is rejected to actuate said correlator circuit to find another peak.

1D. A control circuit coupled to control said correlator circuit, said control circuit responsive to said cross correlation circuit.

7A. A control circuit coupled to said correlator circuit and operable to access said cross correlation circuit with the value of relative Doppler and the value of relative code lag.

6A. A control circuit coupled to control said correlator circuit, said control circuit operable to initiate and respond to said cross correlation circuit.

1E. A front end operable to receive the signals of different signal strengths and provide them for correlation by said correlator circuit.

1F. The correlator circuit is operable on at least one signal selected from the group consisting of 1) satellite positioning system signals, 2) code division multiple access CDMA signals, and 3) spread spectrum signals.

11A. Each PN code has a period and the difference between the Doppler of the higher-power peak and the associated Doppler is an integer (0, +/−1, +/−2, . . . ) multiple of the reciprocal of the PN code period.

11B. The electronically seeking is subject to cross correlation interference and further comprising providing a variable comparison value based on the electronic generation related to the cross correlation as a function of both the Doppler difference and the relative code lag, and using the variable comparison value to reject an invalid cross correlation peak and pass a valid received peak, whereby operating time and overall energy to deliver a valid received peak are saved.

11C. Imposing a duty cycle of activity and inactivity onto the electronically seeking, whereby power is saved.

11D. Imposing a sleep and wake process onto both the electronically seeking and the selectively executing and preventing, whereby power is saved.

13A. The correlator circuit is operable to find a high power peak having a first pseudo range $R_j$ and to find a lower power peak having a second pseudo range $R_i$, and wherein said cross correlation detector determines whether or not the actual difference $R_i-R_j$ departs from the integer-rounded value of that difference by more than an amount related to the pseudo range estimation error of the second pseudorange $R_j$.

13B. The high power peak has a Doppler shift and the low power peak has a Doppler shift, and said cross correlation detector is operable to prevent the integer-chips determination if the Doppler shift of the low power peak is more than a predetermined amount different from the Doppler shift in the high power peak.

13B1. The predetermined amount is about two percent (2%) or less.

13B2. The the cross correlation detector is thereby operable to reject a zero-relative-Doppler unsmeared cross correlation peak.

17A. The PN code issuing circuit includes a counter and PN code generators, said counter coupled to time out at least one of said PN code generators.

17B. A programmable microprocessor and a memory coupled to said microprocessor including instructions representing operations for said microprocessor to communicate with said issuing circuit and said MAC.

17C. A bus and a register circuit coupled to said MAC to enter at least one value representing cross correlation from said MAC, said second register circuit operable to deliver the at least one value representing cross correlation to said bus.

17D. A first register circuit for entering controls, and a second register circuit coupled to said MAC to enter at least one value representing cross correlation from said MAC, and a programmable microprocessor to communicate the controls to said first register circuit and to utilize the least one value representing cross correlation from said second register circuit.

23A. The cross correlation detector is operable to reject the given peak as a cross correlation peak if the strength of the given peak in the first integration period effectively differs substantially from its strength in the second integration period.

24A. The adjustment more nearly equalizes the values of strength of the given peak from the first and second integration periods in case of little cross correlation and the same adjustment makes those values more disparate in case of substantial cross correlation.

23B. The cross correlation detector is pre-qualified by a condition of non-zero integer KHz Doppler difference.

23C. The correlator is operable for received signal tracking and said cross correlation detector is operable during the received signal tracking to use the comparison to temporarily deselect the given peak from positioning in case of significant cross correlation and to resume use of the given peak for positioning in case the cross correlation is subsequently diminished.

23D. The correlator circuit is operable to issue plural selectable locally-issued PN codes for tracking peaks from of each of plural low power sources, and said cross correlation detector is operable to repeatedly do the comparisons and thereby provide cross correlation protection for tracking of each of plural low power sources over time.

25A. The determination includes determining whether at least one of the plural values representing cross correlation both has less than a predetermined amount of relative code lag compared to the peak and exceeds a strength threshold compared to the peak.

25A1. The cross correlation circuit is operable to prevent the use of the position of the received peak for positioning purposes when the determination is that at least one of the plural values representing cross correlation both does have less than a predetermined value of relative code lag compared to the peak and does exceed a strength threshold compared to the peak.

25A2. The strength threshold is dynamically determined as a function of the peak relative to the strength of a higher-power signal from which the cross correlation arises.

25B. The determination is pre-qualified by a determination whether the relative Doppler is nonzero integer kHz.

25C. The cross correlation circuit is further operable to use the determination to contribute information or not for a positioning from the received peak.

28A. The cross correlation protection system is operable to provide an output signal to reject a peak as a cross correlation peak or pass the peak as a valid peak depending on evaluation of the decision function.

Notes: Aspects are description paragraphs that might be offered as claims in patent prosecution. The above dependently-written Aspects have leading digits and may have internal dependency designations to indicate the claims or aspects to which they pertain. The leading digits and alphanumerics indicate the position in the ordering of claims at which they might be situated if offered as claims in prosecution.

A few preferred embodiments have been described in detail hereinabove. It is to be understood that the scope of the invention comprehends embodiments different from those described, as well as described embodiments, yet within the inventive scope. Microprocessor and microcomputer are synonymous herein. Processing circuitry comprehends digital, analog and mixed signal (digital/analog) integrated circuits, ASIC circuits, PALs, PLAs, decoders, memories, non-software based processors, microcontrollers and other circuitry, and digital computers including microprocessors and microcomputers of any architecture, or combinations thereof. Internal and external couplings and connections can be ohmic, capacitive, inductive, photonic, and direct or indirect via intervening circuits or otherwise as desirable. Implementation is contemplated in discrete components or fully integrated circuits in any materials family and combinations thereof. Various embodiments of the invention employ hardware, software or firmware. Process diagrams and block diagrams herein are representative of flows and/or structures for operations of any embodiments whether of hardware, software, or firmware, and processes of manufacture thereof.

While this invention has been described with reference to illustrative embodiments, this description is not to be construed in a limiting sense. Various modifications and combinations of the illustrative embodiments, as well as other embodiments of the invention may be made. The terms "including", "includes", "having", "has", "with", or variants thereof are used in the detailed description and/or the claims to denote non-exhaustive inclusion in a manner similar to the term "comprising". It is therefore contemplated that the appended claims and their equivalents cover any such embodiments, modifications, and embodiments as fall within the true scope of the invention.

What is claimed is:

1. A cross correlation interference estimation circuit comprising:
pseudo random noise (PN) code issuing circuitry operable to issue first and second different PN codes having a relative code lag and continually rotated relative to each other according to a relative Doppler shift, the first and second different PN codes having, respectively, relative indices $p1(s+k+7)$ and $p2(s)$ where index s ranges from 0 to 1022 and index value s=0 corresponds to a first chip in time and 'k' is the first relative code-phase or relative code lag C1-C2 of interest between the two PN codes p1(n) and p2(n); and multiply accumulate circuitry (MAC) having a plurality of MAC stages, with one-chip time interval registers between the stages, operable to cross correlate the first and second different PN codes having the relative code lag and continually rotated.

2. The cross correlation interference estimation circuit of claim 1 in which the PN code issuing circuitry further includes a complex value rotation look up table (LUT) and a multiplier circuit for rotating at least one of the selected PN codes in response to the LUT.

3. The cross correlation interference estimation circuit of claim 1 in which the PN code issuing circuitry further includes a look up table (LUT) responsive to an accumulator circuit fed with a value representing the relative Doppler shift.

4. The cross correlation interference estimation circuit of claim 1 in which the MAC has plural MAC stages, with one-chip time interval registers between the stages, operable to concurrently cross correlate the first and second PN codes with plural relative code lags and continually rotated.

5. The cross correlation interference estimation circuit of claim 1 including a state machine control circuit operable in response to an initiation signal to establish a control sequence of operation of the PN code issuing circuitry and to deliver a completion signal output that indicates that a value is ready representing the cross correlation from the MAC.

6. The cross correlation interference estimation circuit of claim 1 including a bus and a register circuit coupled to the bus and having register fields for entering values representing the relative Doppler shift and the relative code lag from the bus, the pseudo random noise (PN) code issuing circuitry operable in response to the register circuit.

7. A cross correlation interference estimation circuit comprising:

pseudo random noise (PN) code issuing circuitry operable to issue first and second different PN codes having a relative code lag and continually rotated relative to each other according to a relative Doppler shift;

multiply accumulate circuitry (MAC) operable to cross correlate the first and second different PN codes, the MAC having plural MAC stages, with one-chip time interval registers between the stages, operable to concurrently cross correlate the selected pair of PN codes with plural relative code lags and continually rotated; and the PN code issuing circuitry including a complex value rotation look up table (LUT) and a multiplier circuit for rotating at least one of the PN codes in response to the LUT.

8. The cross correlation interference estimation circuit of claim 7 in which the PN code issuing circuitry further includes a look up table (LUT) responsive to an accumulator circuit fed with a value representing the relative Doppler shift.

9. The cross correlation interference estimation circuit of claim 7 including a state machine control circuit operable in response to an initiation signal to establish a control sequence of operation of the PN code issuing circuitry and to deliver a completion signal output that indicates that a value is ready representing the cross correlation from the MAC.

10. The cross correlation interference estimation circuit of claim 7 including a bus and a register circuit, the register circuit being coupled to the bus and having register fields for entering values representing the relative Doppler shift and the relative code lag from the bus, the pseudo random noise (PN) code issuing circuitry being coupled to the register circuit.

11. A cross correlation interference estimation circuit comprising:

a first pseudo random noise (PN) code generator having an output issuing a first PN code;

a second PN code generator having an output issuing a second PN code, the second PN code being different from the first PN code;

a control circuit coupled to the first and second PN code generators;

multiply accumulate circuitry (MAC) operable to cross correlate the first and second different PN codes, the MAC having plural MAC stages, with one-chip time interval registers between the stages;

a multiplier circuit having an input coupled to the output of the second PN code generator, a look up table (LUT) input, and an output; and a complex value rotation look up table (LUT) having an output coupled to the look up table (LUT) input.

12. The cross correlation interference estimation circuit of claim 11 in which the output of the first PN code generator is coupled to the MAC stages through the one-chip interval registers and the output of the second PN code generator is coupled to the MAC stages without being coupled to the one-chip interval registers.

13. The cross correlation interference estimation circuit of claim 11 including:

a first seed register having an output;

a second seed register separate from the first seed register and having an output;

the first PN code generator having an input coupled to the first seed register output; and the second PN code generator having an input coupled to the second seed register output.

14. The cross correlation interference estimation circuit of claim 11 including a relative Doppler shift value register, an accumulator circuit coupled to the Doppler shift value register, and a look up table (LUT) coupled to the accumulator circuit.

15. The cross correlation interference estimation circuit of claim 11 in which the control circuit is a state machine coupled to the first PN code generator and to the second PN code generator.

16. The cross correlation interference estimation circuit of claim 11 including a bus and a register circuit, the register circuit being coupled to the bus and having register fields for entering values representing the relative Doppler shift and the relative code lag from the bus, the first and second PN code generators being coupled to the register circuit.

* * * * *